US007882294B2

(12) United States Patent
Love

(10) Patent No.: US 7,882,294 B2
(45) Date of Patent: Feb. 1, 2011

(54) ON-CHIP BUS

(75) Inventor: Michael G Love, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/025,569

(22) Filed: Feb. 4, 2008

(65) Prior Publication Data

US 2008/0147951 A1 Jun. 19, 2008

Related U.S. Application Data

(62) Division of application No. 10/738,313, filed on Dec. 17, 2003, now Pat. No. 7,340,548.

(51) Int. Cl.
 *G06F 13/14* (2006.01)
(52) U.S. Cl. .................. 710/305; 710/306; 710/308
(58) Field of Classification Search ................ 710/117, 710/124, 29, 60, 306, 308–312, 316, 240–242
See application file for complete search history.

(56) References Cited

U.S. PATENT DOCUMENTS

| | | | |
|---|---|---|---|
| 5,761,516 A | 6/1998 | Rostoker | |
| 5,968,155 A | 10/1999 | Davidson | |
| 6,195,593 B1 | 2/2001 | Nguyen | |
| 6,323,755 B1 | 11/2001 | Lee et al. | |
| 6,353,867 B1 | 3/2002 | Qureshi et al. | |
| 6,601,126 B1 | 7/2003 | Zaidi et al. | |
| 7,076,595 B1 | 7/2006 | Dao et al. | |
| 7,200,137 B2 * | 4/2007 | Dorr et al. | 370/351 |
| 7,283,556 B2 * | 10/2007 | Mullendore et al. | 370/458 |
| 7,340,548 B2 | 3/2008 | Love | |
| 2004/0172494 A1 | 9/2004 | Pettey et al. | |
| 2005/0122982 A1 * | 6/2005 | Li et al. | 370/395.41 |
| 2006/0080487 A1 * | 4/2006 | Das et al. | 710/124 |
| 2006/0101179 A1 * | 5/2006 | Lee et al. | 710/113 |
| 2007/0079044 A1 * | 4/2007 | Mandal et al. | 710/310 |

FOREIGN PATENT DOCUMENTS

| | | |
|---|---|---|
| JP | 2226842 | 9/1990 |
| JP | 10116235 | 5/1998 |

(Continued)

OTHER PUBLICATIONS

Hemani, et al., "Network on A Chip: An architecture for Billion Transistor Era", Citeseer, 2000.

(Continued)

*Primary Examiner*—Khanh Dang

(57) ABSTRACT

This disclosure involves an on-chip bus architecture involving an on-chip bus that includes a collector node and at least one device node. Each device node is in communication with an on-chip device. The collector node is capable of conducting multiple outstanding transactions with a plurality of on-chip devices over the on-chip bus wherein each on-chip device transmits all of its data signals across the on-chip bus in the form of packets. The on-chip bus includes at least one bus register, and each of the multiple on-chip devices includes at least one device register. The on-chip bus can provide top level register to register communications between the device register and the bus register. In one version, the on-chip bus is a distributed packet on-chip (DPO) bus.

20 Claims, 23 Drawing Sheets

FOREIGN PATENT DOCUMENTS

| | | |
|---|---|---|
| JP | 2000250852 | 9/2000 |
| JP | 2004525449 | 8/2004 |
| WO | WO 02065700 | 8/2002 |

OTHER PUBLICATIONS

"A Comparison of Five Different Multiprocessor SoC Bus Architectures", Georgia Institute of Technology, undated.

"The CoreConnect Bus Architecture", IBM,(1999).

"IBM CoreConnect Bus Architecture (A 32,64, 128-bit Core On-Chip Bus Standard)", IBM,(1999).

Shandle, Jack "Shared, Switched, or Networded? The Unchartered Future of On-Chip Buses.", (Sep. 24, 2002).

Weiss, Ray "CoreConnect: The On-Chip Bus System", (Apr. 2, 2001).

Logicore, Xilinx "Device Control Register Bus (DCR) V.2.9", (Jul. 24, 2002).

"Foreign Office Action", Japanese Application No. 2004-364894, (Jun. 18, 2010),6 pages.

* cited by examiner

| | P/NP/C | Post d Req | | Non-Posted Req | | Completion | |
|---|---|---|---|---|---|---|---|
| P/NP/C | Command | Mem Write | Message | Read | Cfg Write | Read | Cfg Write |
| Posted Req | Mem Write | No(RO=0) Opt(RO=1) | | Yes | | Opt(RO=0) Yes(RO=1) | Opt(RO=0) Yes(RO=1) |
| | Message | | | | | | |
| Non-P Req | Read | No | | Opt | | Opt | Opt |
| | Cfg Write | | | | | | |
| Completion | Read | No(RO=0) Opt(RO=1) | | Yes | | Opt(RO=0) Yes(RO=1) | Opt |
| | Cfg Write | Opt | | Yes | | Opt | Opt |
Fig. 15
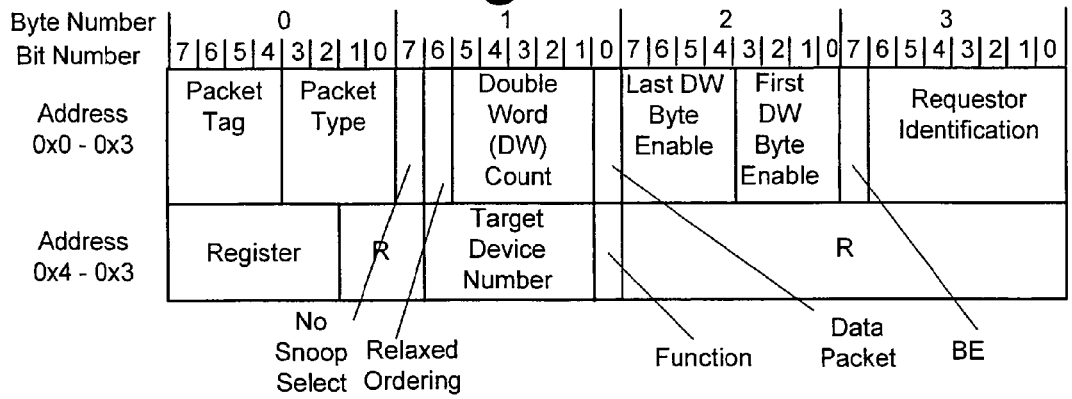
Fig. 16
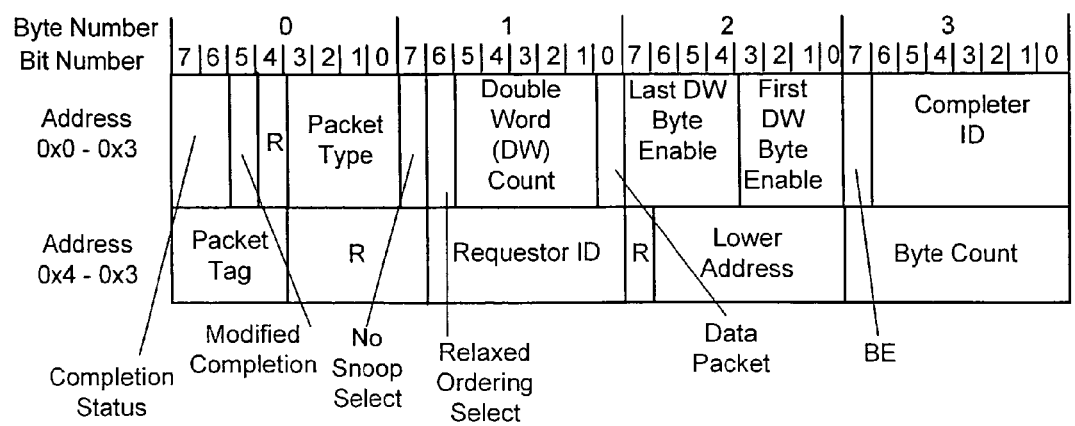
Fig. 17

| | | | | | | | | | | | | |
|---|---|---|---|---|---|---|---|---|---|---|---|---|
| Bus Width | 32-bit bus | | | 32 bits | 32 - | | | - 0 | | | | |
| Start Address | 0x8040 | | Tx Order | Byte | 0 | 1 | 2 | 3 | | | | |
| Data Len (DWs) | 3 | | 1 | 0x8040 | 11 | 22 | 33 | 44 | | | | |
| First DW BE | 0xF | | 2 | 0x8044 | 55 | 66 | 77 | 88 | | | | |
| Last DW BE | 0xF | | 3 | 0x8048 | 99 | aa | bb | cc | | | | |
| | | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8040 | | 1 | N/A | H0 | H1 | H2 | H3 | | | | |
| DPO FDBE | 0xF | | 2 | N/A | H4 | H5 | H6 | H7 | | | | |
| DPO LDBE | 0xF | | 3 | 0x8040 | 11 | 22 | 33 | 44 | | | | |
| DPO DWs | 3 | | 4 | 0x8044 | 55 | 66 | 77 | 88 | | | | |
| | | | 5 | 0x8048 | 99 | aa | bb | cc | | | | |
| | | | | | | | | | | | | |
| DPO Header | 64-bit bus | | | 64 bits | 64 - | | | | | | | - 0 |
| DPO Address | 0x8040 | | Tx Order | Byte | 0 | 1 | 2 | 3 | 4 | 5 | 6 | 7 |
| DPO FDBE | 0xF | | 1 | N/A | H0 | H1 | H2 | H3 | H4 | H5 | H6 | H7 |
| DPO LDBE | 0xF | | 2 | 0x8040 | 11 | 22 | 33 | 44 | 55 | 66 | 77 | 88 |
| DPO DWs | 3 | | 3 | 0x8048 | 99 | aa | bb | cc | X | X | X | X |

Fig. 18

| | | | | | | | | | | | | |
|---|---|---|---|---|---|---|---|---|---|---|---|---|
| Bus Width | 32-bit bus | | | 32 bits | 32 - | | | - 0 | | | | |
| Start Address | 0x8044 | | Tx Order | Byte | 0 | 1 | 2 | 3 | | | | |
| Data Len (DWs) | 3 | | 1 | 0x8044 | X | 22 | 33 | 44 | | | | |
| First DW BE | 0x7 | | 2 | 0x8048 | 55 | 66 | 77 | 88 | | | | |
| Last DW BE | 0xE | | 3 | 0x804c | 99 | aa | bb | X | | | | |
| | | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8044 | | 1 | N/A | H0 | H1 | H2 | H3 | | | | |
| DPO FDBE | 0x7 | | 2 | N/A | H4 | H5 | H6 | H7 | | | | |
| DPO LDBE | 0xE | | 3 | 0x8044 | X | 22 | 33 | 44 | | | | |
| DPO DWs | 3 | | 4 | 0x8048 | 55 | 66 | 77 | 88 | | | | |
| | | | 5 | 0x804c | 99 | aa | bb | X | | | | |
| | | | | | | | | | | | | |
| DPO Header | 64-bit bus | | | 64 bits | 64 - | | | | | | | - 0 |
| DPO Address | 0x8044 | | Tx Order | Byte | 0 | 1 | 2 | 3 | 4 | 5 | 6 | 7 |
| DPO FDBE | 0x7 | | 1 | N/A | H0 | H1 | H2 | H3 | H4 | H5 | H6 | H7 |
| DPO LDBE | 0xE | | 2 | 0x8040 | X | X | X | X | X | 22 | 33 | 44 |
| DPO DWs | 3 | | 3 | 0x8048 | 55 | 66 | 77 | 88 | 99 | aa | bb | X |

Fig. 19

| Bus Width | 32-bit bus | | | 32 bits | 32 - | | | - 0 | | | | |
|---|---|---|---|---|---|---|---|---|---|---|---|---|
| Start Address | 0x8044 | | Tx Order | Byte | 0 | 1 | 2 | 3 | | | | |
| Data Len (DWs) | 4 | | 1 | 0x8044 | X | 22 | 33 | 44 | | | | |
| First DW BE | 0x7 | | 2 | 0x8048 | 55 | 66 | 77 | 88 | | | | |
| Last DW BE | 0xE | | 3 | 0x804c | 99 | aa | bb | cc | | | | |
| | | | 4 | 0x8050 | dd | ee | ff | X | | | | |
| | | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8044 | | 1 | N/A | H0 | H1 | H2 | H3 | | | | |
| DPO FDBE | 0x7 | | 2 | N/A | H4 | H5 | H6 | H7 | | | | |
| DPO LDBE | 0xE | | 3 | 0x8044 | X | 22 | 33 | 44 | | | | |
| DPO DWs | 3 | | 4 | 0x8048 | 55 | 66 | 77 | 88 | | | | |
| | | | 5 | 0x804c | 99 | aa | bb | cc | | | | |
| | | | 6 | 0x8050 | dd | ee | ff | X | | | | |
| | | | | | | | | | | | | |
| DPO Header | 64-bit bus | | | 64 bits | 64 - | | | | | | | - 0 |
| DPO Address | 0x8044 | | Tx Order | Byte | 0 | 1 | 2 | 3 | 4 | 5 | 6 | 7 |
| DPO FDBE | 0x7 | | 1 | N/A | H0 | H1 | H2 | H3 | H4 | H5 | H6 | H7 |
| DPO LDBE | 0xE | | 2 | 0x8040 | X | X | X | X | X | 22 | 33 | 44 |
| DPO DWs | 3 | | 3 | 0x8048 | 55 | 66 | 77 | 88 | 99 | aa | bb | cc |
| | | | 4 | 0x8050 | dd | ee | ff | X | X | X | X | X |

Fig. 20

| Bus Width | 32-bit bus | | | 32 bits | 32 - | | | - 0 | | | | |
|---|---|---|---|---|---|---|---|---|---|---|---|---|
| Start Address | 0x8044 | | Tx Order | Byte | 0 | 1 | 2 | 3 | | | | |
| Data Len (DWs) | 1 | | 1 | 0x8044 | X | X | 21 | 32 | | | | |
| First DW BE | 0x3 | | | | | | | | | | | |
| Last DW BE | 0x3 | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8044 | | 1 | N/A | H0 | H1 | H2 | H3 | | | | |
| DPO FDBE | 0x3 | | 2 | N/A | H4 | H5 | H6 | H7 | | | | |
| DPO LDBE | 0x3 | | 3 | 0x8044 | X | X | 21 | 32 | | | | |
| DPO DWs | 1 | | | | | | | | | | | |
| | | | | | | | | | | | | |
| DPO Header | 64-bit bus | | | 64 bits | 64 - | | | | | | | - 0 |
| DPO Address | 0x8044 | | Tx Order | Byte | 0 | 1 | 2 | 3 | 4 | 5 | 6 | 7 |
| DPO FDBE | 0x3 | | 1 | N/A | H0 | H1 | H2 | H3 | H4 | H5 | H6 | H7 |
| DPO LDBE | 0x3 | | 2 | 0x8040 | X | X | X | X | X | X | 21 | 32 |
| DPO DWs | 1 | | | | | | | | | | | |

Fig. 21

| Bus Width | 32-bit bus | | | 32 bits | 32 - | | | - 0 | | | | |
|---|---|---|---|---|---|---|---|---|---|---|---|---|
| Start Address | 0x8048 | | Tx Order | Byte | 0 | 1 | 2 | 3 | | | | |
| Data Len (DWs) | 1 | | 1 | 0x8048 | X | X | 21 | 32 | | | | |
| First DW BE | 0x3 | | | | | | | | | | | |
| Last DW BE | 0x3 | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8048 | | 1 | N/A | H0 | H1 | H2 | H3 | | | | |
| DPO FDBE | 0x3 | | 2 | N/A | H4 | H5 | H6 | H7 | | | | |
| DPO LDBE | 0x3 | | 3 | 0x8048 | X | X | 21 | 32 | | | | |
| DPO DWs | 1 | | | | | | | | | | | |
| | | | | | | | | | | | | |
| DPO Header | 64-bit bus | | | 64 bits | 64 - | | | | | | | - 0 |
| DPO Address | 0x8048 | | Tx Order | Byte | 0 | 1 | 2 | 3 | 4 | 5 | 6 | 7 |
| DPO FDBE | 0x3 | | 1 | N/A | H0 | H1 | H2 | H3 | H4 | H5 | H6 | H7 |
| DPO LDBE | 0x3 | | 2 | 0x8048 | X | X | 21 | 32 | X | X | X | X |
| DPO DWs | 1 | | | | | | | | | | | |

Fig. 22

| Bus Width | 64-bit bus | | | 64 bits | 64 - | | | | | | | - 0 |
|---|---|---|---|---|---|---|---|---|---|---|---|---|
| Start Address | 0x8048 | | Tx Order | Byte | 0 | 1 | 2 | 3 | 4 | 5 | 6 | 7 |
| Data Len (DWs) | 2 | | 1 | 0x8048 | X | X | 33 | 22 | 44 | 88 | 99 | X |
| First DW BE | 0x3 | | | | | | | | | | | |
| Last DW BE | 0xE | | | | | | | | | | | |
| | | | | 32 bits | 32 - | | | - 0 | | | | |
| DPO Header | 32-bit bus | | Tx Order | Byte | 0 | 1 | 2 | 3 | | | | |
| DPO Address | 0x8048 | | 1 | N/A | H0 | H1 | H2 | H3 | | | | |
| DPO FDBE | 0x3 | | 2 | N/A | H4 | H5 | H6 | H7 | | | | |
| DPO LDBE | 0xE | | 3 | 0x8048 | X | X | 33 | 22 | | | | |
| DPO DWs | 2 | | 4 | 0x804c | 44 | 88 | 99 | X | | | | |
| | | | | | | | | | | | | |
| DPO Header | 64-bit bus | | | 64 bits | 64 - | | | | | | | - 0 |
| DPO Address | 0x8048 | | Tx Order | Byte | 0 | 1 | 2 | 3 | 4 | 5 | 6 | 7 |
| DPO FDBE | 0x3 | | 1 | N/A | H0 | H1 | H2 | H3 | H4 | H5 | H6 | H7 |
| DPO LDBE | 0xE | | 2 | 0x8048 | X | X | 33 | 22 | 44 | 88 | 99 | X |
| DPO DWs | 2 | | | | | | | | | | | |

Fig. 23

| Bus Width | 64-bit bus | | 64 bits | 64 - | | | | | | | - 0 |
|---|---|---|---|---|---|---|---|---|---|---|---|
| Start Address | 0x804c | Tx Order | Byte | 0 | 1 | 2 | 3 | 4 | 5 | 6 | 7 |
| Data Len (DWs) | 2 | 1 | 0x8048 | X | X | X | X | X | X | 33 | 22 |
| First DW BE | 0x3 | 2 | 0x8050 | 44 | 88 | 99 | X | X | X | X | X |
| Last DW BE | 0xE | | | | | | | | | | |
| | | | 32 bits | 32 - | | | - 0 | | | | |
| DPO Header | 32-bit bus | Tx Order | Byte | 0 | 1 | 2 | 3 | | | | |
| DPO Address | 0x804c | 1 | N/A | H0 | H1 | H2 | H3 | | | | |
| DPO FDBE | 0x3 | 2 | N/A | H4 | H5 | H6 | H7 | | | | |
| DPO LDBE | 0xE | 3 | 0x804c | X | X | 33 | 22 | | | | |
| DPO DWs | 2 | 4 | 0x8050 | 44 | 88 | 99 | X | | | | |
| | | | | | | | | | | | |
| DPO Header | 64-bit bus | | 64 bits | 64 - | | | | | | | - 0 |
| DPO Address | 0x804c | Tx Order | Byte | 0 | 1 | 2 | 3 | 4 | 5 | 6 | 7 |
| DPO FDBE | 0x3 | 1 | N/A | H0 | H1 | H2 | H3 | H4 | H5 | H6 | H7 |
| DPO LDBE | 0xE | 2 | 0x8048 | X | X | X | X | X | X | 33 | 22 |
| DPO DWs | 2 | 3 | 0x8050 | 44 | 88 | 99 | X | X | X | X | X |

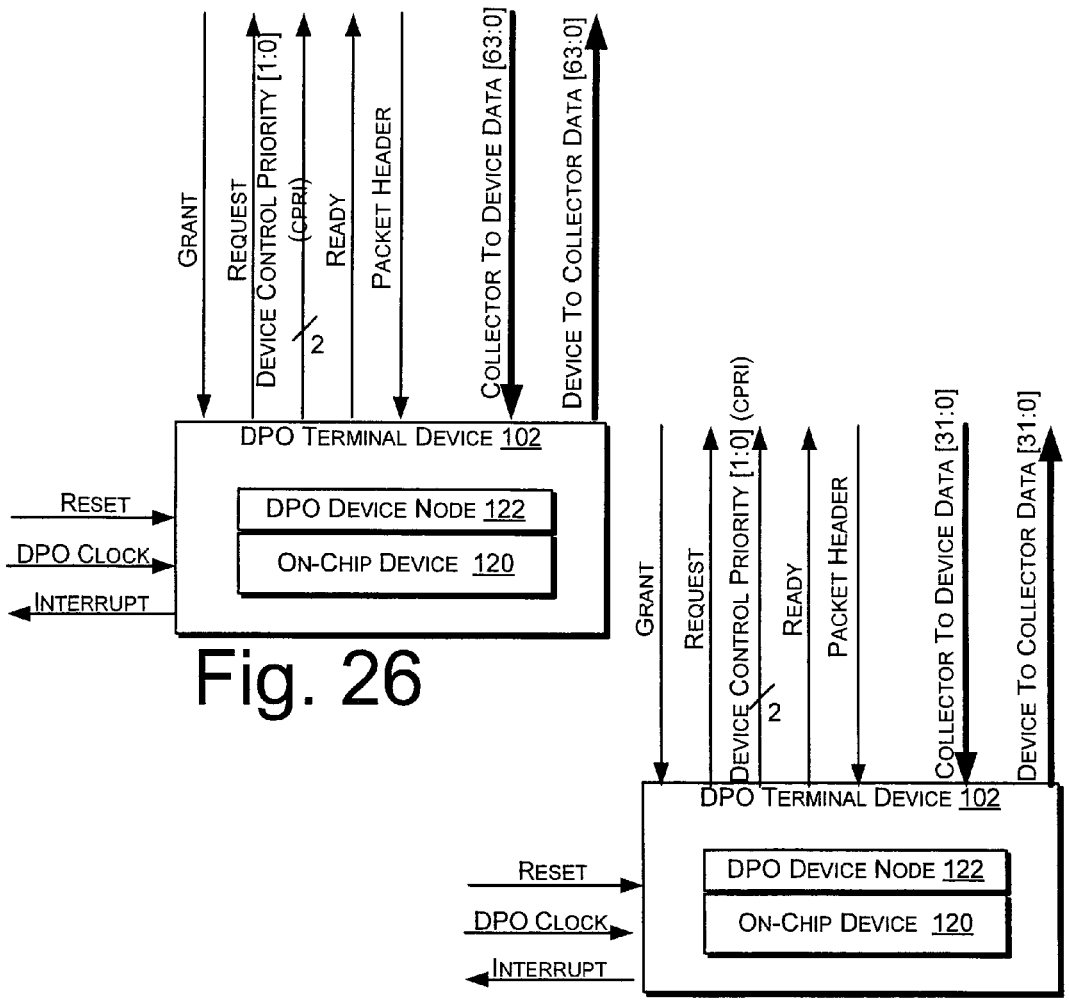
Fig. 26
Fig. 27
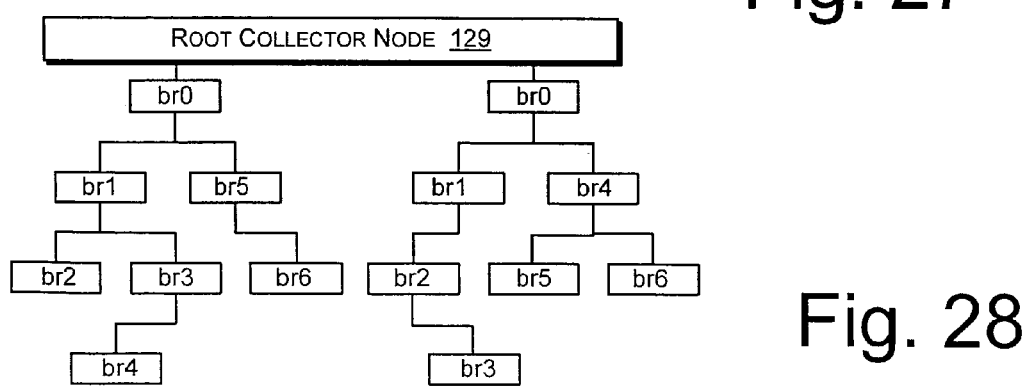
Fig. 28

ON-CHIP BUS

CROSS-REFERENCE

This application is a divisional of and claims priority to U.S. patent application Ser. No. 10/738,313, filed on Dec. 17, 2003 entitled: On-chip Bus, the disclosure of which is incorporated by reference in its entirety herein.

TECHNICAL FIELD

This invention relate to busses, and more particularly to on-chip busses.

BACKGROUND

Current on-chip busses lack the capability of arranging their components in different topologies. Scalability of on-chip busses is therefore challenging. Additionally, the electrical interface between various on-chip devices is often relatively slow since the bandwidth between them is often relatively low. This reduces the scalability of the on-chip busses within the DPO busses, and limits the rate at which these busses can transmit data. It is therefore desired to improve the performance and reliability of distributed bus systems by providing designs that can be configured into more topographical levels.

It is therefore important to improve the reliability and performance of distributed bus systems by providing designs that can be configured into various topographies.

SUMMARY

This invention relates to on-chip busses. In one version, an on-chip bus architecture is provided comprising an on-chip bus that includes a collector node and at least one device node. Each device node is in communication with an on-chip device. The collector node is capable of conducting multiple outstanding transactions with a plurality of on-chip devices over the on-chip bus wherein each on-chip device transmits all of its data signals across the on-chip bus in the form of packets. The on-chip bus includes at least one bus register, and each of the multiple on-chip devices includes at least one device register. The on-chip bus can provide top level register to register communications between the device register and the bus register. In one aspect, the on-chip bus is a distributed packet on-chip (DPO) bus.

BRIEF DESCRIPTION OF THE DRAWINGS

The same numbers are used throughout the drawings to reference like features and components.

FIG. 15 shows a table of one embodiment of the transaction ordering for the DPO bus.

FIG. 16 shows one embodiment of a packet header for a 32 bit bus.

FIG. 17 shows one embodiment of a 32 bit packet header for a completion packet.

FIG. 18 shows one embodiment of the contents of a 32 bit device, 12 byte transfer, even double word (DW) address.

FIG. 19 shows one embodiment of the contents of a 32 bit device, 12 byte transfer, odd DW address.

FIG. 20 shows one embodiment of the contents of a 32 bit device, 16 byte transfer, odd DW address.

FIG. 21 shows one embodiment of the contents of a 32 bit device, 4 byte transfer, odd DW address.

FIG. 22 shows one embodiment of the contents of a 32 bit device, 4 byte transfer, even DW address.

FIG. 23 shows one embodiment of the contents of a 64 bit device, 8 byte transfer, even DW address.

FIG. 26 shows a block diagram of one embodiment of a 64 bit DPO terminal device.

FIG. 27 shows a block diagram of one embodiment of a 32 bit DPO terminal device.

FIG. 28 shows an exemplary numbering configuration for a topography including a plurality of DPO bridge devices.

DETAILED DESCRIPTION

Figure 1:
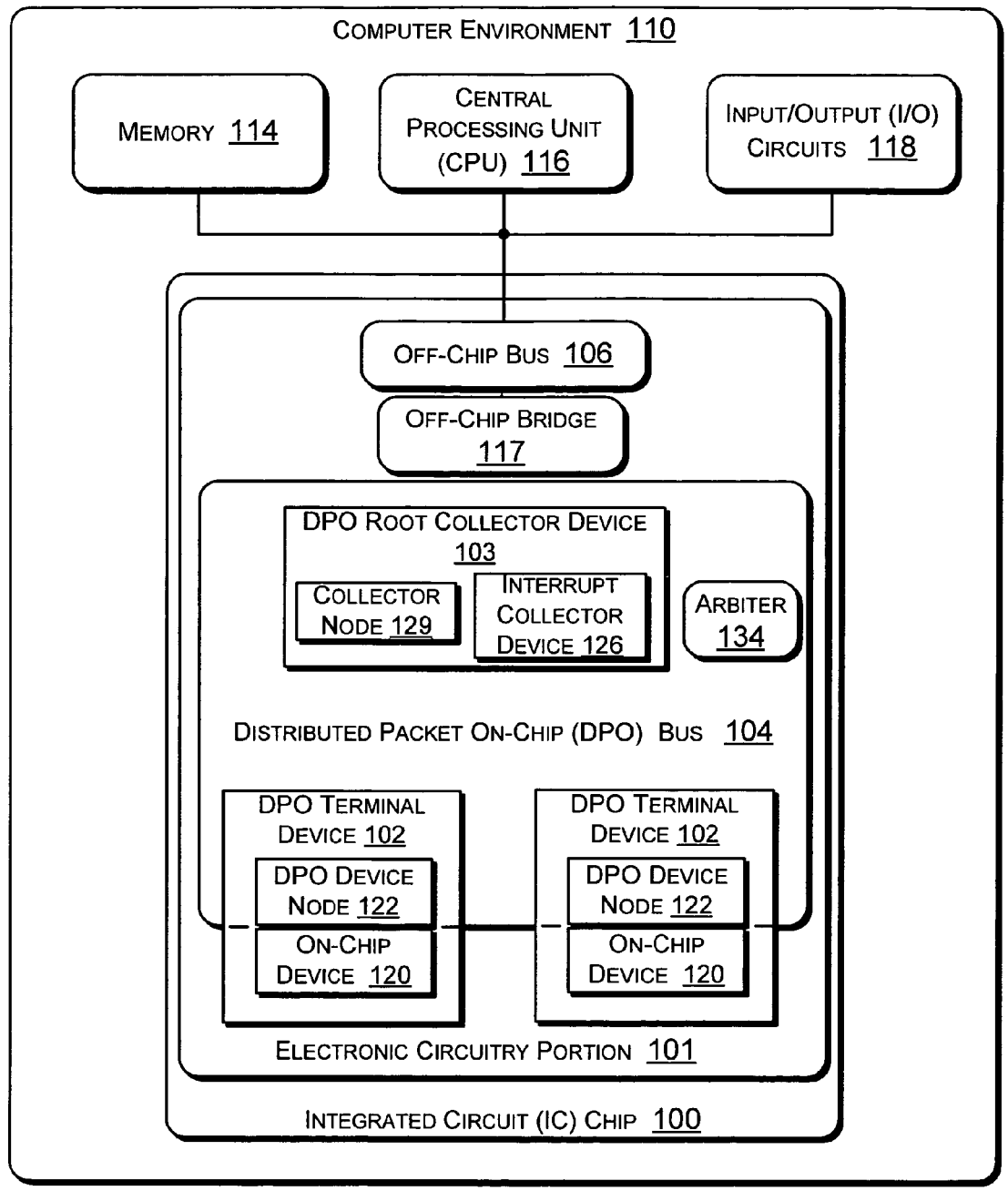
FIG. 1 is a block diagram of one embodiment of a chip including a plurality of on-chip devices that are connected using a distributed packet on-chip (DPO) bus.

A distributed packet on-chip (DPO) (or on-chip) bus provides a bus mechanism by which a number of on-chip devices can each communicate to a root collector device. The DPO bus or on-chip bus can be formed from a number of devices including a DPO root collector device, one or more DPO bridge devices, and one or more DPO terminal devices. These devices can be configured in a variety of topologies while ensuring extremely quick message turn-around for on-chip devices using the DPO bus. The DPO bus as described within this disclosure is highly scalable to provide reliable communications to a variable number of the on-chip devices. Packet-based data transmissions are provided between the on-chip devices that form the DPO bus to allow for rapid transfer of data in which the packets can be routed between the DPO root collector device and a number of the DPO terminal devices. A particular topology that the DPO bus forms with different on-chip devices can be selected when forming the DPO bus.

Each DPO or on-chip bus uses the one DPO root collector device to establish communications between the on-chip devices and off-chip devices. The DPO bus can be arranged to include one or more independent bus topologies, with each independent bus topology including one or more DPO terminal devices, each terminal device allows a connection to an on-chip device. The DPO bridge device allows for a connection of two independent bus topologies (one above the other) which together form the DPO bus. The upper-most independent bus topology therefore includes the DPO root collector device, and each lower independent bus topology includes a DPO bridge device. Each independent bus topology provides register-to-register communications between each on-chip device that is associated with that independent bus topology and either the DPO root collector device or the DPO bridge device that is associated with each independent bus topology. Such register-to-register communications can be provided for the transmission of the data packets and/or the transmission of the request/grant signals to establish the data packet transmission as described in this disclosure.

Such register-to-register communications within each independent bus topology between the on-chip device and the DPO bus provides for extremely quick and reliable packet transmission. This disclosure describes a number of embodiments and topologies of the DPO bus 104, certain embodiments are described relative to FIGS. 1, 2, 3, 4, 5, 6, 10, 11 and 30. The DPO bus 104 is physically located on the same integrated circuit (IC) chip 100 as those on-chip devices 120 that communicate via the DPO bus.

The components of the DPO bus 104 may be configured to interface and provide functionality somewhat similar to an application program such as typically operate within computer environments. Such an application program relying on the DPO bus 104 could be programmed using hardware and firmware as well as software. Examples of the application programs that can run using the combination of the on-chip devices 120 and the DPO root collector device 103 include, but are not limited to, games, word processors, spread sheets, etc. As such, the DPO bus 104 as disclosed herein can increase the on-chip data transfer rate and enhance on-chip device functionality.

Certain embodiments of the DPO bus 104 are capable of transferring increased volumes of packets of data on a chip in a reliable and scalable manner. In general, certain embodiments of the DPO bus can be configured to be sufficiently fast to handle such broadband applications as video, audio, radio, etc. The design details of the DPO bus 104 include, but are not limited to, such aspects as timings, outputs, register files, coherency, and latency as described in this disclosure.

In one embodiment, the IC chip containing the DPO bus is envisioned to be integrated within a computer environment 110 that may include one or more of a networked computer configuration, a stand-alone computer, a mainframe computer, a microprocessor, a microcomputer, a wired-network portion, a wireless network portion, an electronic device, a microelectronic device, a communication device, a computing device, etc. The computer environment 110 as shown in FIG. 1 also includes a memory 114, a central processing unit (CPU) 116, and an input/output circuit 118. Any ones of the memory 114, the CPU 116, and/or the I/O circuits 118 can be configured to operate within a networked or stand-alone computer configuration as is generally known in the art. Any one of the memory 114, the CPU 116, the I/O circuits 118, and/or other components can also be included within the IC chip 100.

One embodiment of the computer environment 110 and the associated components is further described later in this disclosure with respect to FIG. 32. The memory 114 is configured to stored data and computer programs (e.g., application programs) in a manner that can be readily accessible. The CPU 116 performs the computer processing on the data as dictated by specific application programs. The I/O circuit 118 provides for desired transfer of data between different computer components within the same computer, and different networked computers within the same computer environment.

Many embodiments of the DPO bus 104 (and the on-chip devices 120 connected thereto) as described in this disclosure with respect to FIG. 1 connect to an off-chip bus 106 via an off-chip bridge 117. Data flowing from the DPO bus to the memory 114, the CPU 116, and/or the I/O circuits 118 (which are themselves off-chip components) is configured to flow via the off-chip bridge 117 and the off-chip bus 106. Within this disclosure, the off-chip bus 106 can also be referred to as a backside bus based on its association with the off-chip bus 106. The off-chip bridge 117 and the off-chip bus 106 as shown in FIG. 1 provide a mechanism by which the DPO bus 104 can interface with the remainder of the computer environment 110 (i.e., the off-chip portions).

As shown in FIG. 1, one embodiment of the DPO root collector device 103 includes an interrupt collector device 126 and a collector node 129. Within this disclosure, the collector node 129 transmits and receives messages and data in the form of packets over the DPO bus 104 to/from a number of on-chip devices 120. The DPO root collector device 103 is also in communication with the off-chip bus 106 and the devices connected thereto (such as the memory 114, the CPU 116, and the input/output circuits 118 to perhaps over a network) via the off-chip bridge 117. As such, the collector node may be viewed as controlling the transmission of data between the on-chip device 120 and any off-chip device.

Figure 2:
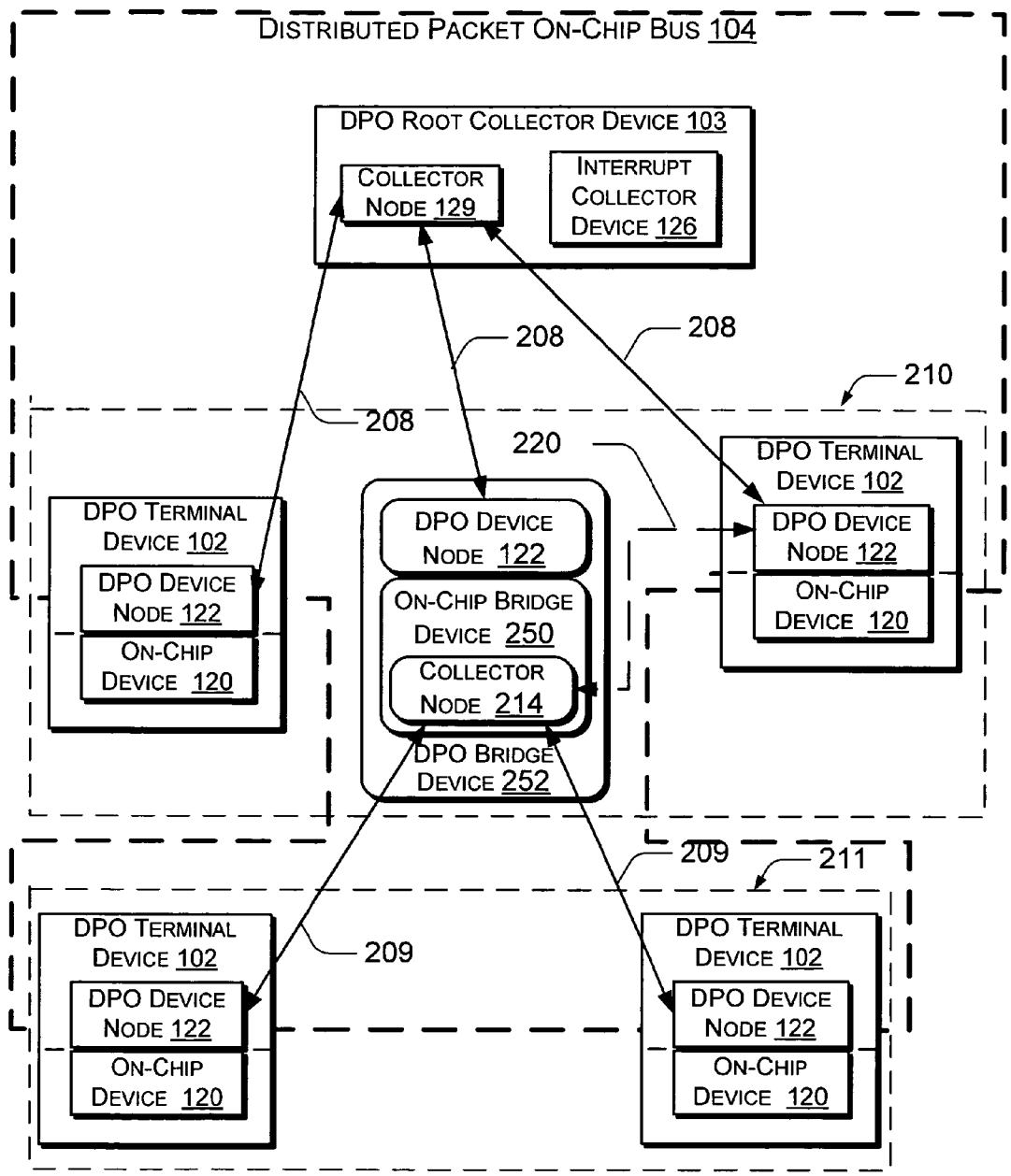
FIG. 2 is a block diagram of another embodiment of a DPO bus network topology that could be located on the integrated circuit chip shown in FIG. 1.

The interrupt collector node 126 receives and handles the flow of interrupts that were generated from the on-chip devices 120 over the DPO bus 104. While the interrupt collector device 126 is shown in FIG. 2 as being located within the DPO root collector device 103, in another embodiment the interrupt collector device 126 may be configured as another on-chip device 120 within a DPO terminal device 102.

Since different embodiments of the DPO root collector device 103 can provide different functionality and structure between the interrupt collector device 126 and the collector node 129, it is to be understood that within this disclosure, any function or operation that is described as being performed by one or more of the DPO root collector device 103, the interrupt collector device 126, and/or the collector node 129 can in actuality be performed by other ones or combinations of other ones or combinations of these respective devices. In different embodiments, the functionality and structure of the DPO root collector device 103, the interrupt collector device 126, and/or the collector node 129 can be established in software, in hardware, in firmware, or in different combinations thereof.

On-chip devices 120 are considered those computer-based or electronic devices that rely on the DPO bus to communicate or perform their normal operation. Each on-chip device 120 communicates with the DPO bus 104 via a respective DPO device node 122. Within this disclosure, the on-chip devices are capable of providing application-device type functionality (and not simply bus-like transport type functionality). Examples of on-chip devices 120 can include, but are not limited to, such illustrative electronic-based and/or computer based devices as audio devices, video devices, digital video disk (DVD) devices, hard disk drive (HDD) devices, universal serial bus (USB) devices, over-voltage protection unit (UEE) devices, Ethernet multiple access control (EMAC) devices, and flash devices.

The collector node 129 can be configured to provide a variety of topologies to on-chip devices within each independent bus topology on the DPO bus such as point-to-point, token ring, and spiral token. All of the on-chip devices 120 of each DPO bus 104 are in data communication with a DPO root collector device 103. The on-chip devices 120 of each DPO bus 104 is in interrupt communication with a single DPO root collector device 103 via the interrupt collector device 126.

The collector node 129 of the DPO root collector device 103 is in communication with the memory 114; the central processing unit 116, and the I/O circuits 118 that are included within the computer environment 110. The collector device 129 of the DPO root collector device 103 is configured as communicating to an off-chip network (not shown) via the off-chip bridge 117 and an off-chip bus bridge 106. In this manner, a number of DPO root collector devices 103 can be connected to off-chip devices via respective off-chip bridges 117 and off-chip busses 106.

The DPO bus 104 thereby establishes on-chip communications between a DPO root collector device 103 and one or more on-chip device(s) 120 as described relative to FIG. 1; and also can include one or more DPO bridge device(s) 252 to allow communications to even more on-chip devices 120 as described relative to FIG. 2. While the on-chip device are illustrated within FIG. 2 in a point-to-point topology relative to their DPO bridge device and/or their DPO root collector device, it is emphasized that the DPO bus allows for the devices involved (the DPO root collector device 103, the DPO bridge device 252, and the DPO terminal device 102 including the on-chip device) to be arranged in ring topologies, variable topologies, controllable topologies, and any combination of known existing topologies. The physical sizes of the various devices and components in the various figures within this disclosure have little relation to their physical size. For instance, in FIG. 1, the computer environment 110 can represent an entire computer network while the IC chip 100 represents a single chip in an electronic device.

The embodiment of the integrated circuit (IC) chip 100 in FIG. 1 includes at least a portion of the electronic circuitry portion 101 which, in turn, includes at least a portion of the DPO bus 104. Certain embodiments of the IC chip 100 are included within a computer environment 110. The electric circuitry portion 101 can include the DPO bus 104 that in turn includes one DPO root collector device 103, a number of DPO terminal devices 102, and none, one, or a number of DPO bridge devices 252 (shown in FIG. 2). Instead of being located within the computer environment 110 as described within this disclosure, certain versions of the IC chip 100 may also exist within an electronic device, a controller device, an electromechanical device, a microcomputer, a microprocessor, and any of the known devices that use IC chips of the type produced using semiconductor processing.

The DPO bus 100 can partially include and partially exclude the DPO terminal device 102. For instance, the DPO device node 122 of the DPO terminal device 102 is included within the DPO bus 104. The on-chip device 120 of a DPO terminal device 102 is not within the DPO bus 104. Different embodiments of on-chip devices 120 can provide different functionalities and structures to impart different overall functionality to the DPO bus 104. Each on-chip device 120 or DPO terminal device 102 can actually be configured to operate as a distinct application program, or a portion of an application program. As such, a particular IC chip 100 can be configured with particular on-chip devices 120 in a similar functional manner to how software application programs are currently loaded or downloaded into computers or computing devices.

Within this disclosure, the structure of the DPO terminal device 102, the on-chip device 120, and/or the DPO device node 122 can be configured to exist in software, in hardware, in firmware, or in different combinations thereof. Each DPO device node 122 is configured to provide communications between its associated on-chip device 120 and a collector node of either the DPO root collector device 103 as shown in FIG. 1 (or a DPO bridge device 252 as shown in FIG. 2).

Each independent bus topology 210 and 211 as shown in FIG. 2 includes any device with a collector node (including a DPO root collector device 103 and a DPO bridge device) plus those on-chip devices 250 within DPO terminal devices 102 that depend directly from that collector node. The DPO bus 104 can be arranged to provide a variety of independent bus topologies as determined by how many on-chip devices 120 and how many DPO bridge devices 252 are arranged below the DPO root collector device 103. In FIG. 1 for example, two on-chip devices 120 (each within their individual DPO terminal device 102) are shown depending from the DPO root collector device 103. These two on-chip devices represent those on-chip devices 120 within that independent bus topology formed from the collector node of the DPO root collector device 103. Since only a limited number of DPO terminal devices 102 can connect directly to any single DPO root collector device 103 based on device design rules, the one-independent bus topology of the DPO bus 104 provides for the addition of a limited number of on-chip devices 120, and therefore provides for limited scalability.

As the number of on-chip devices 120 become more numerous, it may be more difficult to contain all of the on-chip devices 120 within an independent bus topology directly from the DPO root collector device 103. The DPO bridge device 252 as shown in FIG. 2 can provide bridging and/or routing functionality between the collector node 129 of the DPO root collector device 103 and a number of DPO terminal devices 102.

Each DPO bridge device 252 includes an on-chip bridge device 250, a collector node 214, and a DPO device node 122. Structurally, the collector node 214 within each on-chip bridge device 250 may be considered as, may operate as, and may be fabricated in a similar manner as the collector node 129 within the DPO root collector device 103. Structurally, each DPO device node 122 within the DPO bridge device 252 may be considered as, may operate as, and may be fabricated in a similar manner as the DPO device node 122 within the DPO terminal device 102.

Each independent bus topology 210 and 211 as shown in FIG. 2 appears as a point-to-point topology between the different on-chip devices 120 using the DPO bridge device(s) 250, and the DPO root collector device 103, and the DPO terminal device 102. It is envisioned that the concepts described in this disclosure relative to the DPO bus 104 are also applicable to topologies other than point-to-point (such as token ring and spiral token, changeable topologies, and combinations of topologies as described in this disclosure). Different embodiments of DPO root collector devices 103, DPO terminal devices 102, and DPO bridge devices 250 can together form the DPO bus 104 into different topologies using these three devices as building blocks Certain embodiments of the various topologies that are selected for the DPO bus 104 are envisioned to be configured (for example by a system architect) as a hard-wired configuration. As such, the various connections, circuits, and network topologies can be hard-wired onto the IC chip 100. In this embodiment, the topology of the DPO bus 104 is difficult to change once it has been wired (except by the possibility of physically replacing, adding, or removing particular on-chip devices 120 or DPO bridge devices 252 in such embodiments of DPO bus that provide for such replacing, adding, or removing). With this hard-wired topology, the application programs that run on each on-chip device 120 do not have to know any specifics about the topology of the DPO bus 104 on the chip 100 as shown in FIG. 1.

For the desired DPO bus operation, each DPO device node 122 is electronically coupled to a collector node within either the DPO root collector device 103 or the DPO bridge device 252. The collector node 214 within the DPO bridge device 252 functionally interfaces with those on-chip devices 120 connected in a similar manner as the collector node 129 within the DPO root collector device 103.

Any device that communicates with the collector node 214 of the DPO bridge device 252 from below interfaces in a similar manner as with a collector node 129 of the DPO root collector device 103 as shown in FIG. 2. Any device that communicates with the DPO device node 122 of the DPO bridge device 252 from above interacts in a similar manner as with the DPO device node 122 of the DPO terminal device 102. By attaching the DPO device node 122 of a DPO bridge device 252 below a collector node 129 of the DPO root collector device 103 (or another DPO bridge device 252) as shown in FIG. 2, a number of on-chip devices 102 can be dependently attached to the collector node 214 of the DPO bridge device 252 in one or multiple independent bus topologies. All of the on-chip devices 120 that depend from a particular DPO bridge device 252 may be viewed as being clustered to form an additional independent bus topology of on-chip devices 120 that each communicate to the same device as the DPO bridge device 252.

One aspect of the present disclosure is that the DPO terminal devices 102, the DPO root collector device 103, and the DPO bridge devices 252 can all be fabricated within and/or attached to the IC chip 100 using available and well understood semiconductor processing techniques. Such techniques as generally well known in the semiconductor processing techniques can be used to produce the IC chip 100 along with the DPO bus 104 of any desired topology, and will not be further described in this disclosure. Semiconductor processing involves techniques can fabricate the IC chip 100 including the DPO bus 104 (which in turn can include different topologies of the DPO terminal device 102, the DPO bridge device 252, and the DPO root collector device 103).

The selection of particular independent bus topologies 210 or 211 as shown in FIG. 2 is seamless to the application program, the operating system, or other devices that communicate with the particular on-chip device 120 via the DPO bus 104. As such, each on-chip device does not have to be provided with software, hardware, etc. to indicate whether the independent bus topology including that on-chip device is arranged in a point-to-point, ring, or other topology.

Point-to-point and ring topologies of the DPO bus 104 allow for the on-chip devices 120 to be segmented as represented in FIG. 2 as independent bus topology 210 and independent bus topology 211 (there may also be more independent bus topologies using the DPO bus such as ring, variable, etc.). Each of the independent bus topologies 210 and 211 include one or more on-chip device 120 housed in its DPO terminal device 102. Each independent bus topologies 210 and 211 may also contain one DPO bridge device 252.

A variety of node types can be located in the different devices within the DPO bus 104. Each DPO root collector device 103 includes a collector node 129. Each DPO bridge device 252 includes a DPO device node 122 and a collector node 214. Each DPO terminal device 102 includes a DPO device node 122. The DPO bus topology 200 also includes a plurality of DPO terminal devices 102 that are arranged on the IC chip 100 similar to those shown in FIG. 1. Each collector node 129 or 214 collects data from/transmits data to one or more other dependent devices (either a DPO terminal device 102 or a DPO bridge device 252). The collector nodes 214, 129 therefore act to transfer data with the DPO device node 122 of each device (either a DPO terminal device or a DPO bus device) within the same independent bus topology. Each DPO device node 122 (included in either the DPO terminal device 102 of the DPO bridge device 252) acts to transmit data with the respective collector node 129, 214 in the above adjacent device within the same independent bus topology. The DPO device node 122 contains one or more functional on-chip devices 120 similar to those described in FIG. 1.

The DPO terminal devices 102 included in each independent bus topology 210 and 211 in FIG. 2 depend from (are below in FIG. 2) the DPO root collector device 103 (either directly or indirectly) using devices and data connections established within by the DPO bus 104. The first independent bus topology 210 includes a plurality of DPO terminal devices 102 and at least one DPO bridge device 252. The second independent bus topology 211 includes a plurality of DPO terminal devices 102 that indirectly depend from the DPO root collector device 103 via the DPO bridge device 252. As such, none of the on-chip devices 120 in the second independent bus topology 211 are in direct communication with the DPO root collector device 103.

Each DPO bridge device 252 can be configured to have additional DPO bridge device(s) 252 and/or DPO terminal devices 102 attached thereto. The addition of each DPO bridge device 252 thereby permits additional on-chip independent bus topologies 211 by connecting additional DPO terminal devices 102 to the added DPO bridge device. A number of bridges can be connected in series to form even more independent bus topologies.

A communication path 209 provides for packet-based communication between each DPO device node 122 of each DPO terminal device 102 and a collector node 214 of the connected DPO bridge device 252 within the second independent bus topology 211 as shown in FIG. 2. A communication path 208 is provided for packet based communication between each DPO device node 122 (of either each DPO bridge device 252 or each DPO terminal device 102) and the collector node 129 within the DPO root collector device 103 within the first independent bus topology 210. While there are only two independent bus topologies 210, 211 shown in FIG. 2, it is to be understood that there can be one, two, three, or more independent bus topologies within any given DPO bus.

To provide proper topological functionality within the DPO bus 104, it is envisioned that each higher-level communication path 208 (i.e., a communication path within a higher independent bus topology) can transmit either a greater or equal number of bits than any lower-numbered communication path 209. In other words, those communication paths 208 that are closer to the DPO root collector device 103 are configured to be able to carry a greater bandwidth of data than any successively lower communication path 209, in a sequential fashion.

The configuration of communication paths 208 and 209 (e.g., 16 bit, 32 bit, or 64 bit) can be chosen by the chip designer based on the required bandwidth for each one of the different on-chip DPO device nodes 122 on the chip. This use of multiple packet sizes for the different communication paths allow a bridge designer to provide simplified routing without the application program, the operating system, or any software being aware of the specific topography of the DPO bus 104.

Certain embodiments of the DPO bus 104 provide for such additional features as configurable data widths (e.g., 64, 32, or 16 bit) for the different communication paths 208, 209, depending on the on-chip topography. The data widths also relate to packet sizes within this disclosure. For instance, in one embodiment as described with respect to FIG. 2, the arrangement of nodes 129, 122, and 214 in between the DPO root collector device 103 and the upper-most independent bus topology 210 communicate over communication paths 208, each of which includes a 64 bit connection in one embodiment. The devices 102 and 252 in the next independent bus topology 211 communicates over communication path 209 that include a 32 bit connection in that embodiment.

In one embodiment, the on-chip point-to-point topology 200 that includes the DPO root collector device 103, the DPO bridge device(s) 252, the DPO terminal devices 102, the independent bus topologies 210 and 211, and the communication paths 208 and 209 as shown in FIG. 2 are intended to be illustrative in nature and not limiting in scope. As such, any similar topography of devices, nodes, independent bus topologies, and communication paths that can be provided is within the intended scope of the present disclosure. In one embodiment, all of the devices and nodes within the DPO bus 104 rely on packet transmission to transmit data (signals may be transmitted in a non-packet format).

In one embodiment, communications paths 208 and 209 are fixed or hard-wired. In other embodiments, the routing topology can be altered either by physically changing the devices/nodes within the DPO bus, or by configuring the DPO bus to allow the user to reconfigure the software, firmware, and/or hardware to alter the operation of the devices 103, 252, and/or 102 that form the DPO bus. A variety of device topographies can be provided on the chip 100 (shown in FIG. 1) while remaining within the scope of the present disclosure.

Each DPO terminal device 102 as shown in the second independent bus topology 211 is in communication with the same DPO bridge device 252. Other DPO bridge devices 252 can be configured to depend directly from the collector node 129 of the DPO root collector device 103 or another DPO bridge device 252 in the first independent bus topology 210. As such, any DPO terminal device 102 or the DPO bridge devices 252 (and the included on-chip bridge device 250) that depends directly from a DPO bridge device 252 in the first independent bus topology 210 would be included within a second independent bus topology.

The DPO bus topology 200 (that includes the multiple independent bus topologies 210 and 211) provides a means of communication along the communication paths 208, 209 to the DPO terminal devices 102 (and the respective on-chip devices 120). A given transaction can be accomplished by one or more DPO bus data 104 transfer transactions. The variations in on-chip topologies between the DPO bus 104 and different types of nodes 129, 122, and 214 as shown in FIG. 2 provide for a variety of embodiments of operational features as described in this disclosure.

It is also possible to configure the network topology wherein certain DPO device nodes 122 and collector nodes 214 can be changed between different types of topologies for each independent bus topology 210 and/or 211 as the chip 100 as shown in FIG. 1 is designed and fabricated. For example, the DPO terminal device 102 that is in the device first level and communicates with the collector node 129 uses communication paths 208. That on-chip topology could instead have been configured so this DPO device node 122 would instead communicate to the collector node 214 of the DPO bridge device 252 using the communication path 209 as shown in FIG. 2.

The DPO bus 104 therefore provides for data communications between a variety of DPO terminal devices 102, DPO root collector device 103, and bridge devices 250. In one aspect, the DPO bus 104 carries out or facilitates data transfers among a variety of on-chip devices 120. In one additional aspect, the DPO bus 104 therefore carries out or facilitates data transfer between any on-chip device 120 and the memory 114, I/O circuits 118, and/or the CPU 116 (which are each located off-chip) via the off-chip bridge 106 and the off-chip bus 106.

Figure 3:
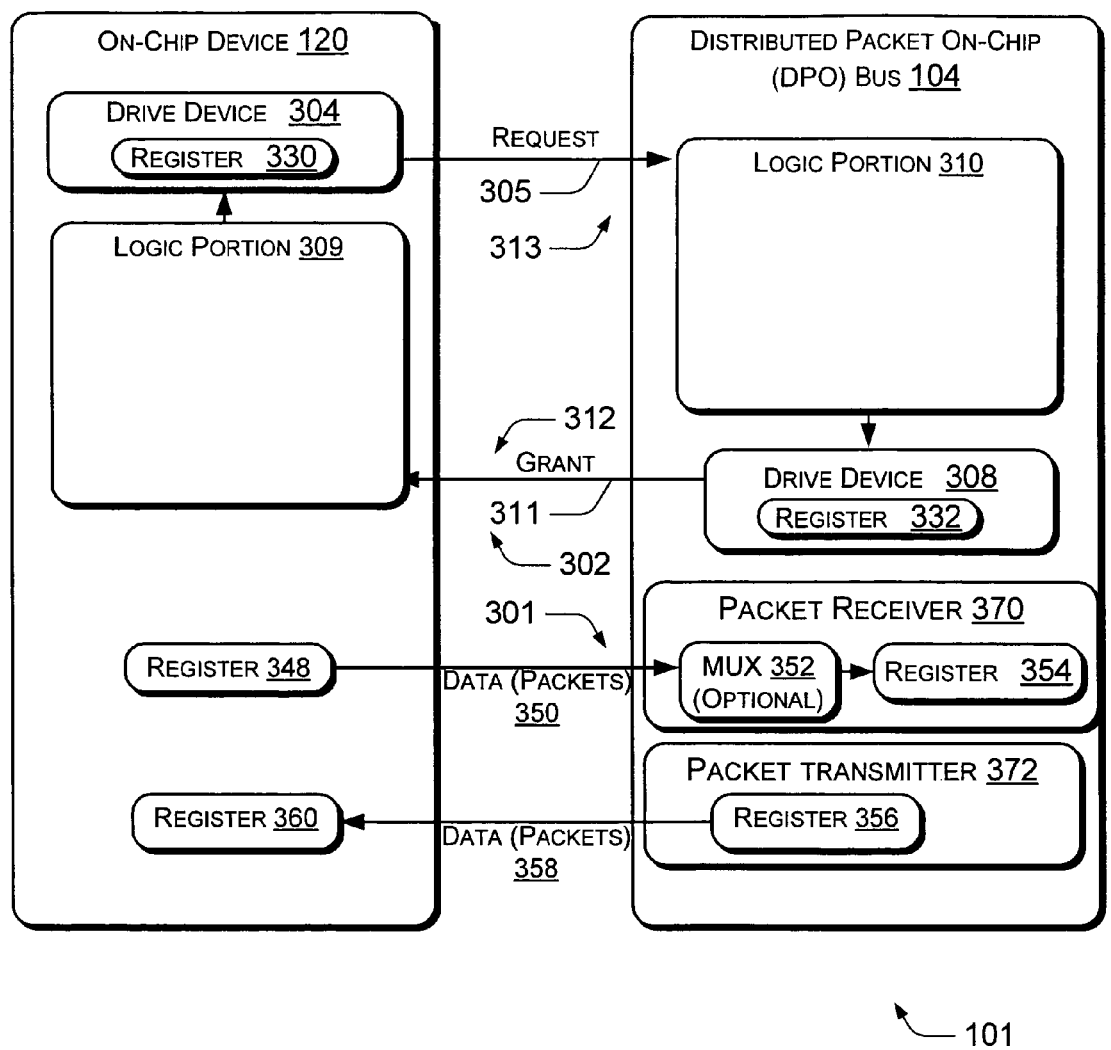
FIG. 3 is a block diagram showing one embodiment of communications using the DPO bus.
Figure 4:
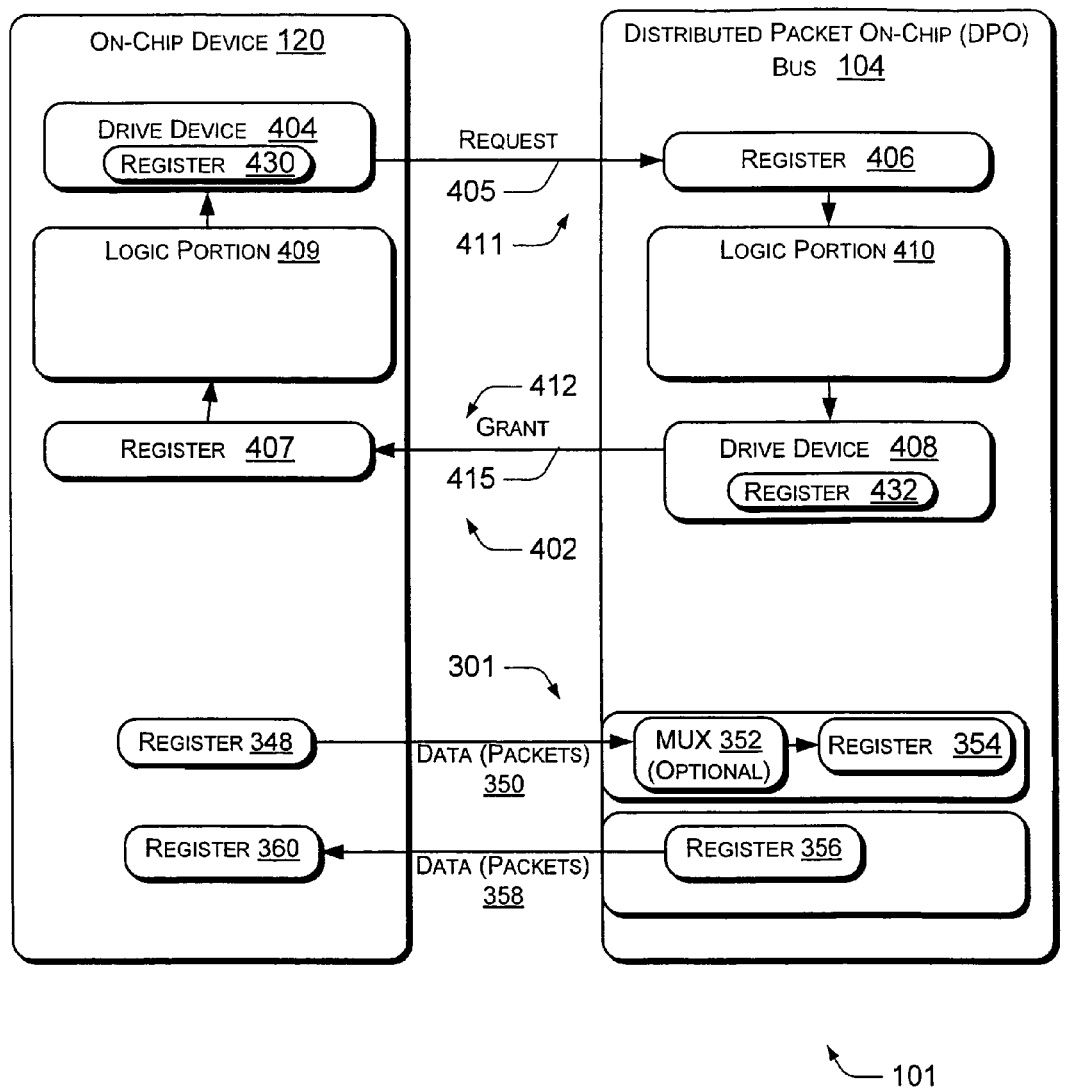
FIG. 4 is a block diagram showing another embodiment of communications using the DPO bus.

In one embodiment, the arbiter device 134 as shown in FIG. 1 provides each on-chip device with an individual bus grant signal that ensures that no two accessing on-chip devices (that have transmitted the request signal and are waiting to receive a grant signal such as are described with respect to FIGS. 3 and 4) access the bus device at the same time, by ensuring that each accessing device is provided a unique set of accessing time slots.

Each DPO bus 104 can provide a variety of features as described within this disclosure. Such features should include, but are not limited to:

a) Register to register communications between each DPO terminal device 102 and the DPO bus 104 at a high level. The arbitration scheme (one embodiment of which is described relative to FIG. 31 as provided by the arbiter 134 as shown in FIG. 1) relies on register to register communication at the top level to allow access to the DPO bus 104 by those on-chip devices that send a request signal to the arbiter 134. The arbiter 134 acts to arbitrate any two devices from accessing the DPO data bus simultaneously and transmit a grant signal to the on-chip devices. Within this disclosure, the term "register to register" indicates that for those communications between an on-chip device and the DPO bus, a device register in the on-chip device is in direct communication with a bus register in the DPO bus with the possible exception of a multiplexer/demultiplexer. This means that a pair of bus registers surrounds the logic portion within the DPO bus, and a pair of device registers surrounds the logic portion within the on-chip device as described in this disclosure with respect to FIG. 4. Since the logic on the DPO bus is designed on the same chip to interoperate with the bus registers preferably using hardware connections (although software and firmware can also be used), and since the logic on the on-chip device is designed on the same chip to interoperate with the device registers using preferably hardware connections, the logic portion can interface extremely quickly. Register to register communications at the top level can increase the speed and reliability of communications over many embodiments of DPO bus 104.

b) Split data transfers can be used in many embodiments of the DPO bus. In certain embodiments of split data transfers using the arbiter 134, a second data packet can be transmitted over the DPO bus prior to a previously transmitted first data packet being confirmed as being received. A split transaction is a transaction that requires a grant (completion) signal in response to a request signal. In a split memory write operation, the sender expects to receive a confirmation that the grant signal was completed. A posted data transfer (that differs from a split transaction) is a data transfer that does not require a grant or completion. For example, in a posted memory write operation the sender never expects to receive a confirmation as to whether the grant signal was completed.

c) A packet based transaction structure means that the data transmitted in a grant signal and/or a request signal is physically in the form of packets. The packet structure removes any necessity for side-band signals that were associated with certain prior-art bus configurations since such information can be included in the structure of the packet header. Based on the transaction involving the packet based structure, the DPO bus may be viewed as functioning at the application layer-level since functionality can be provided with the on-chip devices instead of a traditional bus protocol that only acts to transport data. For example, a user can configure the DPO bus 104 with certain on-chip devices such as audio systems, video systems, flash memory devices, etc. Packet-based transactions are almost always split transactions.

The split or posted data transfer feature and the packet based transaction structure feature are related to each other in many embodiments of the DPO bus 104. A split data transfer indicates that a request is transmitted, and some time later a grant (i.e., a completion) is received. Because packet-based means that the request and the grant are in formed as packets (they are not communicated using, e.g., sideband signals). The packet-based structure lends itself to split transactions because a distinct packet can be transmitted (and later the distinct packet is received).

Such features of DPO busses 104 are applicable to, but are not necessarily limited to, networks that can be provided with certain one(s) or all of:

a) Variable DPO bus widths that are transmitted on the same chip to different devices. For example, such DPO bus widths as 16, 32, and/or 64 bytes can be used for different independent bus topologies or for distinct devices.

b) Variable DPO bus frequencies (e.g., 75, 125, 150 MHz) that can be transmitted on the same chip to different devices.

c) DPO bus configurations that can be integrated with peripheral component interconnect (PCI), PCI-X, and PCI Express devices and protocols.

d) Possible DPO bus integration with non-PCI devices and protocols.

e) Possible use of sideband interrupts or in-band interrupts (since the side-band is not used for packet transmission).

These features are described within this disclosure. Different embodiments of the DPO bus 104 can be provided with all of, or certain combinations of, these features. For example, a DPO bus 104 within the intended scope of the present disclosure can be provided with one, a plurality of, or all of these features. One IC chip 100 associated with a one DPO bus 104 can therefore house and provide on-chip communications between networks including one or more DPO terminal devices 102.

FIGS. 3 and 4 illustrate how the use of registers in association with certain logic portions can determine the operational characteristics of the DPO bus 104. FIGS. 3 and 4 include a packet transfer portion 301 that is used to transfer packets of data. FIG. 3 includes one embodiment of a signaling portion 302 while FIG. 4 shows another embodiment of the signaling portion 402. The signaling portion (302 in FIGS. 3 and 402 in FIG. 4) is used to establish the desired communications over the packet transfer portion 301. The packet transfer portion 301 is used to transmit the packetized data during the normal operation of the DPO bus.

The packet transfer portion 301 is shown as being identical in FIGS. 3 and 4, and includes a register 348, a packet data connection 350, an optional multiplexer 352, a register 354, a register 356, a packet data connection 358, and a register 360. The optional multiplexer 352 and the register 354 are included in a packet receiver 370. The register 356 is included in a packet generator 372.

The registers 348, 354, 356, and 360 are configured to be able to ephemerally contain data that is to be transferred to another location, or is being received from another location. The packet receiver 370 is configured to receive and temporarily contain packetized data that is being transmitted from the register 348 via the packet data connection 350 in the form of packets. The packet transmitter 372 generates data in the form of packets that is temporarily contained within the register 356 before it is transmitted over the packet data connection 358 to the register 360 within the on-chip device 120. The packet data connection 350 does not form a closed loop with the packet data connection 358.

The signaling portion 302 as described with respect to FIG. 3 operates in a different manner than the signaling portion 402 as described with respect to FIG. 4 due to the relative positions of the resisters and the logic portions. As shown in FIGS. 3 and 4, each on-chip device 120 of the DPO terminal device 102 includes at least one register (330 in FIGS. 3 and 407 and 430 in FIG. 4). Each DPO bus 104 includes at least one register (332 in FIGS. 3 and 406 and 432 in FIG. 4). FIGS. 3 and 4 illustrate two embodiments of an electronically coupled DPO bus 102 and on-chip device 120 that can be integrated in the electric circuitry portion as shown in FIG. 1.

FIG. 3 shows one embodiment of an on-chip bus 120 and a DPO bus 104 that provides for a connection establishing portion 302. The embodiment of the connection establishing portion 302 of FIG. 3 involving the on-chip bus 120 and a DPO bus 104 as shown in FIG. 1 provides a register-out only communication design. FIG. 4 shows a logic and register configuration of an on-chip bus 120 and a DPO bus 104 that provides for a register-to-register communication at a high level. The register-to-register communication as shown in FIG. 4 is envisioned to provide superior and more reliable operation within the DPO bus 104, and is within the intended scope of the present disclosure. The register-out only communication design as described with respect to FIG. 3 is also within the intended scope of the present disclosure.

FIG. 3 illustrates one embodiment of a connection establishing portion 302 that can be included as a portion of the electric circuitry portion 101 as shown in FIG. 1 (which provides data communications to the on-chip devices 120 over the DPO bus). The connection establishing portion 302 includes outbound and inbound drive devices 304, 308; and outbound and inbound logic portions 309 and 310. Within this disclosure, the term "logic portion" as described relative to 309 and 310 in FIG. 3 operates with asynchronous logic since the logic within each logic portion is configured to operate asynchronously. As described relative to FIG. 3, the drive device 304 includes a register 330; while the drive device 308 includes a register 332.

As shown in the embodiment of connection establishing portion 302 described relative to FIG. 3, the on-chip device 120 includes the drive device 304 and the logic portion 309 while the DPO bus 104 includes the logic portion 310 and the drive device 308. In one embodiment, the DPO bus 104 includes the logic portion 310 and the drive device 308. In one embodiment, the drive device 304 includes a register 330; and the drive device 308 includes a register 332.

As shown in the embodiment of the connection establishing portion 302 described relative to FIG. 3, a first-direction (outbound from the on-chip device 120 to the DPO bus 104) communication path 313 extends from the drive device 304 of the on-chip device 120 through the logic portion 310 to the register 332. The first-direction communication path 313 is configured to transmit a request message 305 from the drive device 304 in the on-chip device 120 to the logic portion 310 in the DPO bus 104. The logic portion 310 in the DPO bus 104 is in communication with a drive device 308 in the DPO bus.

Depending on the complexity of the logic portion 310, a considerable number of clock cycles may be used for a request message 305 to reach the register 332. A second-direction (inbound from, the DPO bus 104 to the on-chip device 120) communication path 312 extends from the drive device 308 via the logic portion 309 to the device register 330. The device register 330 is included within the logic portion 309 in one embodiment. The second-direction communication path 312 is therefore configured to transmit a grant signal 311 from the drive device 308 to the logic portion 309. Depending on the configuration of the logic portion 309, it may require a considerable number of clock cycles for the grant signal 311 to reach the register 330.

The embodiment of the connection establishing portion 302, in actuality, often requires considerably more than the theoretical minimum two clock-cycle turn around that is required to transmit the request signal 305 and the grant signal 311 around their respective communication paths 313 and 312. This additional time is largely due to an asynchronous logic delay of the request signal 305 being transmitted through the logic portion 310. As such, the time for the request signal being transmitted within the logic portion to travel to the register 306 may take a considerable number of additional clock cycles.

This asynchronous logic delay as described relative to FIG. 3 does not occur within the embodiment of logic portion 410 as shown in FIG., 4 as described in this disclosure because the registers 406 and 432 are both external of the logic portion. It is this separation of the registers from the logic portion that can increase the reliability and speed of packet data communications between the on-chip device 120 and the DPO bus 104 (and which in turn increases the speed and the reliability of the DPO bus 104 in general). This separation of the registers from the logic portion is referred to in this disclosure as register-to-register communication at the top level.

FIG. 4 shows one embodiment of a register bus communications portion 402 in which the DPO Bus 104 as shown in FIG. 1 is configured to have a register-to-register configuration at the top level with the on-chip device 120. Within this disclosure, the term "logic portion" as described relative to 409 and 410 in FIG. 4, refers to any type of logic circuitry, gates, devices, etc. such as in a device configuration.

The register bus communications portion 402 includes outbound and inbound drive devices 404, 408; outbound and inbound logic portions 409, 410; an outbound and an inbound device registers 406 and 407. A first-direction communication path 411 extends from the drive device 404 via the device register 406 to the logic portion 410. The first-direction communication path 411 is configured to transmit a request signal 405. A multiplexer as described with respect to FIG. 7 can optionally be applied within the first-direction communication path 411. The multiplexer allows for a number of on-chip devices 120 to communicate with, and use the logic of, a single DPO bus 104. A second-direction communication path 412 extends from the drive device 408 via the device register 407 to the logic portion 408. The second-direction communication path 412 is configured to transmit a grant signal 415. The drive device 404 in the on-chip device 120 includes a register 430. The drive device 408 in the DPO bus 104 includes a register 432. A demultiplexer (not shown) can be applied to the second direction communication path 412 in those embodiments of the DPO bus that include a multiplexer inserted into the first direction communication path.

The embodiment of register bus communications portion 402 as described relative to FIG. 4 provides register to register communication at the top level from register 430 to register 406. Within this disclosure, the term "register to register communications at the top level" indicates that no logic is applied between the transmitting register and the receiving register with the possible exception of a multiplexer or a demultiplexer. Inserting logic portions (other than a multiplexer of a demultiplexer) between the transmitting register and the receiving register provides for some uncertainty for transmission time that exceeds one clock cycle. By removing the logic portions between the transmitting register and the receiving register, the transmitter is ensured to receive a response to a grant signal (or response data packets). The embodiment of register bus communications portion 402 as described relative to FIG. 4 also provides register to register communication at the top level from register 432 to device register 407. The register to register communication is provided from the on-chip device 120 to the DPO bus 104 by positioning the logic portion 410 between the registers 406 and 432. As such, it typically requires data only one clock cycle to travel from the register 406 to the register 432. The register to register communication is provided from the DPO bus 104 to the on-chip device 120 by positioning the logic portion 409 between the registers 407 and 430. As such, it typically requires data only one clock cycle to travel from the register 407 to the register 430.

The respective logic portion 409, 410 may be considered as integrated in the respective on-chip device 120 and DPO bus 104. Each logic portion 409, 410 is therefore configured to provide the logic associated with a portion of the electronic circuitry portion 101. By using register to register communications in the configuration of the register bus communications portion 402 shown in FIG. 4, the DPO bus 104 eases routing of the chip at the top level by minimizing the delay between registers. The delay between the top level registers determines the maximum frequency of the bus under normal circumstances. Any delay for the DPO bus 104 between registers at a top level is dominated by routing delay. The delay for register output only designs as shown in FIG. 3 is dominated by both routing delay and the asynchronous logic delays of the logic portions. The logic portions 409 and 410 in FIG. 4 can be fabricated as a portion of the DPO bus 104 and the on-chip bus because each logic portion is located between two respective registers located in the same respective on-chip device and DPO bus. As such, the logic of the logic portions 409 and 410 can be fabricated to be extremely fast using hardware, software, and firmware techniques. By comparison, the respective logic portions 310 and 309 in FIG. 3 are upstream of respective registers 332 and 330, but are not downstream of any respective registers. As such, the logic portions 310 and 309 generally require more clock cycles to return a grant signal once a request signal is transmitted.

Both the FIG. 3 and FIG. 4 embodiments of DPO bus 104 provide a mechanism which receives a signal from a bus and perform an action based on that signal. The action to be performed is based on the logic portions 309 and 310 in the FIG. 3 embodiment, and the logic portions 409 and 410 in the FIG. 4 embodiment. The logic portions 309 and 310 in FIG. 3 and the logic portions 409 and 410 represent the core logic of the on-chip device (s) 120 and the DPO busses 104.

In the FIGS. 3 embodiment, a respective logic portion 310, 309 is inserted between each one of their respective drive devices 304, 308 and the registers 332, 330. In the FIG. 4 embodiment, the respective logic portion 410, 409 is not located between each one of their respective drive devices 404, 405 and its respective registers 406, 407. Instead, in the FIG. 4 embodiment, the respective logic portions 410, 409 are located downstream of the respective registers 406, 407 from the respective drive devices 404, 405 in a manner that greatly reduces any asynchronous logic delays such as would more likely occur in the embodiment described with respect to FIG. 3.

As such, in the FIG. 4 embodiment of the register bus communications portion 402, the respective logic portions 410, 409 each provides register-to-register communications at a very high level from the respective registers 430, 432 (located in the respective drive devices 404, 405) to the respective registers 406, 407.

By comparison, in FIG. 3, the respective logic portions 310, 309 are not located to describe register to register communications at the top level (since the logic portions 310, 309 are not physically downstream of the respective device registers 332, 330). Communications in the FIG. 3 embodiment of the connection establishing portion 302 are therefore provided as a register-out only design that permits the asynchronous logic delays.

A memory transaction occurring using the embodiment of the DPO bus 104 having the connection establishing portion 302 (as shown in FIG. 3) requires a minimum of two clock-cycles to receive a confirmation from a request, but typically will encounter a considerably greater delay. In other words, a grant signal 311 will be returned to an on-chip device 120 within a minimum of (but likely considerably more than) two clock cycles from when a request 305 is transmitted by the on-chip device 120. It is this uncertainty of the delay that slows the transmission rate down considerably.

This two clock-cycle duration involves the drive device 304 driving its request signal 305 high in a first clock signal, whereupon the high signal level is applied to the logic portion 310. In a later clock signal depending on the duration of data within the logic portion 310, the drive device 308 within the DPO bus 104 can determine whether the request 305 has gone high. If the request 305 has gone high, the drive device 308 causes its grant signal 312 to go high (which can be detected by the logic portion 309). If the request 305 has not gone high, the drive device 308 will cause its grant signal 311 to remain low. The embodiment of logic portion 310 as shown in FIG. 3 can therefore reflect the state of the request signal 305 in the grant signal 311 within a minimum of two-clock cycles which is typically extended by a considerable number of clock cycles. The use of the terms "high" and "low" within this disclosure is arbitrary, and is not intended to be limiting in scope, and is meant to indicate two distinct writeable/readable levels within the DPO bus 104.

By comparison, the embodiment of register bus communications portion 402 as shown in FIG. 4 will require a minimum of four clock-cycles to complete a grant signal 415 to a request 405 to an on-chip device 120. In one embodiment, the request signal 405 is provided by it going high. The request signal 405 going high will be reflected at various times in the register 406 and the logic portion 410.

Based on the request signal 405 going high, the logic portion will generate a grant signal 415 that will be transmitted via the drive device 408 (including the register 432) and the register 407 to the logic portion 409. The logic portion 409 of the on-chip device 120 receiving the grant signal 415 (the received grant signal goes high) can be reflected as a completion to the request signal 405. In other words, for a memory transaction to occur using the embodiment of DPO bus 104 having the register communications portion 402 as shown in FIG. 4, a minimum of four clock-cycles are used for the logic portion 409 of the sending on-chip device 120 to receive a completion (grant signal 415) in response to transmitting a request signal 405.

The four clock-cycle minimum duration that limits the asynchronous logic delays is now described relative to FIG. 4. When the logic portion 409 of the on-chip device 120 determines that it is going to send a request signal (to request use of the DPO bus 104 from the arbiter 134), the request signal 405 is made arbitrarily high within the next (first) clock cycle. In effect, during the first clock cycle, the on-chip device 120 sends a request signal to the register 406 of the DPO bus 104. The request signal 405 is received at and stored in the register 406 following the first clock-cycle.

During the second cycle, the high request signal 405 is forwarded from the register 406 to the logic portion 410. As such, following the second clock cycle, the logic portion 410 of the DPO bus 104 determines that the request signal 405 has gone high. The logic portion 410 of the DPO bus therefore can generate a grant signal 415 (e.g., by going high) in response to the request signal 405 going high. The grant signal 415 as received at the logic portion 409 in the on-chip device 120 may be considered as a completion to the request signal 405.

During the third clock-cycle, the grant signal 415 to be transmitted from the logic portion 410 of the DPO bus 104 goes back to the on-chip device 120. Following the third clock-cycle, the register 407 reflects whether the grant signal 415 is high.

During the fourth cycle, any high state of the grant signal 415 is transmitted from the register 407 to the logic portion 409 of the on-chip device 120. The logic portion 409 receiving a high state from the grant signal 415 acts as a completion to the request signal 405, and indicates that the request signal 405 has been received and accepted by the arbiter 134 for the DPO bus 104. As such, the embodiment of register bus communications portion 402 as shown in FIG. 4 can provide a completion to a request signal with a minimum of a four cycle arbitration time, with delays being limited by the use of a pair of registers surrounding each logic portion within both the on-chip device 120 and the DPO bus to limit transmission delays that occur when a logic portion directly receives a request signal or a grant signal.

The request signal (305 in FIGS. 3 and 405 in FIG. 4) act as a request to the arbiter within the DPO bus 104 to grant the use of the DPO bus 104 to the on-chip device 120 requesting the DPO bus for some limited duration to provide the packet communication. Similarly, the grant signal (415 in FIGS. 4 and 311 in FIG. 3) act to complete (or not complete) a granting of the DPO bus 104 from the arbiter 134 of the DPO bus 104 to the on-chip device 120 that is requesting the DPO bus 104.

While the embodiment of register bus communications portion 302 as described relative to FIG. 3 has a 2 clock-cycle minimum for returning a grant signal from a request signal, certain embodiments of the register bus communications portion may take longer that these minimum clock-cycle durations due to the asynchronous logic delay. In addition, the clock cycles may not be consecutive. As such, the two clock-cycle minimum completion to a grant signal (for example) of the FIG. 3 embodiment may actually require two, three, four, five, six or more clock cycles based on known principles in asynchronous logic delays including delays in computer operation, interrupts, processing delays, data transmission delays, etc.

In the embodiment of electronic circuitry portion 101 as shown in FIGS. 1, the registers of the on-chip devices 120 are each in communication at the top (or high) level with the registers of the driving device 412 of FIG. 4. Certain versions of the DPO bus topology 200 as described in this disclosure therefore provide register to register communication at the top level as described in FIG. 4. As such, the DPO terminal devices 102 within the electronic circuitry portion 101 can be fabricated into nearly any topography by altering the topography of the process nodes (which are discussed in more detail below) while still achieving very high performance bandwidth between the different DPO terminal devices 102.

Any communication delay between top level registers is largely a result of by routing delays. The delay for the register output-only designs shown in FIG. 3, however, is dominated by both routing delay and asynchronous logic delays. As such, the time required to receive the grant signal 415 after the request signal 405 is transmitted is typically considerably less in the FIG. 4 embodiment than in the FIG. 3 embodiment.

In one embodiment, each DPO bus transaction uses one of three different packet types. In this embodiment, each of these types of packets has the same packet header size. By making the packet header the same size, the packet header can be processed and handled more efficiently by not initially considering the dimension of the packet header. The DPO bus topology 200 provides packet based transaction structure; easy integration with such protocols and devices as PCI, PCI-X and PCI Express; easy integration with non-PCI protocols and devices also; and use of sideband interrupts.

TABLE 1

Major Exemplary Definitions and Operational Parameters of DPO Bus

| | |
|---|---|
| OCB | On Chip Bus |
| OCB Clock | 150 MHz in one embodiment |
| DPO Bus | Distributed Packetization On-Chip Bus |
| Split Transaction | Operations are performed with requests and completions |
| QW | Quad Word is 64 bits, 8 Bytes, 4 words, 2 Double Words in one embodiment |
| Double Word (DW) | Double Word is 32 bits, 4 Bytes, 2 words in one embodiment |

A transaction to memory via the DPO bus occurs by the on-chip device performing a memory request (such as a read request or a write request). In response to the request, the on-chip device receives a completion from over the DPO bus.

One embodiment of the on-chip bus therefore performs a memory read/write request from an on-chip device over a DPO bus. One embodiment of the DPO Bus acts to avoid split transactions by requiring a read completion after a read request is made. Therefore, one version of data transfer includes a request and possibly a completion. In this context, a request can be considered as any packet other than a completion packet. In one version of a packet, each split transaction is framed by one of three packet types: an address packet (routed by address), a configuration packet (routed by device ID), or a completion packet (routed by device ID).

The on-chip device 120 receives the read/write completion at the on-chip device in response to the read/write request independent of any other on-chip device. In one embodiment, there is no predetermined time at which the completion is bound to the request. In present systems, on-chip devices waited to receive a completion from a first request prior to submitting another request.

In one embodiment of the present disclosure, a second request can be forwarded prior to receiving a completion from a first request. One benefit of the DPO bus 104 presently disclosed is that a completion to a first request signal (for arbitration) does not have to be received before a second request for arbitration is transmitted. This can provide for higher effective bandwidth, and is in contrast to prior art systems. For instance, consider a system where there is a turn-around time of some prescribed duration (e.g., 2 μsec) for request to memory to return as a completion. Current devices had to wait to send another request during that 2 μsec delay period. In another configuration that relies on pipelining, the second request is sent prior to return of first completion. Pipelining therefore can provide for higher effective bandwidth.

To provide for multiple independent bus topologies 210, 211 of on-chip devices 120 as described relative to FIG. 2, it is necessary that certain on-chip devices (e.g., the on-chip bridge device 252) act as both a master and a slave while other on-chip devices (e.g., the DPO terminal devices 102) act only as a slave. Within this disclosure, a master device is a device that can generate a transaction to memory or be a target of a transaction to memory, while a slave device is a device that can only be a target of a transaction to memory. As such, a device has to be a master device if it can both make and receive memory requests, otherwise it can be configured as a slave device if it can only receive memory requests. One embodiment of the DPO bus 104 does not differentiate between a master device or slave device can also be provided where both devices can generate a transaction to memory or be a target of a transaction to memory.

Figure 5:
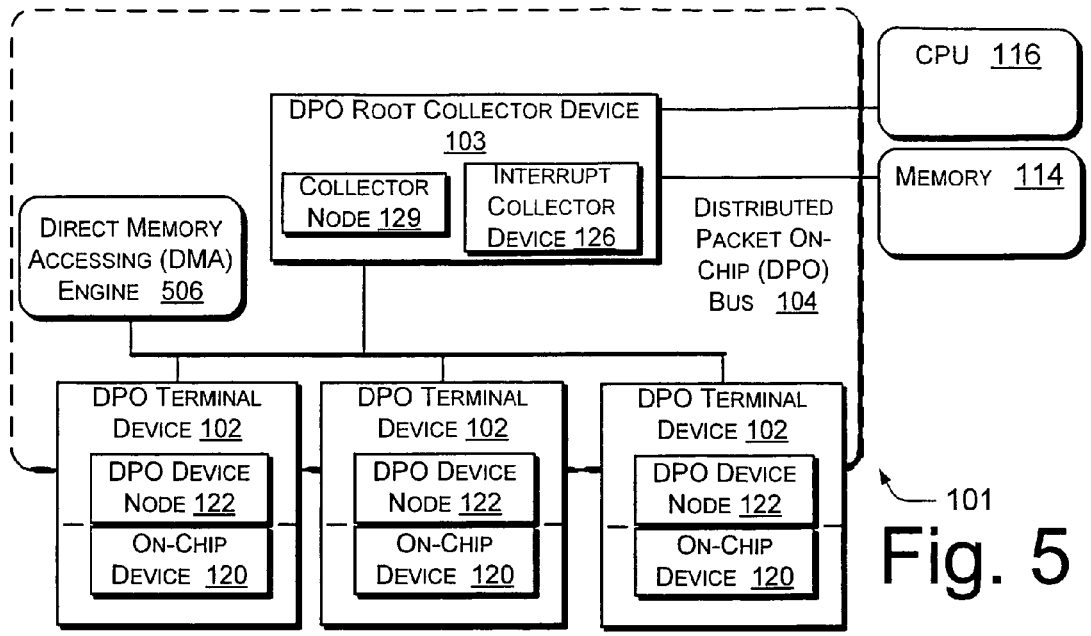
FIG. 5 is a block diagram of the DPO bus using one embodiment of a standard Direct Memory Accessing (DMA) architecture.

FIG. 5 shows one embodiment of a DPO bus 104 that can provide data communications between multiple on-chip devices 120 within the electronic circuitry portion 101 on the IC chip 100 as shown in FIG. 1. Certain portions of the electronic circuitry portion 101 can be in communication with a central processing unit (CPU) device 116 and a memory device 114. The electronic circuitry portion 101 shown in FIG. 1 includes the DPO bus 104 (e.g., the backside bus), the plurality of on-chip devices 120, and a Direct Memory Accessing (DMA) engine 506. The DMA engine 506 is configured to relieve the CPU 116 of much of the effort associated with data communication between the on-chip device 120 and the DPO bus 104.

Considering the embodiment of electronic circuitry portion 101 as shown in FIG. 5, in which a given on-chip device 120 attempts to make a memory transaction with the memory device 114, and the CPU device 116 then indicates to the DMA engine 506 to perform that particular transaction, and the CPU device performs that transaction (typically by providing a read from the DMA engine 506 to the memory device 114).

Figure 6:
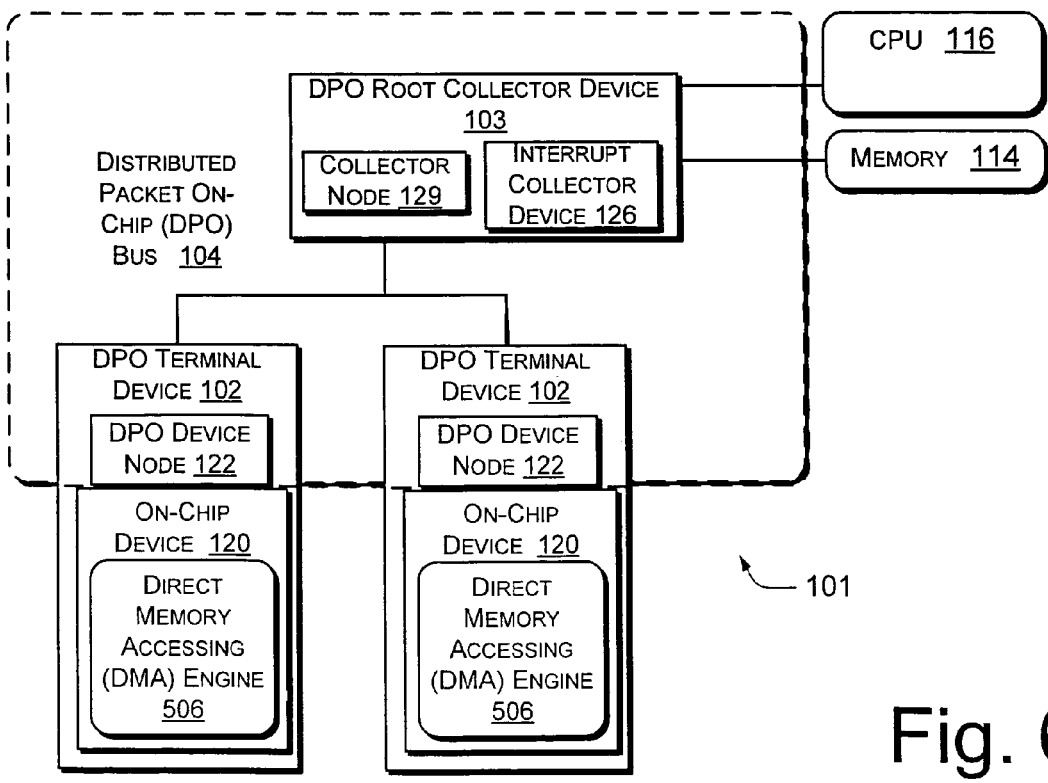
FIG. 6 is a block diagram of the DPO bus using another embodiment of DMA architecture.

FIG. 6 embodiments of the DPO bus 104 both provide for a distributed DMA architecture in which the DMA engine relieves the CPU device 116 from the burden associated with performing many of the actions associated with routing over the DPO bus 104. FIG. 6 shows another embodiment in which the DPO bus 104 can provide for data communications between multiple on-chip devices 104 within the electronic circuitry portion 101 also shown in FIG. 1. In the FIG. 6 embodiment, a distinct DMA engine 506 as shown in FIG. 5 is replaced by one integrated DMA engine 602 that is contained within each on-chip device 104. As such, in the FIG. 6 embodiment, each on-chip device 120 includes a DMA engine 602. Within the FIG. 6 configuration of electronic circuitry portion 101, each integrated DMA engine 602 allows any on-chip device 120 to become a distinct bus master. The FIG. 5 configuration includes a single bus master device (that is, the DMA engine 506), and each on-chip device 104 acts as a slaved-device.

In one embodiment, any device that does not include a DMA engine can be considered as being configured as a slave device. Devices that have DMA engines, by comparison, can be considered to be configured as both a master device and a slave device (such as a DPO bridge device 252). Devices that can generate bus traffic (and therefore have to be able to receive bus traffic) are master devices. Those devices that can only receive bus traffic are the slave devices such as DPO terminal devices 102.

One embodiment of the DPO bus provides for improving the operation of the distributed DMA topography (in which there can be multiple master devices and fewer slave devices) by providing a number of bridges, each bridge communicating with a plurality of devices. Each bridge device is configured as both a master device and a slave device.

The FIG. 6 embodiment of DPO bus 104 associating multiple on-chip devices 120 provides for alterations of on-chip topologies during the design stage. For example, the DPO bus topology 200 as shown in FIG. 2 can be modified by reconfiguring a device(s) 202 that communicates directly with the DPO bus 104 to instead communicate directly to a bridge, router, or other similar networking device (the bridge or other networking device being in direct communication with the DPO bus 104).

Such modification(s) of the on-chip topologies are typically performed prior to operation of the device and typically during the design of the DPO bus. However, retrofit bus topographical reconfigurations are also possible in certain embodiments. The DPO bus topology therefore permits a modification of topology wherein device(s) are virtually appended at a different (often lower) independent bus topology by providing communications to the device through another device that acts as an on-chip bridge or router.

Figure 7:
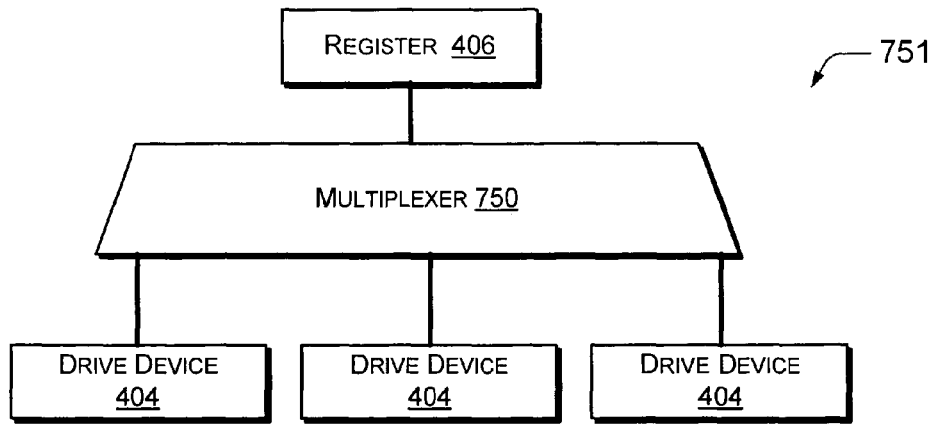
FIG. 7 shows a block diagram of one embodiment of a multiplexer that is used to select an output of the DPO bus from input signals provided from a number of on-chip devices.

A portion of the DPO bus can include a multiplexer portion 751 as shown in FIG. 7. For example, in FIG. 4, the multiplexer could be located on the request line 405 prior to the register 406. The multiplexer portion 751 includes an input register 406 (also shown in FIG. 4), a multiplexer 750, and a plurality of drive devices 404 (also shown in FIG. 4). Within this disclosure, the multiplexer 750 in general acts to combine signals from a plurality of devices 404. In those embodiments that include a multiplexer portion 751 in the request line also include a demultiplexer in the grant line 415 prior to the register 407. Whichever multiplexing/demultiplexing protocol is desired should be consistent with the packetized traffic that is being transported over the DPO bus 104. In one version, the multiplexer 750 can be viewed as performing a dumb operation (only combining multiple signals) under the control of the arbiter 134 of the DPO bus as shown in FIG. 1.

In one embodiment, the multiplexer 750 shown in FIG. 7 is configured with a reduced propagation delay/time constant as compared to other devices. The multiplexer may be viewed as a dumb asynchronous multiplexer controlled by the DPO bus arbiter 134 as shown in FIG. 1 that is used to select which data line to latch in. To provide improved performance, the multiplexer 750 is designed to introduce as little uniform delay as possible (and should operate within one-clock cycle).

The multiplexer 750 can selects an output data bus from a given downstream drive device. To improve performance in many embodiments, the multiplexer is physically located adjacent the receiving register instead of being distributed around the chip. For example, in many embodiments, the multiplexer 750 can be integrated as a portion of the collector node 129 within the DPO root collector device 103 as shown in FIGS. 1 and 2, of as a portion of the collector node 214 of the DPO bridge device 252 as shown in FIG. 2.

In different embodiments of the DPO bus 104 configurations as described herein, it takes a minimum eight system clock cycles following a read request packet targeted at a device to read a completion packet (using register to register). The eight clock-cycles include two clock-cycles to transmit the read request (e.g., over 358 in FIG. 3 or 4), four cycles to provide arbitration (e.g., 405 and 415 as shown in FIG. 4), and two cycles to provide transmission of read completion (e.g., over 350 in FIG. 3 or 4). As such, the total time from when a read request is transmitted to when the corresponding completion is received is a minimum of eight clock cycles. Since the embodiments in FIGS. 3 and 4 provide top level register to register communications at the top level at the packet transfer portion 301, the additional delays provided when the logic in both the DPO bus and the on-chip device 120 is reduced considerably. As such, the packet transfer portion 301 provides for extremely quick and consistent turnaround based on the register-to-register configuration. As such, propagation delays can have a multiplicative effect for a number of devices. In the DPO bus 104 configuration that uses multiple independent bus topologies of devices connected using bridges/routers, etc. as shown in FIG. 2, the timing constraint of the multiplexer 750 becomes more pronounced due to the multiple independent bus topologies 210 and 211 of on-chip devices 120 that signals regularly traverse.

Certain embodiments of the DPO bus 104 is a packet based on chip bus designed specifically for distributed DMA based ICs. Different embodiments of the DPO bus have a variety of high level characteristics. Certain versions of the DPO bus are designed for a distributed direct memory accessing (DMA) system. As such, different embodiments of the DPO bus topology 200 architecture have a variety of operational characteristics, configurations, and topographies that make them useful for modern chip designs. For example, certain embodiments of the DPO bus 104 provide the ability to conduct multiple outstanding transactions to ensure viability in high memory latency conditions. Certain embodiments of the DPO bus 104 avoid split transactions.

Certain embodiments of the DPO bus have a consistent and simplified header structure regardless of the DPO terminal device 102 to which the packet relates. By using a similar packet topography having an identical packet header size across the DPO bus, the DPO bus can handle all of the packets more uniformly, consistently, reliably, and efficiently. In one embodiment, the DPO bus 104 has a header structure (e.g., a simple 64-bit structure) that is consistent regardless of the packet type. Such uniform header configuration allows the DPO bus 104 to process different packets in an effective manner. In other words, the DPO bus 104 does not have to waste time in determining the packet header lengths of the individual packets. Such reduction in processing delays is especially useful in systems associating multiplexers 750 with the registers as described relative to FIG. 7.

Additionally, the architecture of the DPO bus 104 can be specifically designed to conduct multiple outstanding design requests. For instance, certain embodiments of protocols using a DPO bus can be used to transmit multiple requests over a relatively brief duration while it may require even more time to receive a signal completion.

Many of the features described within this disclosure (the independent bus topologies of multiple device connected by the DPO bus as described relative to FIG. 2, the use of multiplexers 750 with reduced propagation delay as described relative to FIG. 7, etc.) provide for other advantages such as easy timing closure of the design, maintaining packet integrity through the system, and simplifying the verification process. In many embodiments of the present disclosure, the request packet completion packet structure allows for high traffic bandwidths in a very high memory latency system.

Table 2 outlines an embodiment of types of transactions supported by the DPO Bus, the split transactions required to complete the transaction, and the packet type for each transaction.

TABLE 2

Exemplary types of transactions supported by the DPO bus

| Transaction | DPO Bus Transaction | Data Payload | Packet Type |
|---|---|---|---|
| Memory Posted Write | Memory Write Request | Yes | 32-bit Address Packet |
| Memory Read | Memory Read Request | No | 32-bit Address Packet |
| | Successful Completion | Yes | Completion Packet |
| | Error Completion | No | Completion Packet |
| Configuration Write | Config. Write Request | Yes | Configuration Packet |
| | Successful Completion | No | Completion Packet |
| | Error Completion | No | Completion Packet |
| Configuration Read | Config. Read Request | No | Configuration Packet |
| | Successful Completion | Yes | Completion Packet |
| | Error Completion | No | Completion Packet |

In one embodiment, the DPO Bus 103 has two remaining sideband signals that include a ready signal and a head signal such as those DPO devices shown in FIGS. 25, 26, 27, 29a, and 29b. Only the ready signal is actually ever used as a signal. The ready signal is a last resort signal that is not supposed to be used in standard operation except when coming out of reset. The ready signal is only used in the event that a CPU has made so many outstanding requests to a device that the device is running out of buffer space to store the requests which it must respond to. In this event it can shunt responsibility for the packet responses to the upstream device.

In one embodiment, after coming out of reset, the DPO bus 104 can assert its ready signal when it is ready to analyze incoming packets. Once the ready signal is asserted (e.g., the signal goes high) it should remain asserted until reset. The requesting device can search/snoop the incoming data bus for headers addressed to it. A device only needs to search/snoop for the header when the incoming header signal is asserted. The head signal is used by the outgoing bus to indicate the start of a packet. Without the head signal in certain embodiments, the bus would never be allowed to go idle.

An on-chip device 120 may receive a completion, configuration, memory or message. The device is responsible for either accepting the command and issuing a completion, or issuing an error completion to a given request. In many embodiments, any on-chip device 120 can not simply ignore a request. Since the CPU 116 as shown in FIG. 1 can issue a posted write to a device at any time, a device needs to have a receive buffer large enough to account for this when combined with read completions and control transactions. A device should always maintain enough free buffer space to receive the maximum expected packet size from the CPU 116.

Since the read requests issued by a reading device may come back in or out of order, it is the responsibility of that device to match a tag (not shown) that is associated with the read request. In one instance, the tag is included within the PTAG Field in the header, with the tag of the completion to determine which data has returned. In one embodiment, this only occurs if the reading device issues multiple outstanding read requests. If a device wants to perform a transaction on the outgoing DPO bus it first requests the bus according to the arbitration rules as described within this disclosure.

In one embodiment, the DPO bus can include a header enable signal which is asserted when a header is on the bus. There is no chip select line on this interface. Many versions of an on-chip device 120 searches/snoops a header to a packet to determine whether the packet is addressed to that device. In one embodiment, on-chip devices 120 ignore any packet on the interface that is not addressed to it. If the packet target is the device it needs to capture the data payload if needed.

Figure 8B:
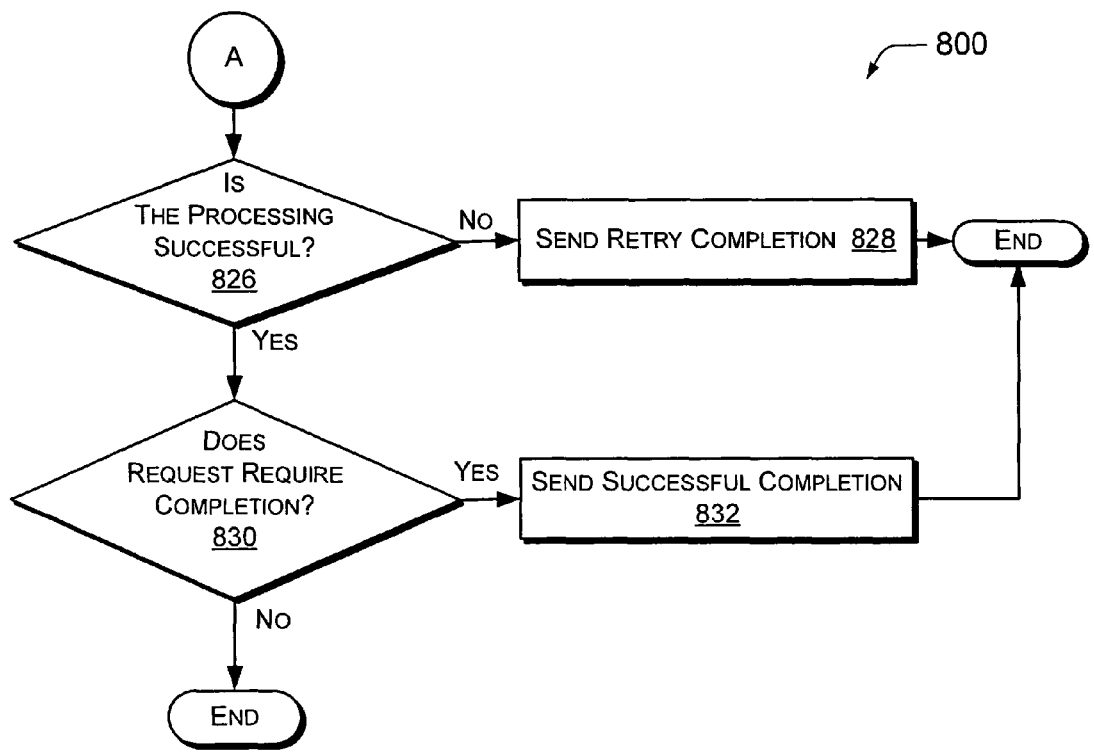
FIGS. 8a and 8b show a flow diagram of one embodiment of a request packet process.
Figure 8A:
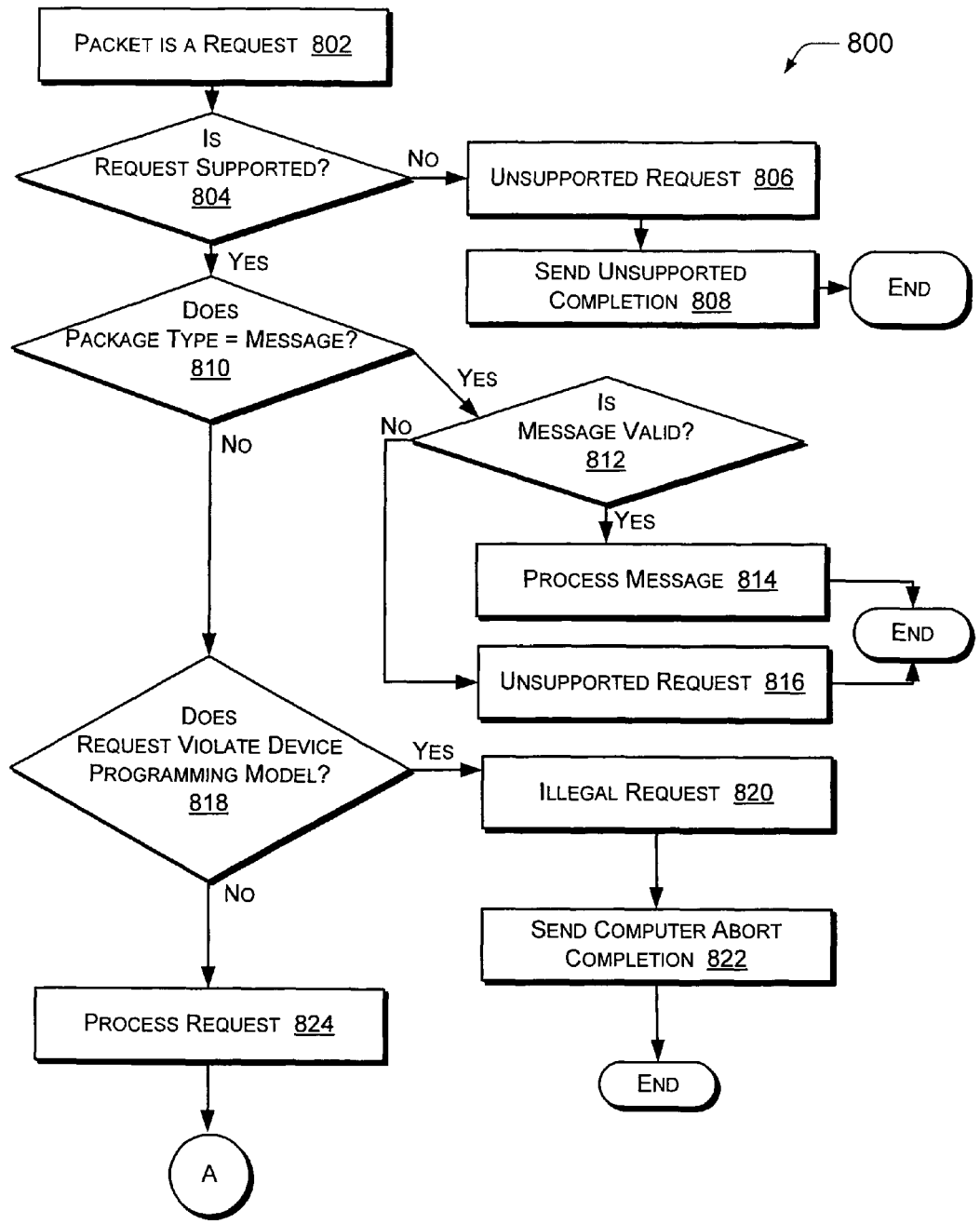

For one embodiment of request packets, the device can follow the embodiment of the request process 800 as shown in FIGS. 8a and 8b. For one embodiment of completion packets, the device then follows the embodiment of the completion packet process shown in FIGS. 9a and 9b. Any of the processes shown in FIGS. 8a and 8b and/or 9a and 9b can be performed within a computer environment 110 as shown in FIG. 1 using known computer programming techniques.

The request process 800 as shown in FIGS. 8a and 8b includes operation 802 in which it is determined that the packet is a request. The request process 800 continues to decision 804 in which it is determined whether the request is a set of request types that are deemed permissible in the protocol. If the answer to decision 804 is no, then the request process 800 has determined that the process is unsupported in operation 806, and the request process ends with providing an unsupported completion in operation 808.

If the answer to decision 804 is no, then the request process 800 continues to decision 810 in which it is determined whether the packet type of the packet received in operation 802 is of a message data type. If the answer to decision 810 is yes, then the request process 800 continues to decision 812 in which the contents of the message are considered, and it is determined whether the message received in 802 is valid. The message is determined to be valid if the message follows the expected format of messages transmitted via the DPO bus.

If the answer to the decision 812 is yes, then the message received as determined by decisions 810 and 812 is processed in the operation 814, and the request process 800 terminates. If the answer to the decision 812 is no, then the request process 800 continues to the operation 816 in which the request received in the operation 802 is indicated as an unsupported request (and not a message) and the request process 800 is terminated.

If the answer to the decision 810 is no, then the request process 800 as shown in FIGS. 8a and 8b continues to the decision 818 in which it is determined whether the request violates a prescribed model for the request packet as prescribed by a comparison with the model parameters as stored in the on-chip device. Every request should have a prescribed header configuration of a given size, and the size of the packet body can vary as examples of a packet model. If the packet does not follow the prescribed format as set forth in the packet model, then a comparison of the format of a received packet to the format of an expected request packet will indicate that the received packet at the on-chip device is not a request packet. If the answer to the decision 818 is yes, then the request process 800 continues to an operation 820 in which it is determined that the request received in the operation 802 is an illegal request, and the computer environment is sent an abort/completion message in the operation 822 thereupon the request process 800 is terminated.

If the answer to the decision 818 is no, then the request process 800 processes the request in the operation 824. The request process 800 reaches the decision 826 in which it is determined whether the processing in the operation 824 of the packet received in the operation 802 was successful. If the answer to the decision 826 is no, then the request process 800 continues to the operation 828 in which a retry completion message is sent. If the answer to the decision 826 is yes, then the request process 800 continues to the decision 830 in which the computer environment determines whether the request requires a completion message. If the answer to the decision 830 is no, then the request process 800 terminates. If the answer to the decision 830 is yes, then the request process 800 continues to 832 in which a successful completion is sent to the transmitter of the package.

Figure 9A:
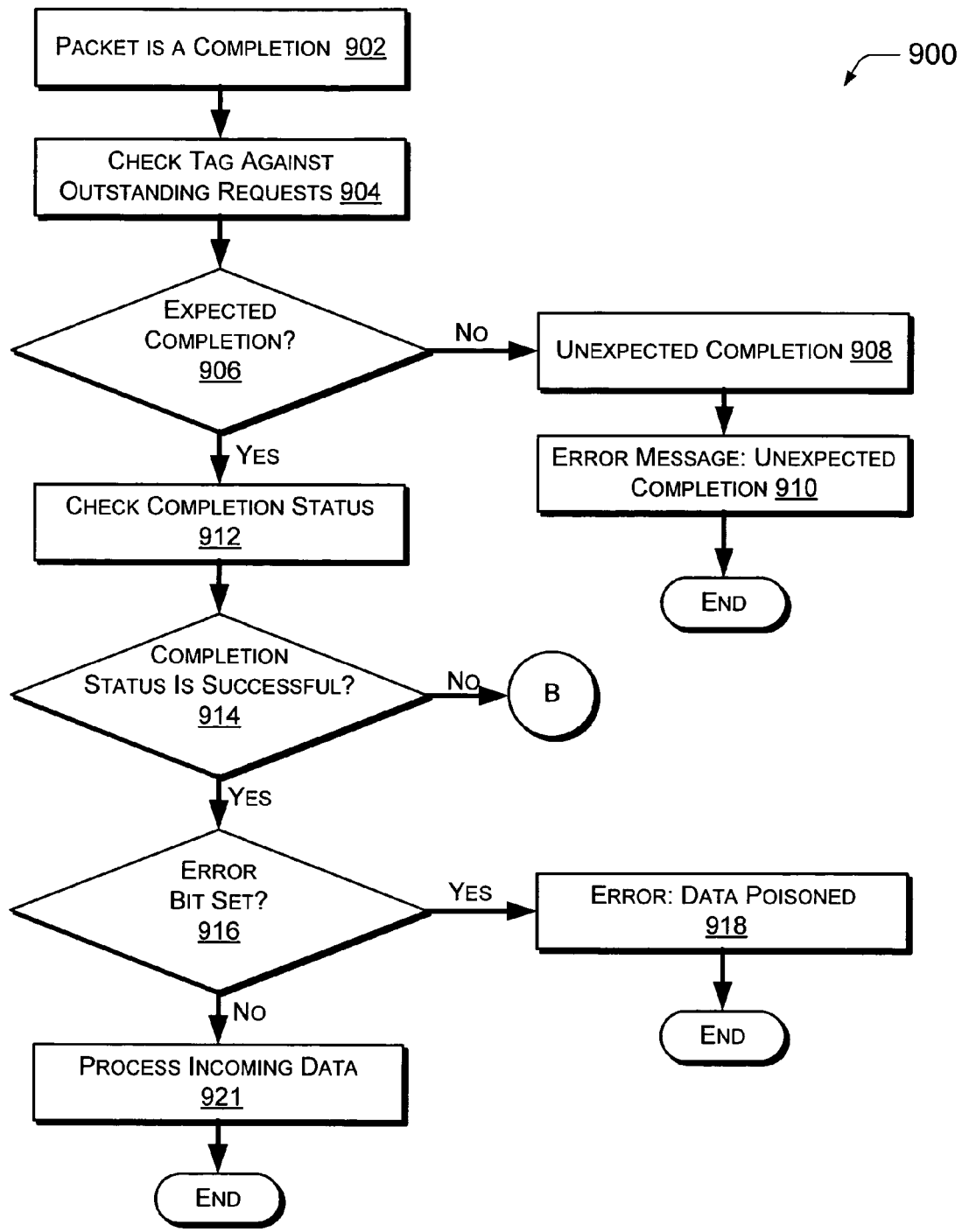
FIGS. 9a and 9b shows a flow diagram of one embodiment of a completion packet process.
Figure 9B:
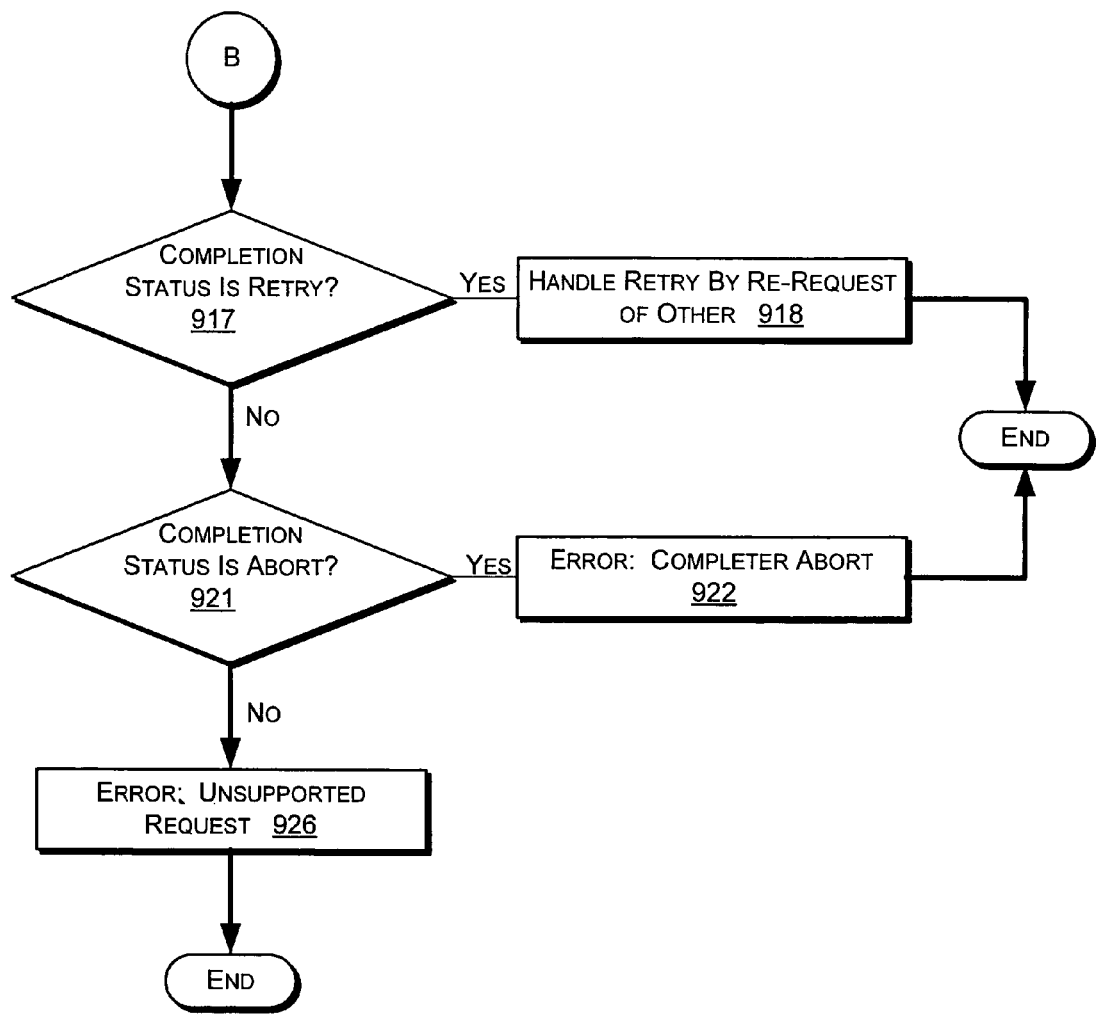

FIGS. 9a and 9b shows one embodiment of a completion packet process 900. The completion packet process 900 includes an operation 902 that determines whether the packet is completed. In an operation 904, the tag of the packet is checked against outstanding requests. In a decision 906, the completion packet process 900 determines whether a completion is expected (e.g., whether a request has been transmitted previously from which a request from that specific node is anticipated). If the answer to the decision 906 is no, then the completion packet process 900 continues to an operation 908 in which an unexpected completion is encountered, and in operation 910 an unexpected completion message is provided. Following 910, the completion packet process 900 terminates.

If the answer to decision 906 is yes, then the completion packet process 900 continues to an operation 912 in which the completion status is checked. The completion packet process 900 then continues to decision 914 in which it is considered whether the completion status is successful. If the answer to the decision 914 is no, then the completion packet process 900 continues to a decision 917 in which it is determined whether the completion status is a retry.

If the answer to decision 917 is yes, then in operation 918, the retry handle is passed to another by re-request, and then the completion packet process 900 is terminated. If the answer to decision 917 is no, then the completion packet process 900 continues to 921 in which it is determined whether the completion status is an abort. If the answer to decision 921 is yes, then the completion packet process 900 sends an error/completer abort message in operation 922, and the completion packet process 900 then terminates. If the answer to decision 921 is no, then the request is unsupported as determined in operation 926. The completion packet process 900 then displays an error/unsupported request message, and the completion packet process 900 is then terminated.

If the answer to decision 914 is yes, then the completion packet process 900 continues to decision 916 in which it is determined whether the error bit is set. If the answer to decision 916 is yes, then the completion packet process 900 continues to operation 918 in which an error/data poisoned message is sent. If the answer to the decision 916 is no, then the completion packet process 900 continues to operation 921 in which the incoming data in the completion packet is processed, and the completion packet process 900 is then terminated.

In one embodiment, the outgoing DPO Bus Port includes a data bus and arbitration signals. The arbitration signals determines which DPO terminal device 102 can use the DPO bus 104 when there is a conflict between a plurality of the on-chip devices 120. When the device wants to write to this port it first arbitrates for the bus following the arbitration rules. The outgoing DPO bus port can be used to send memory space requests as well as memory and configuration space completions.

Figure 10:
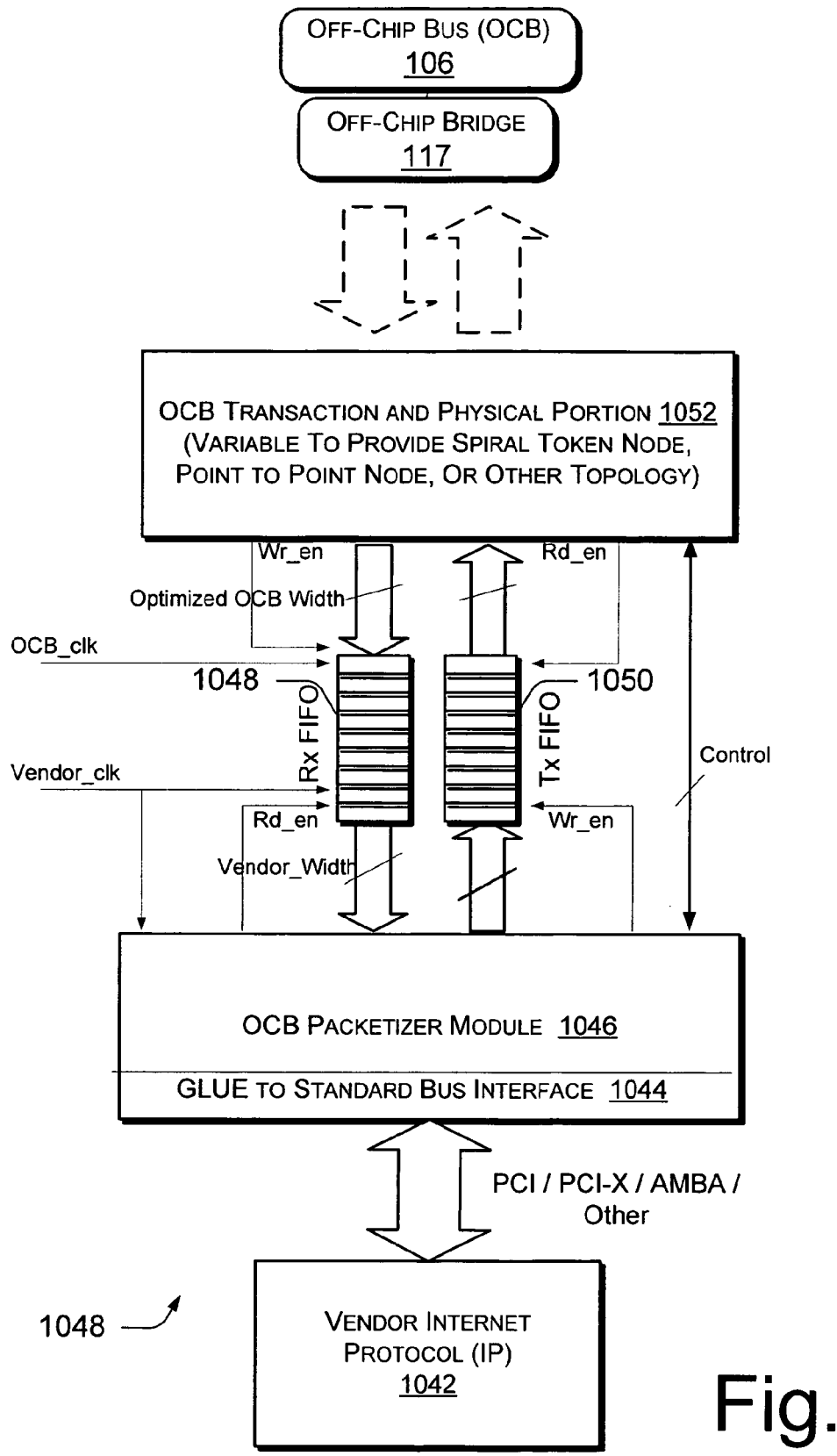
FIG. 10 is a block diagram of an embodiment of another embodiment of DPO bus network topology involving FIFO devices in which the topology can be modified.

FIG. 10 shows a block diagram of another embodiment of DPO bus network topology portion 1040 that can be modified under the control of the user to provide different DPO bus topographies for any ones of the independent bus topologies. The DPO bus network topology portion 1040 includes at least two FIFO devices: a receiving FIFO 1048 and a transmitting FIFO 1050. The DPO bus network topology portion 1040 is configured to make the selection of any particular on-chip physical layer arbitrary so the topology can be selected based on the software and operating system operation to provide different topologies as described relative to FIGS. 1, 2, 3, and 4. For example, it is not necessary to use a physical point-to-point network topology as described relative to FIG. 2 when connecting the DPO terminal devices 102 to the DPO root collector device 103, but instead the user can select the point-to-point configuration or a token ring topography in hardware/firmware.

The DPO bus network topology 1040 as described with respect to FIG. 10 includes: a vendor Internet Protocol (IP) device 1042 (that may be considered as one embodiment of DPO terminal device 102); a glue to standard bus interface 1044; an off-chip bus (OCB) packetizer module 1046; a receiver first-in first-out (FIFO) 1048; a transmitter FIFO 1050; an off-chip bus transaction and physical portion 1052; an off-chip bridge 117, and an off-chip bus 106 as described relative to FIG. 1. The off-chip bus provides a data communication path with one embodiment of the memory 114, the CPU 116, and/or the I/O circuits 118 of the computer environment 110 as described relative to FIG. 1.

The off-chip bus transaction and physical portion 1052 determines the type of physical layer interface for the off-chip bus 106. The off-chip bus transaction and physical portion 1052 may be considered as another type of physical layer interface. The OCB transaction and physical portion 1052 can be configured using software, firmware, and/or hardware in a point-to-point network topology similar to as described relative to FIGS. 2, a token ring network topology, or alternatively in a spiral token network topology as described in this disclosure relative to FIG. 11. In certain embodiments, the network including the off-chip bus transaction and physical portion 1052 can include a number of different topologies arranged either in series or in parallel.

In one embodiment, the off-chip bus (OCB) packetizer module 1046 converts data from that protocol (or standard) which is operating at the network provider 1042 to that protocol (or standard) at which the on-chip bus 1054 is operating. Once the OCB packetizer module 1046 is configured, the transmit FIFO 1050 is configured so each time the OCB packetizer module contains a packet to transmit to the OCB transaction and physical portion 1052, the packet will be transmitted over the transmit FIFO 1050 in the order the packet is received. Once the OCB packetizer module 1046 is configured, the receive FIFO 1048 is configured so each time the OCB transaction and physical layer portion 1052 is ready to transmit a packet that can be received by the OCB packetizer module 1046, the packet becomes transmitted over the receive FIFO 1048 in the order the packet is received. The computer software contained within the on-chip devices 120 can run without being concerned with, or designed for, the particular network topology (e.g., point-to-point, token ring, or spiral token) provided by the OCB transaction and physical portion 1052.

The glue to standard bus interface 1044 is an interface that connects the vendor IP 1042 and the OCB packetizer module 1046 in a manner that provides communications between the dissimilar protocols and bus topographies. As such, in one embodiment the OCB packetizer module 1046 is included as a portion of each DPO terminal device 102 as shown in FIGS. 1, 2, and 4. The OCB packetize module 1046 converts between the protocol of the vendor IP and the protocol of the OCB packetizer module 1046 using the glue to standard bus interface 1044.

Once the conversion is provided using the glue to standard bus interface 1044, packet transmission can occur by completing each packet, then those data packets being transmitted from the OCB transaction and physical portion 1052 to the OCB packetizer module are briefly located in the receive FIFO 1048. Those data packets being transmitted from the OCB packetizer module 1046 to the OCB transaction and physical portion are briefly retained in the transmission FIFO 1050.

Using the controllable topography as shown in FIG. 10, the physical layer can be disjointed from the remainder of the logic. As such, the software and the operating system can operate within a particular DPO terminal device 102 as described relative to FIG. 1 whether the DPO bus 104 can be functionally configured to have a point-to-point, a token ring, a spiral token, or another desired topography.

Figure 11:
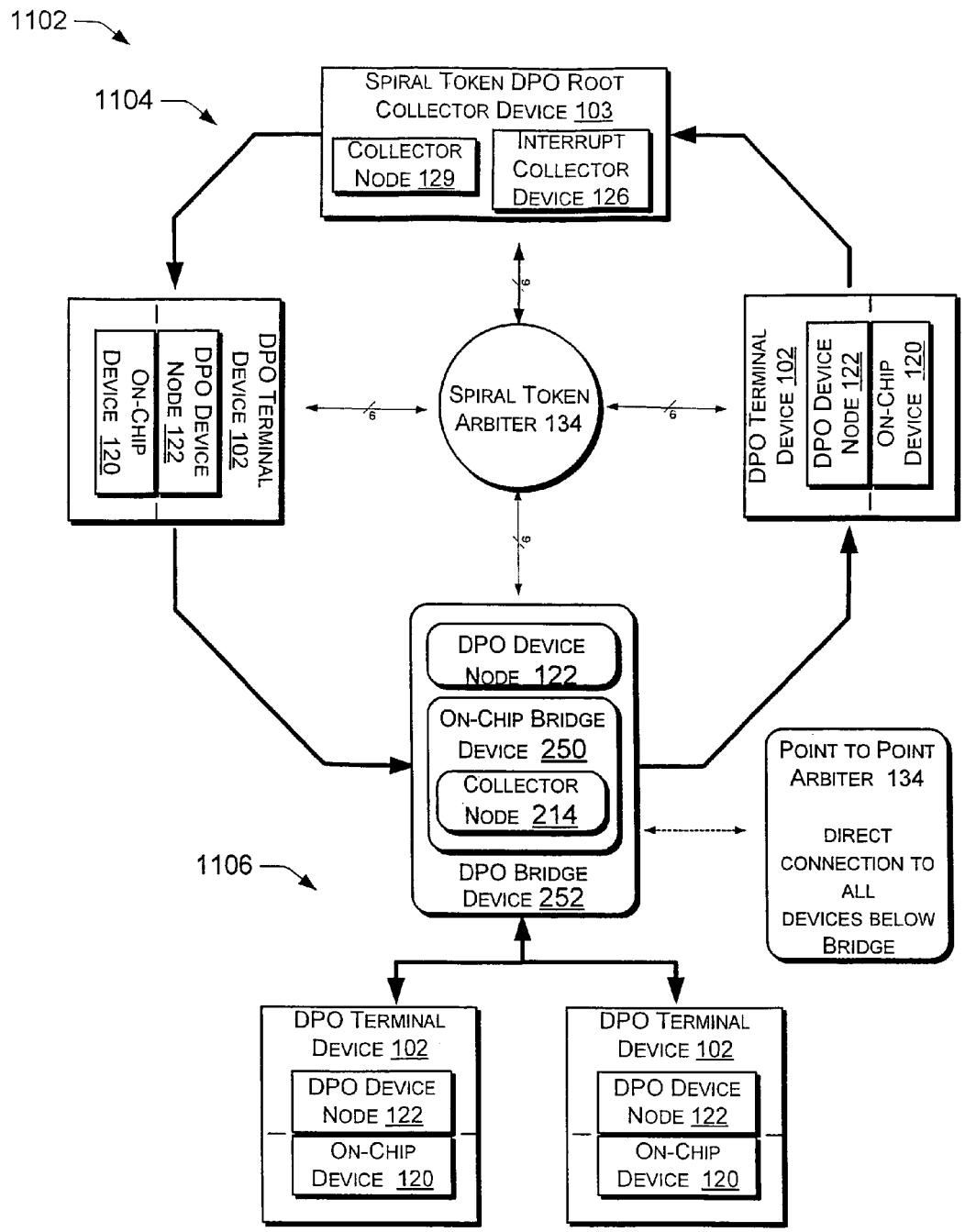
FIG. 11 is a block diagram of another embodiment of a DPO bus involving a number of topologies, the upper topology is in the form of a ring while the lower one is a point to point topology.

Not only can the DPO bus be configured in different on-chip device topologies, but different portions of a DPO bus circuit can use different topologies. FIG. 11 shows that the DPO bus 104 can seamlessly provide for different topologies of DPO bus (and a combination of embodiments). For example, the point-to-point (top-down) network topography is generally described within this disclosure relative to FIGS. 1, 2, 3, and 4. FIG. 11 shows a network topology 1102 including two distinct bus topologies 1104 and 1106. The upper token independent bus topology 1104 of the network topography 1102 is configured as a token network topography (that may include a token ring, a spiral token, other similar token network topographies). The lower token independent bus topology 1106 is arranged as a point-to-point topology. Within the independent bus topologies 1104, a number of device nodes 122 of the DPO terminal devices 102 can include a ring topology including a spiral token DPO collector 1108. The spiral token DPO root collector device 103 includes a spiral token collector node 129 and a spiral token interrupt collector device 126 that operate in a similar manner (but within and as adapted for a different network topology) as the point-to-point embodiment of the DPO root collector device 103 that contains the collector node 129 and the interrupt collector device 126 as described relative to FIGS. 1 and 2. Token ring and spiral token network topographies in general are well known in network technologies, and will not be further described herein.

The DPO terminal devices 102 within the upper token independent bus topology 1104 can include one or more DPO bridge devices 252 as described relative to FIG. 2. Within the upper token independent bus topology 1104, the DPO terminal devices 102, the DPO bridge devices 252, and the spiral token DPO collector 1108 are configured in a token topography. All of the DPO terminal devices 102 and the DPO device node 122 of the DPO bridge devices 252 within the embodiment of the upper token independent bus topology 1104 as shown in FIG. 11 are arbitrated by the central token arbiter 134 (that operates according to token topographies).

As shown in FIG. 11, the DPO bridge devices 252 upper token independent bus topology 1104 can form a collector for the DPO terminal devices 102 within the second independent bus topology 1106. While the independent bus topology 1106 of the embodiment of the network topography 1102 as described relative to FIG. 11 includes the DPO terminal devices 102 arranged in a point-to-point topography, in actuality the DPO terminal devices 102 can also be arranged in a token, spiral token, or any other network topography that can exist on the DPO bus 104 as described within this disclosure.

Figure 12A:
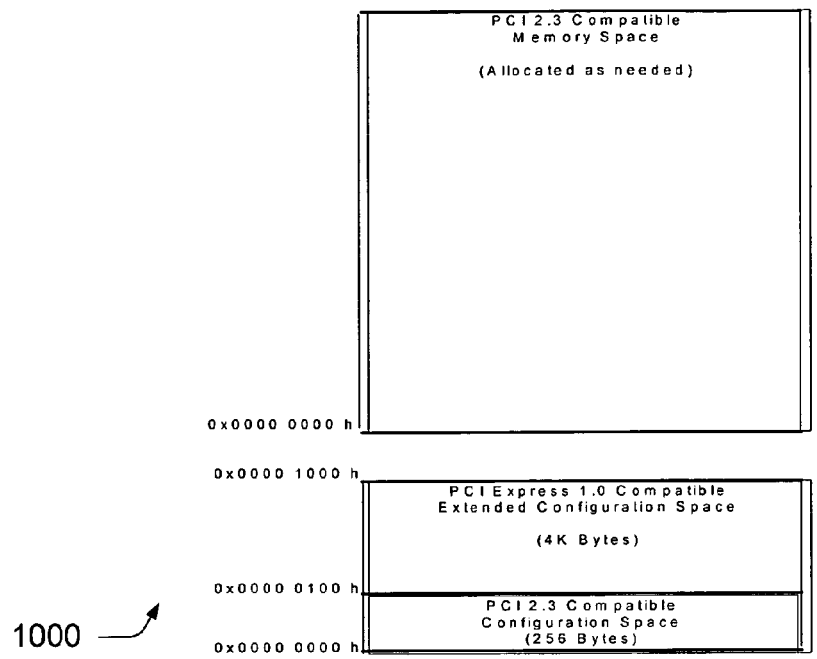
FIG. 12a shows a block diagram of one embodiment of a device memory map.

A variety of memory maps can be used to provide on-chip device memory functionality. FIG. 12*a* shows one embodiment of a DPO bus device memory map 1000 that can be used to simplify the DPO Bus 104. A similar memory map for PCI and non-PCI devices can be used. PCI devices on the DPO bus 104 can have the same memory map as a single PCI endpoint device-function.

Figure 12B:
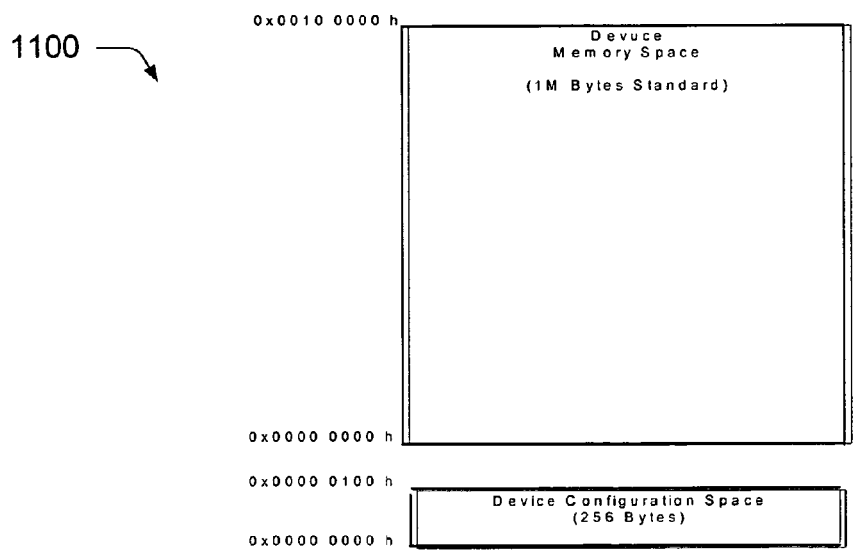
FIG. 12b shows a block diagram of another embodiment of a device memory map.

One embodiment of the memory map 1100 for non-PCI devices is shown in FIG. 12*b*. Configuration transactions can only target registers in the configuration space. Memory transactions can only target registers in the memory space.

The memory is allocated on a device-function basis. If a device requires more than the allotted space of configuration space, it allocates another function number for more configuration space. In one embodiment, a device does not use memory space, but uses a configuration space. The mapping of registers in the configuration space can be device-dependent. Configuration transactions can be addressed by device, function and register number in certain embodiments.

Figure 13:
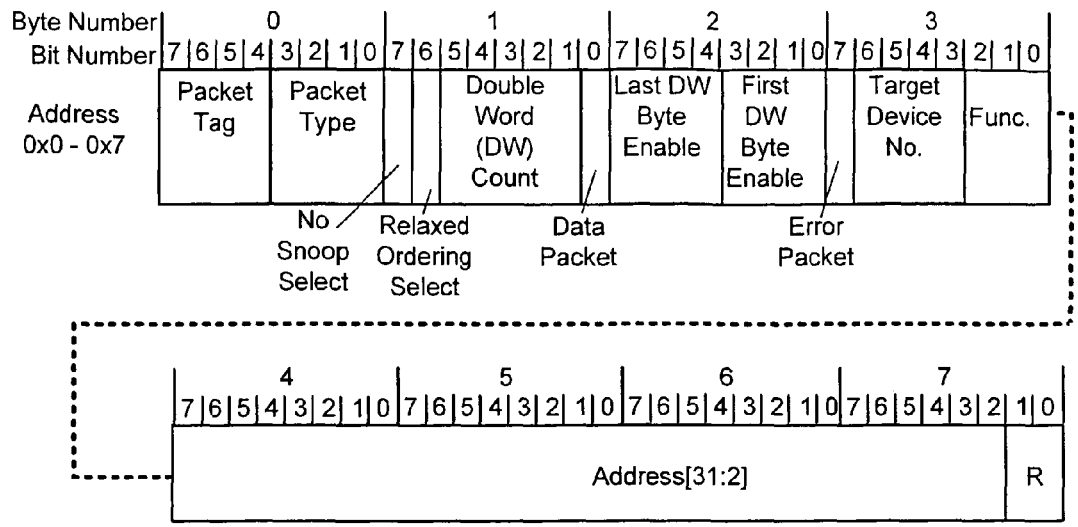
FIG. 13 shows one embodiment of a 32-bit address packet header format for a 64-bit bus.
Figure 14:
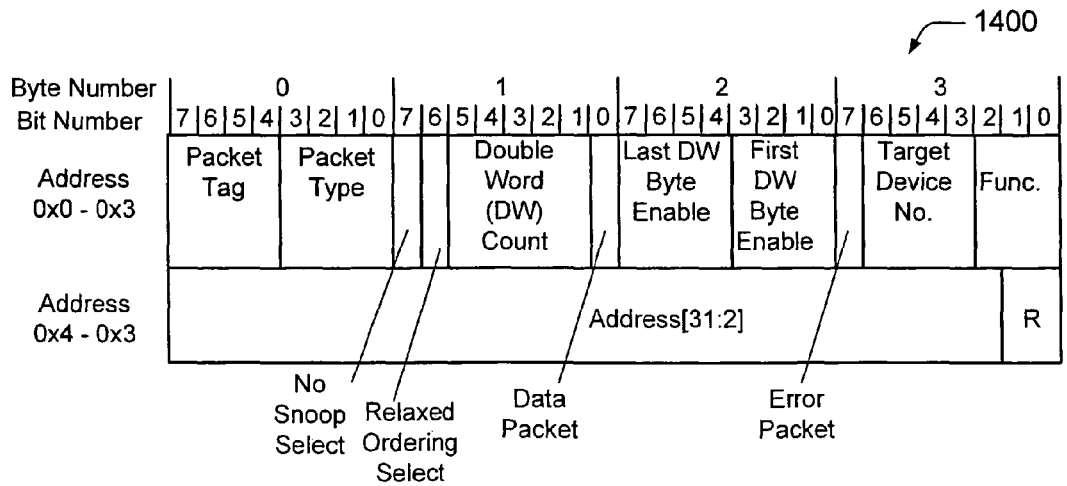
FIG. 14 shows another embodiment of a 32-bit address DPO bus address header format for a 32-bit bus.

Certain respective embodiments of a DPO bus address header format 1300, 1400 are shown respectively in FIGS. 13 and 14. FIG. 13 shows one embodiment of a 32-bit address packet header format for a 64-bit bus. FIG. 14 shows an embodiment of a 32-bit address DPO bus address header format for a 32-bit bus. The FIG. 13 embodiment of the DPO bus address header format 1300 is contained within a single packet, while the FIG. 14 embodiment of the DPO bus address header format 1400 is spread among two packets. Memory transactions addressed to a device use the 32-bit address as described relative to FIGS. 13 and 14 which can be fully decoded.

In one embodiment of the electronic circuitry portion 101 as shown in FIG. 1, all packet headers can have the same size (e.g., 32-bit as shown in FIGS. 13 and 14) regardless of the type of packet. In one embodiment of the electronic circuitry portion 101, each packet header follows the big-endian format (although little endian or other formats are also possible in other embodiments). As such, using similar formats for the packets, etc. through the electronic circuitry portion reduces confusion as to handling of the DPO bus, and typically increases throughput of data and increases speed and reliability of data transfer.

Table 3 describes fields of one embodiment of the 32-bit address header as shown in FIGS. 13 and 14.

TABLE 3

Exemplary fields in address header

| | |
|---|---|
| DP | Data Packet |
| DC[4:0] | DW Count (Note DW is 32-bits) |
| PTYP[3:0] | Packet Type |
| EP | Error Packet |

TABLE 3-continued

| Exemplary fields in address header | |
|---|---|
| PTAG[3:0] | Requester Packet Tag |
| FUNC[2:0] | Target Function Number |
| DEVN[3:0] | Target Device Number |
| NS | No Snoop (Search) Select |
| RO | Relaxed Ordering Select |
| FDBE[3:0] | First DW Byte Enables |
| LDBE[3:0] | Last DW Byte Enables |
| ADDR[31:2] | 32-bit Address DW Aligned |

The embodiment of data packet field shown in Table 3 is used to determine whether the logic looks for a data payload after the packet header or not as described in Table 4.

TABLE 4

| Exemplary data packet fields | | |
|---|---|---|
| Data Packet | DP | Description |
| Control | 0 | Packet Consists of Header Only |
| Data | 1 | Packet Consists of Header Followed by DC[4:0] Data Cycles |

One embodiment of a data Double Word (DW) Count field as described in Table 5 describes the length of the data in DWs.

TABLE 5

| Exemplary data double word count fields | |
|---|---|
| Double Word Count DC[4:0] | Description |
| 00001 | 1 DW (4 Bytes) |
| 00010 | 2 DWs (8 Bytes) |
| 11111 | 31 DWs (124 Bytes) |
| 00000 | 32 DWs (128 Bytes) |

The DPO Bus considers a double word (DW) to be 32-bits (or 4 Bytes). Since there is no difference in header format for each width, no information is presented in the header that describes the bus width. Though the data width does not affect the header, it does affect the data payload and data alignment. Consider the references in this disclosure to data transfer for different data alignment cases. The embodiment of packet type field illustrated in Table 6 describes the type of transaction to be performed by the packet in one embodiment of the disclosure.

TABLE 6

| Exemplary packet type fields | | |
|---|---|---|
| Packet Type | PTYP[3:0] | Description |
| MemRd | 0000 | Memory Space Read Request |
| MemWr | 0001 | Memory Space Write Request |
| CfgRd | 0100 | Config Space Read Request |
| CfgWr | 0101 | Config Space Write Request |
| Cpl | 1000 | Completion (IOWr, CfgWr, Errored MemRd) |
| CplD | 1010 | Completion with Data (MemRd, IORd, CfgRd) |
| Msg | 1100 | Message Request |

The configuration writes to memory having completions. Memory writes are posted, and thus have no completion packet. A flush operation is used to check status of memory writes.

Figure 30:
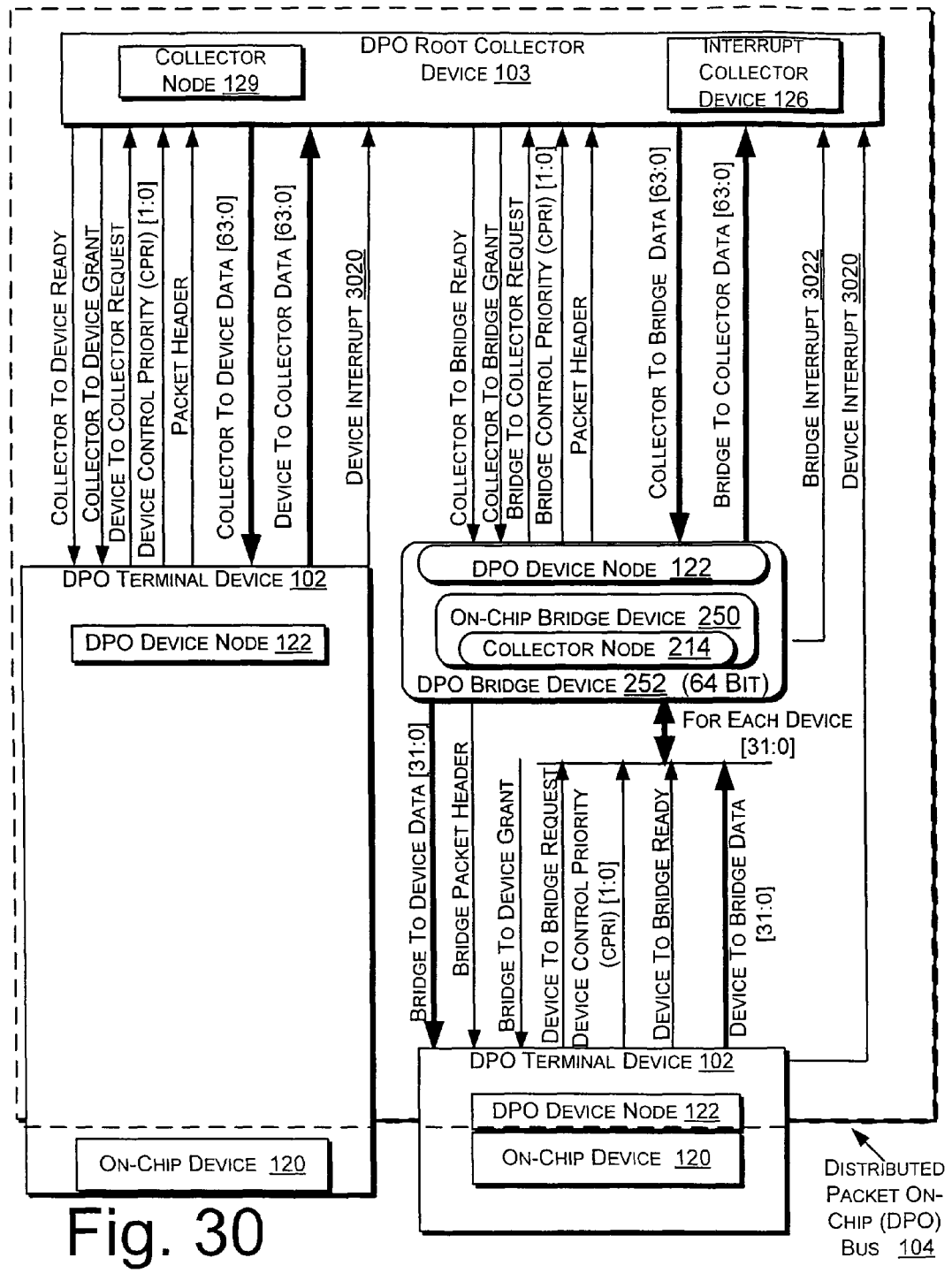
FIG. 30 shows an exemplary inter-node connection to form a DPO bus including a DPO root collector device, a number of DPO terminal devices, and a DPO bridge device.

Interrupts can be provided using a sideband to the DPO bus 104 as described. For example, in FIG. 30, a device interrupt 3020 extends between each DPO terminal device 102 and the DPO root collector device 103 (more particularly the interrupt collector device 126, with the connection not shown). Additionally, a bridge interrupt 3022 extends between each DPO bridge device 252 and the DPO root collector device 103 (more particularly the interrupt collector device 126, with the connection not shown). The other connections (that generally relate to data packet transmission) from either the DPO bridge device 252 or the DPO terminal device 102 to the DPO root collector device 103 as shown in FIG. 30 connects to the collector node 129 within the DPO root collector device 103 (with the connections not shown). Since the functionality of the sideband portion that carries the interrupt signals is largely removed using the embodiment of DPO bus 104 by using packets transmitted within the data bus in place of data transmitted in the sideband, the sideband portion can be used for such functions as interrupts. It is thereby left up to the on-chip device to implement interrupt reporting abilities via its register space. A device has a single interrupt signal. In one embodiment, devices on the DPO Bus can expect latencies (e.g., on the order of 2 to 3 microseconds for certain DPO busses) for a single read transaction to main memory. This is the time from when the read request is sent to when the completion returns with data, and takes into account other system latencies and arbitration delays.

This can be used to gauge the number of outstanding read requests a given device will require. For example, in one version a device requesting 128 bytes of memory per request can achieve the following read bandwidths for varying numbers of outstanding pipelined requests as shown in Table 7.

TABLE 7

| Exemplary Performance of DPO bus Based on Number of Pipelined Request | | | | |
|---|---|---|---|---|
| Pipelined Requests | Data Payload | Latency | Request Period | Approximate Bandwidth |
| 1 | 128 byte | 2 μs | 2 μs | 64 MB/sec |
| 2 | 128 byte | 2 μs | 1 μs | 128 MB/sec |
| 3 | 128 byte | 2 μs | 666 ns | 192 MB/sec |
| 4 | 128 byte | 2 μs | 500 ns | 256 MB/sec |

Transaction Ordering

FIG. 15 describes one embodiment of the transaction ordering for the DPO Bus using a posted request packet, a non-posted request packet, and a completion packet. The transaction described in the row can, cannot or can optionally pass the transaction in the column. The transaction ordering does not reflect whether a specific set of transactions is ordered or not.

The field relaxed ordering (RO) in the packet header designates whether relaxed ordering is enabled or not. In one embodiment, memory writes will not pass other memory write or message requests, unless the relaxed ordering bit is set. If the relaxed ordering bit is set, then the functionality is optional. In another embodiment, posted memory writes pass memory read requests. In one embodiment, posted memory writes pass or optionally can pass read completions depending on RO. In certain embodiments, read requests can not pass memory write operations or message requests which improve the device flush operation.

In yet another embodiment of DPO bus 104, read requests can optionally pass other read requests, or other completions. In still another embodiment, read completions can not pass memory writes or message requests if the relaxed ordering bit is clear. This improves the CPU flush operation that is used to check the status of memory writes by limiting the flush to consider only memory write operations. This improves read completions for different transactions, but if a read completion is segmented the segments return in order.

A memory read request of length 1 cycle, with all byte enables off, is called the flush operation. The flush operation lets a requester ensure that previous posted writes have been completed at the destination as shown in Table 8.

TABLE 8

Exemplary memory address description

| ADDR[31:2] | Description |
| --- | --- |
| DWaddress | DW Aligned Memory Address. The remaining bytes can be selected via the byte enable signals. |

Table 9 provides one example of a packet tag description field. Table 10 provides one example of a packet function description field. Table 11 provides one example of a device description field.

TABLE 9

Exemplary packet tag fields

| Packet Tag | PTAG[4:0] | Description |
| --- | --- | --- |
| DevTag | 0000 to 1111 | 1 of 16 possible tags for an outstanding transaction from any given device-function. The packet tag for posted transactions can have any value. |

TABLE 10

Exemplary function description fields

| Function Number | FUNC[2:0] | Description |
| --- | --- | --- |
| Fn0 to Fn7 | 000 to 111 | One of eight possible functions for a given device. Each device implements at minimum function 0, but can implement as many as if chooses up to eight. |

TABLE 11

Exemplary device fields

| Device Number | DEVN[3:0] | Description |
| --- | --- | --- |
| Dev0 to Dev15 | 0000 to 1111 | One of sixteen possible device numbers for a given device. All system device numbers should be unique for a given bus number. |

Two other important variables include Requester ID and Transaction ID. The Requester ID consists of the bus, device and function number. The device number and the function number are described with respect to Table 3, while the bus number is described with respect to Table 11. The Transaction ID consists of the Requestor ID and the Packet Tag. The Requestor ID is also called the Completer ID, depending on whether the formation contained in the cell is describing a transaction's requester or completer. One embodiment of a configuration Packet Header Format includes a requester ID and a packet tag. Table 12 provides an exemplary configuration for a packet header for a 32 bit bus as shown in FIG. 16.

TABLE 12

Exemplary configuration packet header for a 32-bit bus

| Field | Description |
| --- | --- |
| DP | Data Packet |
| DC[4:0] | Double Word (DW) Count |
| PTYP[3:0] | Packet Type |
| EP | Error Packet |
| PTAG[3:0] | Requester Packet Tag |
| FUNC[2:0] | Target Function Number |
| DEVN[3:0] | Target Device Number |
| NS | No Snoop (Search) Select |
| RO | Relaxed Ordering Select |
| FDBE[3:0] | First Double Word (DW) Byte Enables |
| LDBE[3:0] | Last Double Word (DW) Byte Enables |
| Requester ID[6:0] | DEVN[3:0] and FUNC[2:0] of the requester |
| Register[7:2] or | 32-bit access allows for 256 Bytes of register space per function |
| Register [7:3] | 64-bit access allows for 256 Bytes of register space per function |

The type of register transaction is determined by the value in the DC[4:0] field. In one embodiment, a configuration transaction is only legal if the Last Double Word Byte Enables (LDBE) and First Double Word Byte Enables (FDBE) fields are identical, certain illustrative cases are shown in Table 13.

TABLE 13

Last double word byte enables (LDBE) and first double word byte enables (FDBE) fields

| DC[4:0] | LDBE[3:0] | FDBE[3:0] | Description |
| --- | --- | --- | --- |
| 00000 | XXXX | XXXX | Illegal |
| 00001 | 0000 | XXXX | 32 bit transaction |
| 00001 | XXXX | XXXX | Illegal |
| 00010 | XXXX | XXXX | 64 bit transaction |
| 00011 to 11111 | XXXX | XXXX | Illegal |

In one version, only non-PCI devices are permitted to perform 64-bit register accesses. This is because the DPO bus doesn't support 64-bit accesses with configuration transactions. Configuration transactions for non-PCI devices are memory mapped transactions on the DPO bus. Table 14 shows one embodiment of a completion packet header format, one embodiment of which is displayed in FIG. 17. Table 15 illustrates an exemplary completions status format. FIG. 16 shows one embodiment of a completion payload format for posted request packets, non-posted request packets, and completion packets.

TABLE 14

Exemplary completion packet header for a 32-bit bus

| Field | Description |
| --- | --- |
| DP | Data Packet |
| DC[4:0] | Double Word (DW) Count |
| PTYP[3:0] | Packet Type |
| EP | Error Packet |

TABLE 14-continued

Exemplary completion packet header for a 32-bit bus

| Field | Description |
| --- | --- |
| PTAG[3:0] | Requester Packet Tag |
| Requester ID[6:0] | DEVN[3:0] and FUNC[2:0] of the requester |
| NS | No Snoop (Search) Select |
| RO | Relaxed Ordering Select |
| FDBE[3:0] | First Double Word (DW) Byte Enables |
| LDBE[3:0] | Last Double Word (DW) Byte Enables |
| Completer ID[6:0] | DEVN[3:0] and FUNC[2:0] of the completer. |
| CST[1:0] | Completion Status |
| M | Modified Completion |
| Byte Count[7:0] | For MemRd Completions, the remaining byte count for the request* |
| Lower Address[5:0] | Lower Byte Address for starting byte of Completion* |

TABLE 15

Exemplary packet completion status fields

| Completion Status | CST[1:0] | Description |
| --- | --- | --- |
| SucCS | 00 | Successful Transaction |
| UnsCS | 01 | Unsupported Request Response |
| RtrCS | 10 | Retry Request, Busy |
| AbrtCS | 11 | Abort |

TABLE 16

Exemplary completion payload format

| M | Description |
| --- | --- |
| 0 | Completion Payload length is the same length as requested. |
| 1 | Completion payload length has been modified due to data segmentation. |

In one embodiment, a bit is provided in the configuration space to control this completion payload format. Table 17 shows one exemplary embodiment of a relaxed ordering format.

TABLE 17

Exemplary relaxed ordering format

| RO | Description |
| --- | --- |
| 0 | Relaxed Ordering Disabled |
| 1 | Relaxed Ordering Enabled, please see the Transaction Ordering Section |

In one embodiment, a bit can be provided in the configuration space to controlling the relaxed ordering format.

TABLE 18

Exemplary Search/Snoop transaction format

| NS | Description |
| --- | --- |
| 0 | CPU Snoop Transaction |
| 1 | CPU No Snoop Enable |

The byte count and lower address information are needed because read completions can be segmented into multiple read completion packets. This information allows the bus and requester to track the incoming data properly. If an error in one of the segments occurs, the requester only needs to re-request the corrupted segment.

If a read request is issued and the data in the read completion is segmented into multiple packets, all of the completion packets will share the same Transaction ID and will show up in order. There are several different embodiments of how the segmenting may be accomplished. In one embodiment, each segment is arranged in the order at the receiver that the packet is received (e.g., FIFO), and this technique works especially well if the data segments do not become jumbled during data transmission. Since the data transmissions on the DPO bus are transmitted on the same bus, the amount of temporal jumbling of the data packets should be limited. In another embodiment, an additional header field (not shown) indicates the segment order number of a particular segment within a packet (e.g., one particular segment is the first, second, third, etc. segment of what was originally one packet). The original order of the segments can then be reconstructed. Though in one embodiment there is no strict ordering rule for different read transaction completions, there is a strict ordering rule for segmented completions for a given transaction.

One embodiment of transactions along with the header contents of the messages are described. Where the on-chip device is the requester is now described. Assume that a specific on-chip device is making requests. That on-chip device can thereupon issue a posted write to memory provided that the size of the data does not exceed the maximum packet size of 128 bytes per packet. A given on-chip device can not issue a non-posted write to memory. If the on-chip device needs to know if the data arrived, it can issue a zero-length read to ensure the data is in memory.

The following information as shown in Table 19 can be used to form a 32-bit address packet header for the posted write of 128 bytes on a 64-bit bus to a prescribed address (e.g., 0x8040).

TABLE 19

32 bit address packet for 128 byte data payload on 64 bit bus

| Field | Value (bin) | Description |
| --- | --- | --- |
| DP | 1 | Data Packet |
| DC[4:0] | 00000 | 32 Double Word (DW) Count for 128 byte data payload |
| PTYP[3:0] | 0001 | Memory Write |
| EP | 0 | Error Packet |
| PTAG[3:0] | 0 | First Packet Outstanding |
| FUNC[2:0] | 010 | Function 2 |
| DEVN[3:0] | 0110 | Device 6 |
| NS | 0 | Snooped transaction |
| RO | 0 | Relaxed Ordering Disabled |
| FDBE[3:0] | 1111 | Byte Enables for first Double Word (DW) |
| LDBE[3:0] | 1111 | Byte Enables for last Double Word (DW) |
| ADDR[31:2] | 0x8040 | 32-bit address Double Word (DW) aligned |

The device will not receive a completion for posted transactions unless an error occurred. As far as the device knows, it is guaranteed delivery unless told otherwise.

TABLE 20

Exemplary completion packet fields

| Field | Value(bin) | Description |
| --- | --- | --- |
| DP | 1 | Data Packet |
| DC[4:0] | 10000 | 16 Double Word (DW) Count for 64 byte data payload |
| PTYP[3:0] | 0001 | Memory Write |

TABLE 20-continued

Exemplary completion packet fields

| Field | Value(bin) | Description |
|---|---|---|
| EP | 0 | Error Packet |
| PTAG[3:0] | 0 | First Packet Outstanding |
| FUNC[2:0] | 010 | Function 2 |
| DEVN[3:0] | 0110 | Device 6 |
| NS | 0 | Snooped transaction |
| RO | 0 | Relaxed Ordering Disabled |
| FDBE[3:0] | 1110 | Byte Enables for first Double Word (DW) |
| LDBE[3:0] | 0111 | Byte Enables for last Double Word (DW) |
| ADDR[31:2] | 0x8040 | 32-bit address Double Word (DW) aligned |

As per the embodiment of Table 20, device 6, function 2 can thereupon issue a read request to memory provided that the size of the data does not violate the MTU size of 128 bytes per packet. It does this with a 32-bit address packet and expects the data to return using a completion packet.

The information shown in Table 21 can be used to form a 32-bit address packet header for the read request of 64 bytes on a 64-bit bus from address 0x8040.

TABLE 21

Exemplary packet header information

| Field | Value (bin) | Description |
|---|---|---|
| DP | 0 | Control Packet |
| DC[4:0] | 10000 | 16 Double Word (DW) Count for 64 byte data payload |
| PTYP[3:0] | 0000 | Memory Read |
| EP | 0 | Error Packet |
| PTAG[3:0] | 0000 | First Packet Outstanding |
| FUNC[2:0] | 010 | Function 2 |
| DEVN[3:0] | 0110 | Device 6 |
| NS | 0 | Snooped transaction |
| RO | 0 | Relaxed Ordering Disabled |
| FDBE[3:0] | 1111 | Byte Enables for first DW |
| LDBE[3:0] | 1111 | Byte Enables for last DW |
| ADDR[31:2] | 0x8040 | 32-bit address DW aligned |

The completion header with or without the data will return with the header information shown in Table 22, followed by 8 data cycles containing the read data.

TABLE 22

Exemplary packet header fields

| Field | Value (bin) | Description |
|---|---|---|
| DP | 1 | Data Packet |
| DC[4:0] | 10000 | 16 Double Word (DW) Count for 64 byte read data payload |
| PTYP[3:0] | 1010 | Completion With Data |
| EP | 0 | Error Packet |
| PTAG[3:0] | 0 | First Packet Outstanding |
| Requester ID | 0110010 | Device 6 Function 2 |
| Completer ID | 0000000 | Device 0 Function 0 (Collector) |
| NS | 0 | Snoop Enabled |
| RO | 0 | Relaxed Ordering Disabled |
| FDBE[3:0] | 1111 | Byte Enables for first Double Word (DW) |
| LDBE[3:0] | 1111 | Byte Enables for last Double Word (DW) |
| CST[1:0] | 01 | Completion Successful |
| M | 0 | Not Modified |
| Byte Count[7:0] | 0000000 | Remaining Byte Count for Request |
| Lower Address[5:0] | 0000000 | Lower Byte Address for starting byte of Completion |

When the configuration is provided from the CPU (using a device completer) is now described. The CPU programs a device with a special value. This is a configuration packet with the header and data payload information shown in Table 23.

TABLE 23

Exemplary request packet field

| Field | Value (bin) | Description |
|---|---|---|
| DP | 1 | Data Packet |
| DC[4:0] | 00001 | 1 Double Word (DW) Count |
| PTYP[3:0] | 0101 | Configuration Write |
| EP | 0 | Error Packet |
| PTAG[3:0] | 1010 | Packet Outstanding 0xa |
| FUNC[2:0] | 010 | Function 2 |
| DEVN[3:0] | 0110 | Device 6 |
| NS | 0 | Snoop Enabled |
| RO | 0 | Relaxed Ordering Disabled |
| FDBE[3:0] | 1111 | Byte Enables for first Double Word (DW) |
| LDBE[3:0] | 1111 | Byte Enables for last Double Word (DW) |
| Requestor ID[6:0] | 000000 | Device 0, Function 0 |
| Register[7:2] | 000001 | Register 1, 32-bit register |

The device then returns the completion as shown in Table 24.

TABLE 24

Exemplary completion packet fields

| Field | Value (bin) | Description |
|---|---|---|
| DP | 0 | Data Packet |
| DC[4:0] | 10000 | 16 Double Word (DW) Count for 64 byte read data payload |
| PTYP[3:0] | 1000 | Completion |
| EP | 0 | Error Packet |
| PTAG[3:0] | 1010 | Packet Tag 0xa from request |
| Requester ID | 0000000 | Device 0 Function 0 |
| Completer ID | 0110010 | Device 6 Function 2 |
| NS | 0 | Snoop Enabled |
| RO | 0 | Relaxed Ordering Disabled |
| FDBE[3:0] | 1111 | Byte Enables for first Double Word (DW) |
| LDBE[3:0] | 1111 | Byte Enables for last Double Word (DW) |
| CST[1:0] | 01 | Completion Successful |
| M | 0 | Not Modified |
| Byte Count[7:0] | 0000000 | Remaining Byte Count for Request |
| Lower Address[5:0] | 0000000 | Lower Byte Address for starting byte of Completion |

In one embodiment, the CPU reads 64 bytes the prescribed location from the prescribed value having the set memory space associated with the on-chip device. The device receives the memory read request with the header information shown in Table 25

TABLE 25

Exemplary request packet field

| Field | Value (bin) | Description |
|---|---|---|
| DP | 0 | Control Packet |
| DC[4:0] | 10000 | 16 Double Word (DW) Count for 64 Byte data payload |
| PTYP[3:0] | 0000 | Memory Read |
| EP | 0 | Error Packet |
| PTAG[3:0] | 0010 | Packet Outstanding 0x2 |
| FUNC[2:0] | 010 | Function 0 |
| DEVN[3:0] | 0110 | Device 0 |
| NS | 0 | Snoop transaction |

TABLE 25-continued

Exemplary request packet field

| Field | Value (bin) | Description |
|---|---|---|
| RO | 0 | Relaxed Ordering Disabled |
| FDBE[3:0] | 1111 | Byte Enables for first Double Word (DW) |
| LDBE[3:0] | 1111 | Byte Enables for last DW |
| ADDR[31:2] | 0xab000000 | 32-bit address DW aligned |

The device then performs the read request and returns the data with the following completion header information shown in Table 26.

TABLE 26

Exemplary completion packet fields

| Field | Value (bin) | Description |
|---|---|---|
| DP | 1 | Data Packet |
| DC[4:0] | 10000 | 16 Double Word (DW) Count for 64 byteyte read data payload |
| PTYP[3:0] | 1010 | Completion with data |
| EP | 0 | Error Packet |
| PTAG[3:0] | 0010 | Packet Tag 0x2 from request |
| Requester ID | 0000000 | Device 0 Function 0 |
| Completer ID | 0110010 | Device 6 Function 2 |
| NS | 0 | Snoop Enabled |
| RO | 0 | Relaxed Ordering Disabled |
| FDBE[3:0] | 1111 | Byte Enables for first Double Word (DW) |
| LDBE[3:0] | 1111 | Byte Enables for last Double Word (DW) |
| CST[1:0] | 01 | Completion Successful |
| M | 0 | Not Modified |
| Byte Count[7:0] | 0000000 | Remaining Byte Count for Request |
| Lower Address[5:0] | 0000000 | Lower Byte Address for starting byte of Completion |

The DPO Bus can be configured to control big-endian or little-endian on-chip devices. To switch between big endian and the little endian formats, the on-chip device "swizzles" their data appropriately (or software can be notified to do this in main memory). The following examples show how data transfers will exist in memory, and over the 64-bit and 32-bit DPO Busses, including the headers.

For the following examples define the following terms:
a) Even Double Word (DW) address=0xXXXXXXX0 or 0xXXXXXXX8
b) Odd Double Word (DW) address=0xXXXXXXX4 or 0xXXXXXXXc
c) DPO Double Words (DW)=DC[4:0] field of DPO Header
d) DPO FDBE=FDBE[3:0] first Double Word (DW) byte enable field of DPO Header
e) DPO LDBE=LDBE[3:0] last Double Word (DW) byte enable field of DPO Header
f) DPO addr=ADDR[31:2] of DPO Header, LSB 2 bits are 0.

In one embodiment as shown in FIG. 18, a 32 bit device, 12 byte transfer, even double word (DW) address is shown. In another embodiment as shown in FIG. 19, a 32 bit device, 12 byte transfer, odd DW address, BEs (Byte Enables) used is shown. The alignment of the data on the 64-bit bus shown in FIG. 19 has changed from the previous example as shown in FIG. 18.

In another embodiment as shown in FIG. 20, a 32 bit device, 16 byte transfer, odd double word (DW) address, byte enables (BEs including FDBE and LDBE as described herein) used is shown. Note that the 64 bit alignment of the 64 bit bus causes bus inefficiency, even though this inefficiency is reabsorbed when converting to the 32 bit bus. In the embodiment shown in FIG. 21, a 32 bit device, 4 byte transfer, odd double word (DW) address, byte enables used is shown. Note the alignment of the 32-bit value on the 64-bit bus. Also please note that the byte enables for a transfer of 32 bits can be identical.

Figures 24, 25:
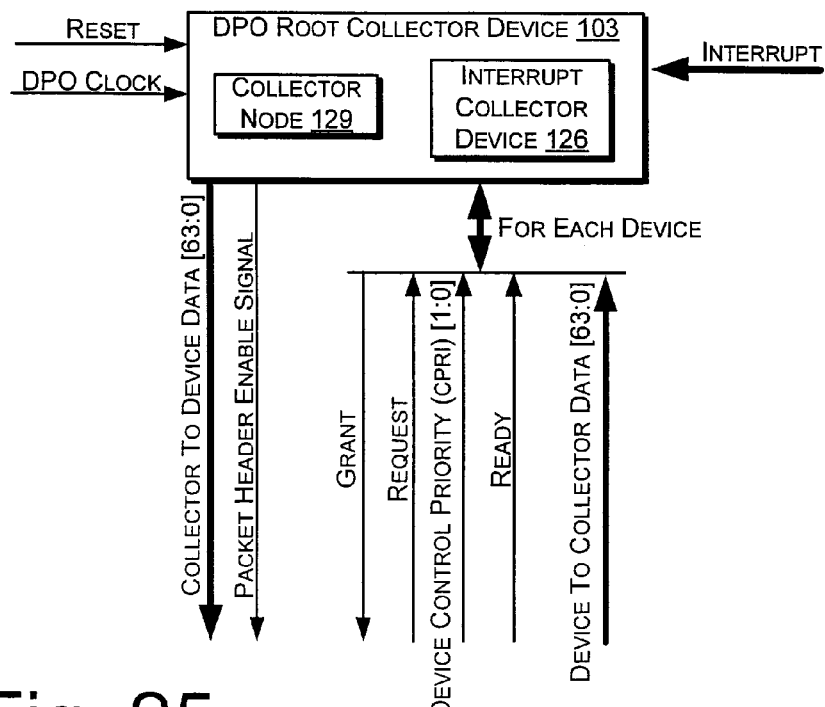
FIG. 24 shows one embodiment of the contents of a 64 bit device, 8 byte transfer, odd DW address.
FIG. 25 shows a block diagram of one embodiment of the signals to/from the DPO root collector device as shown in FIG. 1.

In FIG. 22, a 32 bit device, 4 byte transfer, even double word (DW) address, byte enables used is shown. Consider the alignment on the 64 bit bus. In FIG. 23, a 64 bit device, 8 byte transfer, even double word (DW) address, byte enables used is shown. In FIG. 24, a 64 bit device, 8 byte transfer, odd DW address, byte enables used is shown. Consider the alignment of the 8 bytes on the 64 bit data bus.

In the manner described herein, the DPO Bus allows device nodes to connect to the system CPU and main memory through connections to the "collector". The collector is device 0, function 0 of the DPO Bus.

Figure 29A:
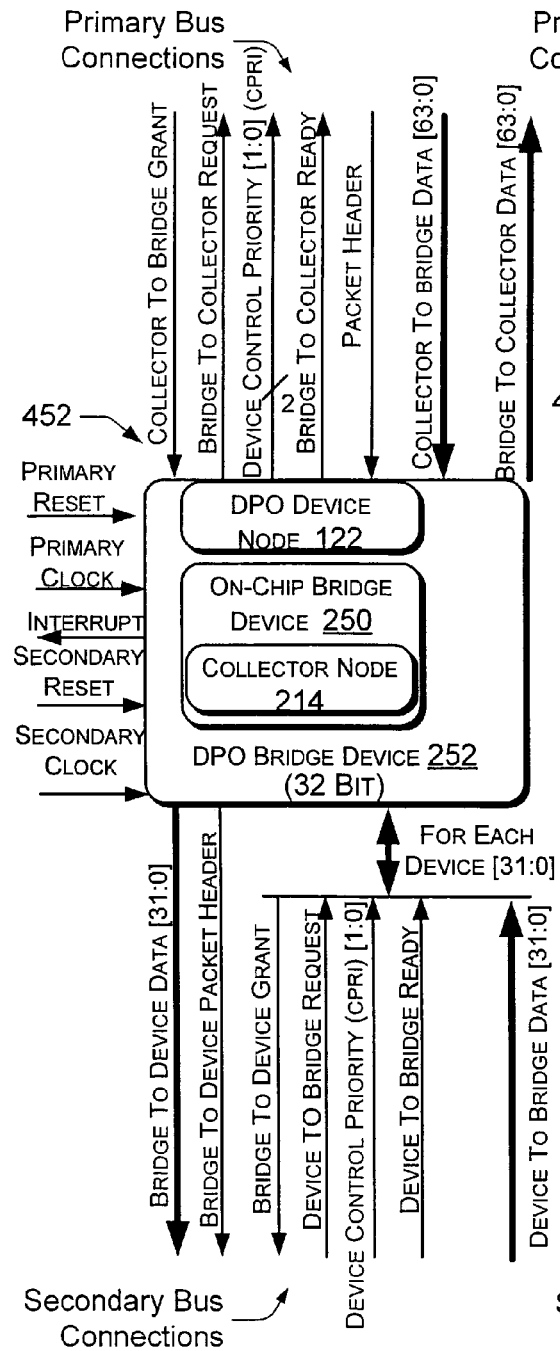
FIG. 29a shows an exemplary signal diagram of a DPO bridge device as shown in FIG. 2 with a 32 bit secondary.
Figure 29B:
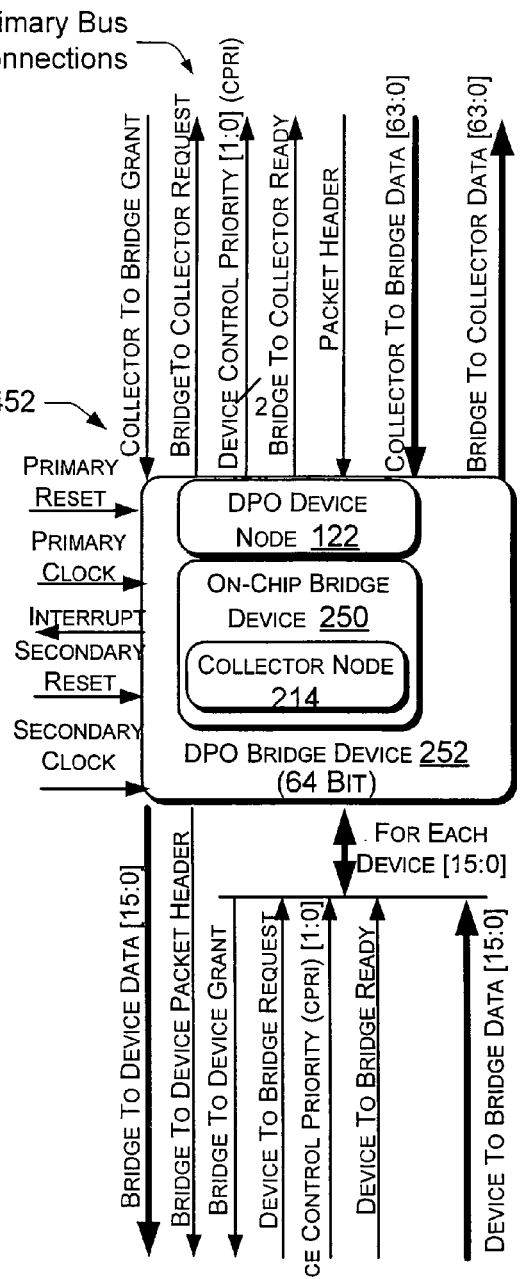
FIG. 29b shows an exemplary signal diagram of a DPO bridge device as shown in FIG. 2 with a 16 bit secondary.

FIG. 25 shows an exemplary collector node 129 that is associated with the DPO bus 104. FIGS. 26 and 27 show a plurality of exemplary device nodes 122 (64 bit and 32 bit) that are associated with the DPO bus 104. FIGS. 29*a* and 29*b* show different embodiments of exemplary collector nodes 214 that are included in the DPO bridge devices 252 (32 bit and 16 bit) which are all associated within the DPO bus 104. The collector node 129 within the DPO root collector device 103, one or more device nodes 122 within the DPO bridge device 252 and the DPO terminal device 102, and one or more collector nodes 214 within the DPO bridge device 252 can be associated in different topologies during system configuration. Considering FIG. 2, there is a single root collector node 129 as shown in FIG. 25 per DPO bus 104. The collector node 129 of the DPO root collector device can communicate with all other device nodes 122 either directly or through a collector node 214 within the DPO bridge device 252 as shown in FIG. 2. In one embodiment, the collector node 129 includes some or all of the following:

a) the bus arbiter 134 for an incoming data bus
b) an incoming data bus port
c) an outgoing data bus port.
d) a set of configuration registers.
e) An association with the sideband interrupt collector device 126.

Connections to one embodiment of the root collector node 129 are described in Table 27. Within this disclosure, it is assume that the DPO device nodes 122 (included in both the DPO bridge devices 252 and the DPO terminal devices 102) are connected to a collector node 214 or 129. One version of the request signals and the grant signals as described below relative to FIGS. 3 and 4 are shown in Table 27.

TABLE 27

Exemplary arbiter connections

| Signal Name | I/O | Arbiter Connections |
|---|---|---|
| Request | Input | Request |
| cpri[1:0] | Input | Request Control Priority |
| grant | Output | Grant |
| ready | Input | Device x Ready |
| Device/Collector Data[63:0], Device/Collector Data [31:0], or Device/Collector Data [15:0] | Input | Device x Input Data Bus (Incoming) |

TABLE 27-continued

Exemplary arbiter connections

| Signal Name | I/O | Arbiter Connections |
|---|---|---|
| Collector/Device Data[63:0], Collector/Device Data [31:0], or Collector/Device Data [15:0] | Output | Output Data Bus (Outgoing) |
| Packet Header | Output | Packet Header Identifier |

The DPO device node 122 provides for device connection to the DPO bus 104 by establishing communication (either directly or indirectly) with the collector node 129 of the DPO root collector device 103 as described relative to FIG. 25 using a device node interface. The collector node 129 may be considered an incoming source of data which provides access for the devices within the DPO bus to the system controller that includes, e.g., the CPU 116 and the main memory 114 as shown in FIG. 1. In certain embodiments, the DPO bus interface can contain varied (e.g., either a 32-bit or 64-bit) data bus configurations.

FIGS. 26 and 27 show respective block diagrams of 64 bit and 32 bit device nodes 122 that are included within the DPO bus 104. There can be many device nodes for each DPO bus 104. Each DPO device node 122 communicates with the collector node 129 within the DPO root collector device 103. Each DPO device node 122 contains a DMA unit and can make requests to main memory through the collector node 129. Connections to the DPO device node 122 are described in Table 28. Note that these connections are in many instances the opposite end of the same connection from those connections described relative to FIG. 25 in Table 27.

TABLE 28

Exemplary arbiter connections

| Signal Name | I/O | Arbiter Connections |
|---|---|---|
| request | Output | Request |
| cpri[1:0] | Output | Request Control Priority |
| grant | Input | Grant |
| ready | Output | Device Ready |
| Device/Collector Data[63:0]; Device/Collector Data [31:0]; or Device/Collector Data [15:0] | Output | Device Output Data Bus (Incoming) |
| Collector/Device Data[63:0]; Collector/Device Data [31:0]; or Collector/Device Data [15:0] | Input | Device Input Data Bus (Outgoing) |
| header | Input | Packet Header Identifier |

The bridge nodes as shown in FIG. 29a or 29b shows two embodiments (32 bit and 16 bit) of a collector node 214 within the DPO bridge device 252 that can be configured as shown in FIG. 28. FIG. 28 shows a version of DPO bus bridge numbering examples. The bridge node as shown in FIG. 28 is used to ease routing resources and provide bus flexibility. By its functionality, the DPO bridge device 252 provides for communication between a DPO device node 122 within the DPO terminal device 102 on a secondary interface and a collector node 129 within the DPO root collector device 103 on a primary interface.

FIG. 28 indicates that a DPO bus 104 can be configured with multiple DPO bridge devices 252 at different independent bus topologies such that one DPO device node node 122 can communicate incoming to a collector node 129 (described relative to FIG. 25) either directly or via another DPO bridge device.

Considering FIGS. 29a and 29b, a DPO bridge device connects a primary bus X with a secondary bus Y, where the data bandwidth of the primary bus X is greater than or equal to the data bandwidth of the secondary bus Y. By its functionality, a DPO bridge device 252 provides for communication between a DPO device node 122 on a primary interface and a collector node 129 on a secondary interface. Distinct clock and reset inputs (as shown in both FIGS. 29a and 29b) can be applied to the primary bus and the secondary bus of the DPO bridge device 252 to control the primary circuit and the secondary circuit. The distinct clocks between the primary and the secondary circuits within the DPO bridge device allows the primary circuit to be run at a higher or equal speed than the secondary circuit. This higher clock speed of devices nearer the DPO root collector device is desired to increase the data transmission rate in those portions of the DPO bus 104 that convey the most data. The distinct resets between the primary and the secondary circuits allow the resets to be applied more directly to individual independent bus topologies within the DPO bus. Y represents the bus number of the secondary interface, and is selected by traversing the tree depth-first and numbering sequentially. The point-to-point topologies shown in FIGS. 29a and 29b illustrate this. FIG. 29a shows an exemplary block diagram of a 64 bit DPO bus bridge. FIG. 29b shows an exemplary block diagram of a 32 bit DPO bus bridge. In both FIGS. 29a and 29b, both DPO bridge devices 252 have a primary bus X and a secondary bus Y.

The signals in Table 29 show the connections between the DPO bridge device 252 and the DPO root collector device 103, and can be considered a portion of the DPO bridge device's 252 primary bus interface. The signals in the table below with connections to each outgoing unit between the bridge and the devices are part of the bridges secondary bus interface. The bridge alleviates routing resources by allowing width and frequency changes to outgoing or secondary, busses. Table 29 shows one embodiment of the primary bus signals and secondary bus signals associated with the DPO bridge device 252.

TABLE 29

Exemplary signals connected to a bridge node device

| Primary Bus Signals | I/O | Description Connections |
|---|---|---|
| Bridge/Collector Request | Output | Request |
| cpri[1:0] | Output | Request Control Priority |
| Collector/Bridge grant | Input | Grant |
| Bridge/Collector ready | Output | Device Ready |
| Bridge/Collector Data[63:0]; Bridge/Collector Data [31:0]; and Bridge/Collector Data [15:0] | Output | Primary Output Data Bus (Incoming) |
| Collector/Bridge Data[63:0] Collector/Bridge Data [31:0] Collector/Bridge Data [15:0] | Input | Primary Input Data Bus (Outgoing) |
| Collector/Bridge Header | Input | Primary Packet Header Strobe |
| Secondary Bus Signals | I/O | Arbiter Connections |
| Device/Bridge request | Input | Device Request |
| Device/Bridge cpri[1:0] | Input | Device Request Control Priority |
| Bridge/Device grant | Output | Device Grant |
| Device/Bridge ready | Input | Device Ready |
| Device/Bridge Data[63:0]; Device/Bridge Data[31:0]; or Device/Bridge Data[15:0] | Input | Secondary Input Data Bus (Incoming) |
| Bridge/Device Data[63:0] Bridge/Device Data[31:0] Bridge/Device Data [15:0] | Output | Secondary Output Data Bus (Outgoing) |
| Bridge/Device header | Output | Device Packet Header Strobe |

FIG. 30 shows an exemplary topography for a DPO bus 104 including inter-node connections on a 64-bit DPO Bus. FIG. 30 shows how multiple DPO terminal devices 102 connect to a single DPO root collector device 103 (certain DOP terminal devices 102 use a DPO bridge device 252 to establish the connection) for a given DPO bus 104.

Figure 31:
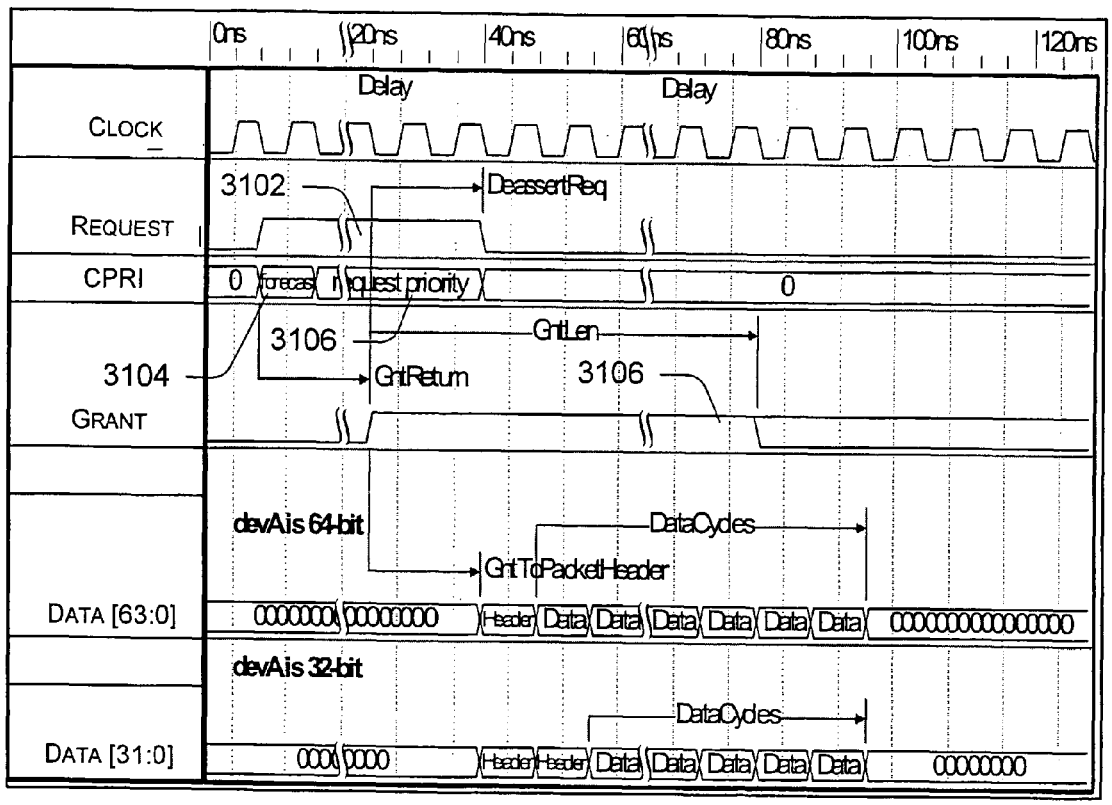
FIG. 31 shows one version of arbitration timing for a DPO bus device.

Arbitration Arbitration is a mechanism by which different on-chip devices can arbitrate or contend to control the use of the DPO bus at a prescribed time. There are a variety of current arbitration techniques which will not be detailed at this time. Each embodiment of the on-chip device 120 as described relative to FIGS. 1, 2, 3, and 4 may request the DPO bus using a request signal (e.g., on the REQ line). This request signal is clocked into the arbiter 134. In one embodiment, the arbiter 134 of the DPO bus has the responsibility to latch in the forecast value (e.g., when the lengths of the packets are less than four clock cycles). The arbiter lacks the ability to detect packet size in four clock cycles or less. On an on-chip device 120 basis, the minimum arbitration time from request to grant as seen by the on-chip device is 4 clock cycles as described above for one embodiment of the present disclosure. This 4 clock cycle minimum period is due to the register to register design rule for the DPO bus 104 as described relative to FIG. 4 which is now described relative to one embodiment of arbitration scheme 3100 as shown in FIG. 31.

Within the arbitration scheme 3100, at time T0, an on-chip device asserts its request signal 3102, and places a forecast value 3104 on the device/bridge request control priority (CPRI)[1:0] lines. After once clock cycle of the DPO bus 104, at time T1, the device changes the value to the priority value for the remainder of the request. The on-chip device can keep the request asserted until it is granted the transaction using a grant signal 3106. The arbiter 134 as shown in FIG. 1 is responsible for latching in the forecast value for each transaction requested. The device/bridge CPRI [1:0] signal 3108 is only valid when the request signal (from the DPO terminal device 102 and/or DPO bridge device 252 as shown in FIG. 2) is asserted. One embodiment of the resulting arbitration signal is described in Table 30.

TABLE 30

Exemplary asserted arbitration signals

| Signal | Time | Value | Description |
|---|---|---|---|
| Device_arb_cpri[1:0] | T0 | 00 | Invalid |
| Device_arb_cpri[1:0] | T1 | 00 | Forecast 1 cycle |
| Device_arb_cpri[1:0] | T1 | 01 | Forecast 2 cycle |
| Device_arb_cpri[1:0] | T1 | 10 | Forecast 3 cycle |
| Device_arb_cpri[1:0] | T1 | 11 | Forecast 4+ cycles |
| Device_arb_cpri[1:0] | T2, T3, . . . , TN | 00 | Priority 0 highest |
| Device_arb_cpri[1:0] | T2, T3, . . . , TN | 01 | Priority 1 |
| Device_arb_cpri[1:0] | T2, T3, . . . , TN | 10 | Priority 2 |
| Device_arb_cpri[1:0] | T2, T3, . . . , TN | 11 | Priority 3 lowest |

There are a variety of potential request rules that can be followed within arbitration. One, multiple, or all of the request rules can be applied while still remaining within the scope of the present disclosure. One embodiment of the request rules includes some or all of the following:

a) An on-chip device does not request bus access unless it can ensure that a packet can be transmitted in its entirety if granted the bus.
b) The first cycle of the request signal 3102 temporally corresponds with the forecast cycle 3104.
c) The remaining cycles in the request signal 3102 can be prioritized.
d) Though there can be four priority levels, a device is only permitted to request on two priority levels. The two values should default to the lowest two priorities, and should be programmable by software.
e) Priority between requesting on-chip devices can be changed during the request procedure at any time.
f) Once a request is made, the device can keep requesting until the bus is granted to the device.
g) Once granted the bus, the device can remove its request for at minimum one cycle.
h) In the event that a device makes a request, but then decides it wants to remove the request, it can not. In this event the device can designate the packet as an error packet. Also if the packet had a data payload, it should be removed and the data packet bit cleared in the header.
i) The grant signal from the arbiter will be asserted to the device for the exact packet length.

Within this disclosure, the first cycle (cycle 1) will be referred to as the forecast cycle of the request procedure. The forecast cycle needs to be used to identify small packets for arbitration so that the bus bubbles can be absorbed. A bus bubble is considered any wasted bus bandwidth. A bus bubble is one clock cycle long for the embodiment of DPO bus.

A bus bubble has occurred if there is an idle cycle on the bus and there is at least one device on the bus that has data that could have been transmitted in the cycle. Bus bubbles are usually caused by arbitration uncertainty resulting in a wasted bus cycle to avoid a potential collision on the bus. The arbiter gets the true length of the packet from header upon arrival in the DPO root collector device 103, which is four cycles too late to make the decision to re-arbitrate in the event of a one, two, or three cycle packet.

One embodiment of arbitration timing for a device node is now described. The following diagram shows the arbitration transactions for a given device node. Arbitration is only required if the device needs to transmit to the DPO root collector device 103. A device could receive a packet from the DPO root collector device 103 at any time. FIG. 31 shows one version of arbitration timing for a DPO bus device whose terms are set forth in Table 31

TABLE 31

Description of exemplary variables for arbitration between two on-chip busses

| Variable | Description |
|---|---|
| GntReturn: | Minimum 2 cycles, and only is 2 cycles in the event that the bus is IDLE. |
| GntLen: | The exact number of cycles for the packet to transmit, no more, no less. |
| DeassertReq: | Request can be deasserted immediately for at minimum one cycle in response to grant. |
| GntToPacketHeader: | The device can output the packet immediately in response to grant. The delay is due to register in/out. |
| DataCycles: | Derived from the Double Word (DW) count field in header |
| Header: | 64 bit Packet header |
| Forecast: | Tells the arbiter the length of the packet (e.g., one, two, three or more cycles long). The forecast is transmitted in the first request cycle only. |
| Request Priority: | One of four priority levels for the arbiter to use, and is the remaining cycles of the request. |

As such, FIG. 31 may be considered as providing one embodiment of an arbitration scheme within the DPO bus 104. One embodiment of the arbitration scheme as set forth in FIG. 31 relies on register-to-register communication at the top level as described in this disclosure. The following arbitration between different device nodes 122 that are attempting to access the same collector node 129 of the DPO root collector device 103 satisfies the arbitration scheme as set forth in FIG. 31. When the output bus is not in use, drive the outputs low. For all transmissions on the bus, a devices grant line can be high from the arbiter. After the packet is transmitted, if you have re-requested the bus and the grant line is still high the device may continue to output the next packet. Please note that the waveform above is drawn from the bus lines, thus all input values are seen by a given device one cycle later.

One embodiment of a given DPO bridge device 252 adheres to one, multiple, or all of the following rules when making requests for service on a primary bus.

a) A DPO bridge device 252 requests service one packet at a time.
b) In many embodiments, packets incoming from secondary to primary interface are delivered in FIFO ordering.
c) The request priority for the primary interface is equal to the maximum priority of the all the packets in the FIFO. This is evaluated on a packet basis.
d) A bridge can be able to guarantee that a packet can be fully transmitted to the primary bus before requesting service to the arbiter.
e) A DPO bridge device 252 can modify its ready signal as soon as it detects that there will not be enough buffer space to handle another incoming maximum transfer length packet on its primary interface after the current request completes.

In one embodiment, a given collector node 129 of the DPO root collector device 103 contains the arbiter for the outgoing or secondary data port of the node. One embodiment of arbitration for the collector node 129 is described. One version of rules for servicing arbitration requests that can be followed in order to properly service outgoing devices and bridges.

a) The collector node 129 of the DPO root collector device 103 will not grant a device access to the bus unless the collector node has enough buffer space to accept a packet of maximum size as allocated for the device.
b) Since the edge of the grant signal is used to qualify the location of the next packet header, the bus can not be parked when idle.

Figure 32:
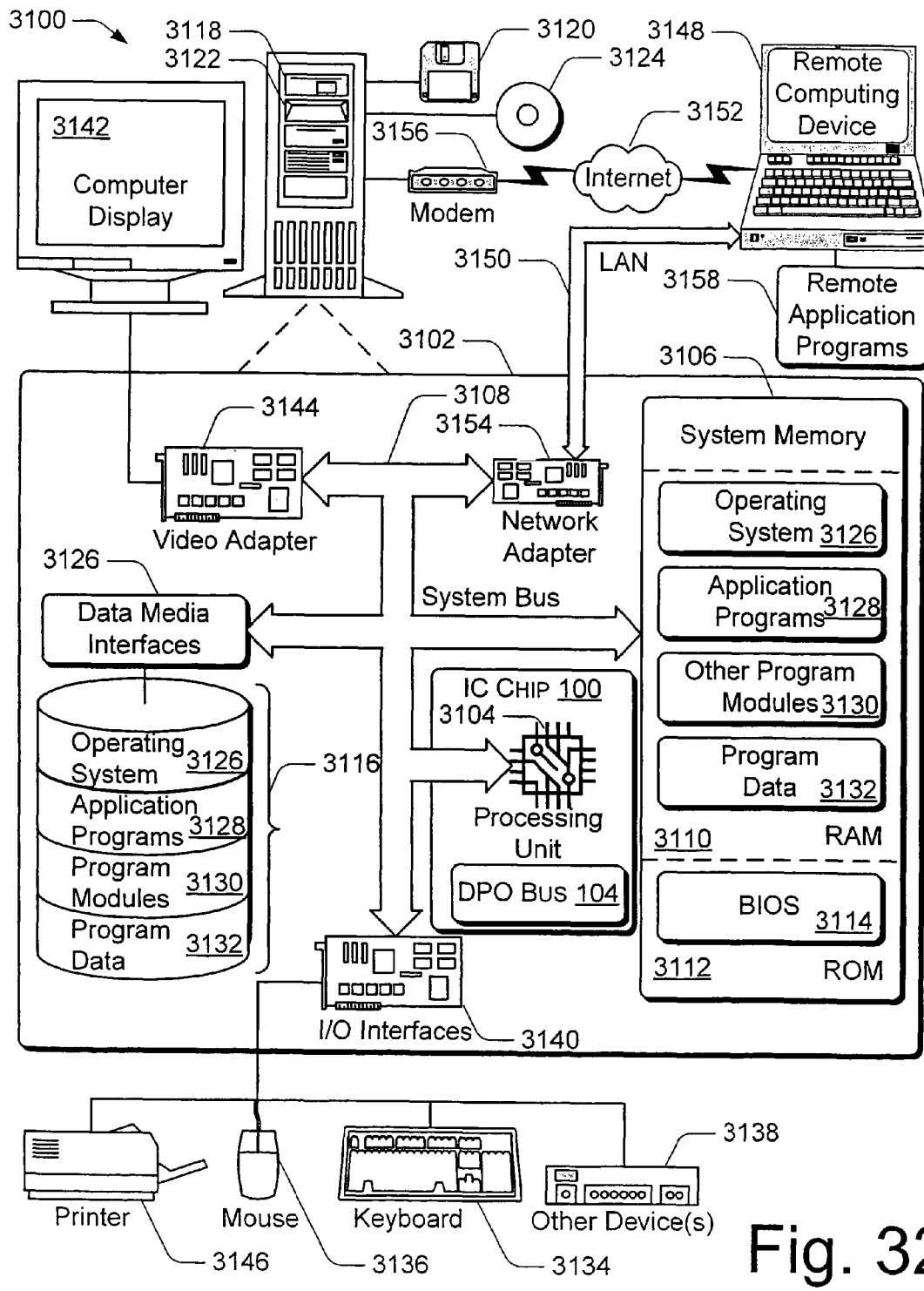
FIG. 32 shows a block diagram of one embodiment of a computer environment such as may rely on a DPO bus.

FIG. 32 illustrates an example of a suitable computer environment or network 3200 that includes a user interface which can contain a DPO bus 104 as described relative to FIG. 1. The computer environment 110 as described relative to FIG. 1 is one embodiment of a computer environment 3200 described relative to FIG. 32. Similar resources may use the computer environment and the processes as described herein.

Computing Devices

The computer environment 3200 illustrated in FIG. 32 is a general computer environment, which can be used to implement the concept network techniques described herein. The computer environment 3200 is only one example of a computer environment and is not intended to suggest any limitation as to the scope of use or functionality of the computer and network architectures. Neither should the computer environment 3200 be interpreted as having any dependency or requirement relating to any one or combination of components illustrated in the exemplary computer environment 3200.

The computer environment 3200 includes a general-purpose computing device in the form of a computer 3202. The computer 3202 can be, for example, one or more of a stand alone computer, a networked computer, a mainframe computer, a PDA, a telephone, a microcomputer or microprocessor, or any other computer device that uses a processor in combination with a memory. The components of the computer 3202 can include, but are not limited to, one or more processors or processing clients 3204 (optionally including a cryptographic processor or co-processor), a system memory 3206, and a system bus 3208 that couples various system components including the processor 3204 and the system memory 3206. The computer environment 3200 can include wired portions and wireless portions as is generally known in networked-devices.

The system bus 3208 represents one or more of any of several types of bus structures (such as the DPO bus 104), including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 3202 can include a variety of computer readable media. Such media can be any available media that is accessible by the computer 3202 and includes both volatile and non-volatile media, and removable and non-removable media.

The system memory 3206 includes the computer readable media in the form of non-volatile memory such as read only memory (ROM) 3212, and/or volatile memory such as random access memory (RAM) 3210. A basic input/output system (BIOS) 3214, containing the basic routines that help to transfer information between elements within the computer 3202, such as during start-up, is stored in the ROM 3212. The RAM 3210 can contain data and/or program modules that are immediately accessible to, and/or presently operated on, by the processing client 3204.

The computer 3202 may also include other removable/non-removable, volatile/non-volatile computer storage media. By way of example, FIG. 32 illustrates a hard disk drive 3215 for reading from and writing to a non-removable, non-volatile magnetic media (not shown), a magnetic disk drive 3218 for reading from and writing to a removable, non-volatile magnetic disk 3220 (e.g., a "floppy disk"), and an optical disk drive 3222 for reading from and/or writing to a removable, non-volatile optical disk 3224 such as a CD-ROM, DVD-ROM, or other optical media. The hard disk drive 3215, magnetic disk drive 3218, and optical disk drive 3222 are each connected to the system bus 3208 by one or more data media interfaces 3227. Alternatively, the hard disk drive 3215, magnetic disk drive 3218, and optical disk drive 3222 can be connected to the system bus 3208 by one or more interfaces (not shown).

The disk drives and their associated computer-readable media provide non-volatile storage of computer readable instructions, control node data structures, program modules, and other data for the computer 3202. Although the example illustrates a hard disk within the hard disk drive 3215, a removable magnetic disk 3220, and a non-volatile optical disk 3224, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 3200.

Any number of program modules can be stored on the hard disk contained in the hard disk drive 3215, magnetic disk 3220, non-volatile optical disk 3224, ROM 3212, and/or RAM 3210, including by way of example, the OS 3226, one or more application programs 3228, other program modules 3230, and program data 3232. Each OS 3226, one or more application programs 3228, other program modules 3230, and program data 3232 (or some combination thereof) may implement all or part of the resident components that support the distributed file system.

A player can enter commands and information into the computer 3202 via input devices such as a keyboard 3234 and a pointing device 3236 (e.g., a "mouse"). Other input devices 3238 (not shown specifically) may include a microphone, joystick, game pad, satellite dish, serial port, scanner, and/or the like. These and other input devices are connected to the processing client 3204 via input/output interfaces 3240 that are coupled to the system bus 3208, but may be connected by other interface and bus structures, such as a parallel port, game port, or a universal serial bus (USB).

A monitor, flat panel display, or other type of computer display 3242 can also be connected to the system bus 3208 via an interface, such as a video adapter 3244. In addition to the computer display 3242, other output peripheral devices can include components such as speakers (not shown) and a printer 3246 which can be connected to the computer 3202 via the input/output interfaces 3240.

The computer 3202 can operate in a networked environment using logical connections to one or more remote computers, such as a remote computer device 3248. By way of example, the remote computer device 3248 can be a personal computer, portable computer, a server, a router, a network computer, a peer device or other common network node, game console, and the like. The remote computer device 3248 is illustrated as a portable computer that can include many or all of the elements and features described herein relative to the computer 3202.

Logical connections between the computer 3202 and the remote computer device 3248 are depicted as a local area network (LAN) 3250 and a general wide area network (WAN) 3252. Such networking environments are commonplace in offices, enterprise-wide computer networks, intranets, and the Internet.

When implemented in a LAN networking environment, the computer 3202 is connected to a local network 3250 via a network interface or adapter 3254. When implemented in a WAN networking environment, the computer 3202 can includes a modem 3256 or other means for establishing communications over the wide network 3252. The modem 3256, which can be internal or external to the computer 3202, can be connected to the system bus 3208 via the input/output interfaces 3240 or other appropriate mechanisms. It is to be appreciated that the illustrated network connections are exemplary and that other means of establishing communication link(s) between the computers 3202 and 3248 can be employed.

In a networked environment, such as that illustrated with the computer environment 3200, program modules depicted relative to the computer 3202, or portions thereof, may be stored in a remote memory storage device. By way of example, remote application programs 3258 reside on a memory device of the remote computer 3248. For purposes of illustration, application programs and other executable program components such as the operating system are illustrated herein as discrete Web blocks, although it is recognized that such programs and components reside at various times in different storage components of the computer 3202, and are executed by the data processor(s) of the computer 3202. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 3250, components, control node data structures 3254, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   an on-chip bus, having a plurality of bus topologies, including
   a register operating on a four clock-cycle minimum arbitration turn-around time to provide top-level register-to-register communication;
   a plurality of on-chip devices configured to individually communicate via one of said bus topologies so each of said on-chip devices has register-to-register communication with other of said on-chip devices and can communicate with a root collector device, included in an other said bus topology, that is configured to communicate, via a bus topology that is separate from the on-chip bus, with an off-chip device;

an off-chip bus configured to transfer data packets, received by the root collector device from one of said on-chip devices via the one and the other said bus topologies, to an off-chip device via the bus topology that is separate from the on-chip bus, wherein the off-chip bus is configured to use a protocol that is different from a protocol implemented by the on-chip bus;

an arbiter granting individual on-chip devices non-conflicting on-chip bus access by granting a unique set of accessing time slots; and a forecast cycle configured to identify packets that are less than four clock-cycles to the arbiter, in which a bus request signal and a bus grant signal individually provide a top-level register-to-register communication for said on-chip devices.

2. The system of claim 1, wherein when a device node wants access, the device node asserts a request and places a device node forecast value of two arbiter signals that signifies two or more cycles and passes forecast information in at least one of said cycles and priority information in another one of said cycles.

3. The system of claim 1, wherein said on-chip devices provide the arbiter a forecast for deciding how to arbitrate small packets.

4. The system of claim 1, further comprising a multiplexer, having limited propagation delay, for providing non-conflicting data transfer.

5. The system of claim 4, wherein the root collector device includes an interrupt device configured to interrupt communication between the on-chip bus and an individual on-chip device included in the plurality of on-chip devices based on interrupts from the individual on-chip device.

6. The system of claim 4, wherein the arbiter is configured to control the multiplexer to select a data line for latching.

7. The system of claim 1, wherein the arbiter cannot detect packet size in at least four clock-cycles.

8. The system of claim 1, wherein the on-chip bus's design rule has a four clock cycle minimum period.

9. A method comprising:
transmitting packetized data by an on-chip bus having a plurality of bus topologies;
communicating, in one said bus topology, via a first direction communication path from a first register and a first logic portion, included in an on-chip device, to a second register included in the on-chip bus;
communicating, in the one said bus topology, via a second direction communication path from a third register and a second logic portion included in the on-chip bus, to a fourth register included in the on-chip device;
ensuring no additional on-chip devices access the on-chip bus during communication;
forwarding a forecast cycle that identifies packets that are less than four clock-cycles long to an arbiter; and
implementing a bridge device, included in an other said bus topology, to transmit packetize data, from the on-chip device, to an independent bus topology to communicate with an off-chip device when a particular communication is to or from the off-chip device, the independent bus topology being separate from the one and the other said bus topologies and uses a protocol that is different from a protocol used by the on-chip bus.

10. The method of claim 9, wherein each on-chip bus follows distributed direct memory access (DMA) and each on-chip device has a DMA engine located therein.

11. The method of claim 10, further comprising placing a forecast value of two arbiter signals signifying two or more cycles.

12. The method of claim 11, wherein forecast information is passed in at least one of the cycles and priority information is passed in another of the cycles.

13. The method of claim 9, further comprising interrupting communication by the on-chip bus, based on a side-band interrupt signal from an other on-chip device.

14. The method of claim 9, further comprising identifying less than four clock-cycle packets by an on-chip bus request signal and a bus grant signal on a top-level register-to-register communication.

15. One or more computer-readable media comprising computer-executable instructions that, when executed, direct a computing system to:
arbitrate, for an on-chip device included in a bus topology with other on-chip devices in an on-chip bus, four clock-cycle minimum communications going in a first direction between a first register and a first logic portion included in the on-chip bus and communications going in a second direction between a third register and a second logic portion included in the on-chip bus and a fourth register by granting a unique set of accessing time slots;
forward a forecast cycle including identification of packets less than four clock-cycles long; and
transfer packetized data between the on-chip device and an off-chip device through use of:
an other bus topology, included in the on-chip bus, to communicate the packetized data to a root collector device that is configured to communicate with the on-chip device; and
an independent bus topology, included on a chip with the on-chip bus, to transfer packetized data between the root collector device and the off-chip device when the communication is directed to or from the off-chip device, wherein the independent topology is configured to use a different protocol than that implemented by the on-chip bus.

16. The one or more computer-readable media of claim 15, wherein the instructions are further executable to assert a request signaling forecast value of two arbiter signals signifying two or more cycles passing forecast information in at least one of the cycles and priority information in another cycle.

17. The one or more computer-readable media of claim 15, wherein the instructions are further executable to interrupt the on-chip bus and the on-chip device communication with a side-band interrupt signal.

18. The one or more computer-readable media of claim 15, wherein the instructions are further executable to identify less than four clock-cycle packets by an on-chip bus request signal and a grant signal on a top-level register-to-register communication.

19. The one or more computer-readable media of claim 15, wherein to arbitrate causes the on-chip bus to control data line latching selection.

20. The one or more computer-readable media of claim 15, wherein the instructions configure the on-chip bus to operate in conformance with distributed direct memory access.

* * * * *

UNITED STATES PATENT AND TRADEMARK OFFICE
CERTIFICATE OF CORRECTION

| | | |
|---|---|---|
| PATENT NO. | : 7,882,294 B2 | Page 1 of 1 |
| APPLICATION NO. | : 12/025569 | |
| DATED | : February 1, 2011 | |
| INVENTOR(S) | : Michael G. Love | |

It is certified that error appears in the above-identified patent and that said Letters Patent is hereby corrected as shown below:

In column 27, line 45, before "bus" insert -- data --.

Signed and Sealed this
Nineteenth Day of July, 2011

David J. Kappos
*Director of the United States Patent and Trademark Office*